US012154485B2

(12) United States Patent
Park et al.

(10) Patent No.: US 12,154,485 B2
(45) Date of Patent: *Nov. 26, 2024

(54) PIXEL, DISPLAY DEVICE, CONTROLLER AND METHOD OF DRIVING DISPLAY DEVICE INCLUDING BIAS POWER LINE

(71) Applicant: SAMSUNG DISPLAY CO., LTD., Yongin-si (KR)

(72) Inventors: Se Hyuk Park, Yongin-si (KR); Hong Soo Kim, Yongin-si (KR); Young Ha Sohn, Yongin-si (KR); Jin Wook Yang, Yongin-si (KR); Dong Gyu Lee, Yongin-si (KR); Jae Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,615

(22) Filed: Apr. 12, 2023

(65) Prior Publication Data

US 2024/0105104 A1 Mar. 28, 2024

(30) Foreign Application Priority Data

Sep. 27, 2022 (KR) ........................ 10-2022-0122759

(51) Int. Cl.
*G09G 3/32* (2016.01)

(52) U.S. Cl.
CPC ....... *G09G 3/32* (2013.01); *G09G 2300/0842* (2013.01); *G09G 2320/0247* (2013.01); *G09G 2330/021* (2013.01)

(58) Field of Classification Search
CPC ............. G09G 3/32; G09G 2300/0842; G09G 2320/0247; G09G 2330/021; G09G 3/3258; G09G 3/2014; G09G 3/325; H01L 27/1251; H05B 45/44; H04L 69/326
See application file for complete search history.

(56) References Cited

U.S. PATENT DOCUMENTS

| | | | |
|---|---|---|---|
| 10,861,393 | B2 | 12/2020 | Kim et al. |
| 10,909,918 | B2 | 2/2021 | Kim et al. |
| 11,049,458 | B1 | 6/2021 | Fan et al. |
| 11,056,060 | B2 | 7/2021 | Kim et al. |

(Continued)

FOREIGN PATENT DOCUMENTS

| | | | |
|---|---|---|---|
| EP | 1591993 | A1 | 11/2005 |
| EP | 3343552 | A1 | 7/2018 |

(Continued)

*Primary Examiner* — Richard J Hong
(74) *Attorney, Agent, or Firm* — CANTOR COLBURN LLP

(57) ABSTRACT

A pixel includes: a light emitting element; a first transistor including a gate electrode electrically connected to a first node, a second node to which a first power voltage for driving the light emitting element is to be applied, and a third node electrically connected to the light emitting element; and a bias control transistor configured to be controlled in operating timing thereof by a bias control signal, and configured to switch electrical connection between the second node and a bias power line for transmitting a bias voltage. In one frame period, a voltage level of the bias voltage to be applied to the second node sequentially increases.

27 Claims, 36 Drawing Sheets

(56) References Cited

U.S. PATENT DOCUMENTS

| | | | | |
|---|---|---|---|---|
| 11,158,261 | B2 | 10/2021 | Kim et al. | |
| 11,185,772 | B2 | 11/2021 | Lee et al. | |
| 11,217,149 | B2 | 1/2022 | In et al. | |
| 11,263,976 | B2 | 3/2022 | Yang et al. | |
| 11,295,673 | B2 | 4/2022 | Park et al. | |
| 11,417,283 | B2 | 8/2022 | Son et al. | |
| 2003/0197473 | A1 | 10/2003 | Kitahara | |
| 2006/0164359 | A1* | 7/2006 | Kimura | G09G 3/2014 345/92 |
| 2008/0111774 | A1 | 5/2008 | Iida et al. | |
| 2011/0193855 | A1 | 8/2011 | Han | |
| 2011/0199357 | A1 | 8/2011 | Chung et al. | |
| 2014/0192037 | A1 | 7/2014 | Chung | |
| 2015/0348464 | A1 | 12/2015 | In et al. | |
| 2016/0055792 | A1 | 2/2016 | Lee et al. | |
| 2016/0133191 | A1 | 5/2016 | Kang et al. | |
| 2017/0061876 | A1 | 3/2017 | Cho et al. | |
| 2017/0124954 | A1 | 5/2017 | Park et al. | |
| 2017/0199616 | A1 | 7/2017 | Kim et al. | |
| 2018/0293939 | A1 | 10/2018 | Kim et al. | |
| 2019/0096330 | A1 | 3/2019 | Kim et al. | |
| 2019/0172888 | A1 | 6/2019 | Choi et al. | |
| 2019/0295470 | A1 | 9/2019 | Kim et al. | |
| 2020/0036818 | A1* | 1/2020 | Fisher | H04L 69/326 |
| 2020/0202771 | A1 | 6/2020 | Takasugi | |
| 2020/0221554 | A1* | 7/2020 | Chiang | H05B 45/44 |
| 2020/0258451 | A1* | 8/2020 | Takahara | H01L 27/1251 |
| 2020/0302860 | A1 | 9/2020 | Kim et al. | |
| 2021/0027719 | A1* | 1/2021 | Cho | G09G 3/3258 |
| 2021/0049958 | A1* | 2/2021 | Kim | G09G 3/325 |
| 2021/0049965 | A1 | 2/2021 | Jeon et al. | |
| 2021/0065619 | A1 | 3/2021 | Kim et al. | |
| 2021/0065628 | A1 | 3/2021 | Kim et al. | |
| 2021/0142735 | A1 | 5/2021 | Cho et al. | |
| 2021/0193040 | A1 | 6/2021 | Na | |
| 2021/0248961 | A1 | 8/2021 | Yang et al. | |
| 2021/0375192 | A1 | 12/2021 | Jeon et al. | |
| 2021/0376041 | A1 | 12/2021 | Lee et al. | |
| 2022/0270542 | A1 | 8/2022 | Park et al. | |
| 2023/0306906 | A1 | 9/2023 | Yang et al. | |
| 2024/0096265 | A1 | 3/2024 | Sohn et al. | |

FOREIGN PATENT DOCUMENTS

| | | | |
|---|---|---|---|
| KR | 1020100072433 | A | 7/2010 |
| KR | 1020110091293 | A | 8/2011 |
| KR | 1020110122410 | A | 11/2011 |
| KR | 101816891 | B1 | 1/2018 |
| KR | 1020180078109 | A | 7/2018 |
| KR | 1020180114981 | A | 10/2018 |
| KR | 1020190034375 | A | 4/2019 |
| KR | 101978798 | B1 | 5/2019 |
| KR | 1020190053552 | A | 5/2019 |
| KR | 1020200142646 | A | 12/2020 |
| KR | 1020210019635 | A | 2/2021 |
| KR | 1020210019639 | A | 2/2021 |
| KR | 1020210045805 | A | 4/2021 |
| KR | 1020210054114 | A | 5/2021 |
| KR | 1020210100785 | A | 8/2021 |
| KR | 1020210106052 | A | 8/2021 |
| KR | 102438199 | B1 | 8/2022 |

* cited by examiner

3300

PIXEL, DISPLAY DEVICE, CONTROLLER AND METHOD OF DRIVING DISPLAY DEVICE INCLUDING BIAS POWER LINE

The present application claims priority to Korean patent application number 10-2022-0122759, filed on Sep. 27, 2022, and all the benefits accruing therefrom under 35 U.S.C. § 119, the content of which in its entirety is herein incorporated by reference.

BACKGROUND

Field of Invention

Various embodiments of the present disclosure relate to a pixel, a display device, a controller, a method of driving the display device including a bias power line.

Description of Related Art

With the development of information technology, the importance of a display device that is a connection medium between a user and information has been emphasized. Owing to the importance of display devices, the use of various kinds of display devices, such as a liquid crystal display device and an organic light-emitting display device, has increased.

The display device is desirable to have a high speed driving function for providing images that are converted at a high frame frequency to a user, and a low speed driving function for providing images that are converted at a low frame frequency to the user to reduce power consumption.

Consequently, it is desirable to provide a display device capable of displaying images at various frame frequencies.

SUMMARY

Various embodiments of the present disclosure are directed to a pixel, a display device, and a controller which can display images at various frame frequencies, and a method of driving the display device including a bias power line.

Various embodiments of the present disclosure are directed to a pixel, a display device, and a controller which can mitigate a flicker phenomenon from occurring in the case where images are displayed at various frame frequencies, and a method of driving the display device including a bias power line.

An embodiment of the present disclosure provides a pixel including: a light emitting element; a first transistor including a gate electrode electrically connected to a first node, a second node to which a first power voltage for driving the light emitting element is to be applied, and a third node electrically connected to the light emitting element; and a bias control transistor configured to be controlled in operating timing thereof by a bias control signal, and configured to switch electrical connection between the second node and a bias power line for transmitting a bias voltage. In one frame period, a voltage level of the bias voltage to be applied to the second node of the first transistor sequentially increases.

A peak voltage of the bias voltage may be gradually reduced over two or more frame periods.

The pixel may further include a second transistor configured to be controlled in operating timing thereof by a first scan signal, and electrically connected to a data line and configured to transmit a voltage corresponding to a data voltage inputted from the data line to the first node. The one frame period may include: a data writing cycle in which the first scan signal having a turn-on level is inputted to the second transistor and the light emitting element emits light based on the inputted data voltage; and a hold cycle in which the light emitting element emits light based on the data voltage inputted in the data writing cycle.

In a case where the one frame period includes two or more hold cycles, the voltage level of the bias voltage may sequentially increase as the two or more hold cycles proceed.

In the one frame period a peak voltage of the bias voltage may increase in proportion to the number of hold cycles in the one frame period.

The voltage level of the bias voltage to be inputted in the data writing cycle may be different from the voltage level of the bias voltage to be inputted in the hold cycle.

The voltage level of the bias voltage to be inputted in the data writing cycle may be identical to the voltage level of the bias voltage to be inputted in a preset number of hold cycle periods. In the case where the number of hold cycles in the one frame period exceeds a preset number, the voltage level of the bias voltage may sequentially increase after the preset number of hold cycle periods.

In the case where the number of hold cycles exceeds the preset number, the voltage level of the bias voltage may include in proportion to the number of hold cycles that exceeds the preset number.

As the one frame period proceeds, a voltage level increment of the bias voltage may be reduced in the one frame period.

An embodiment of the present disclosure provides a pixel including: a light emitting element; a first transistor including a gate electrode electrically connected to a first node, a second node to which a first power voltage for driving the light emitting element is to be applied, and a third node electrically connected to the light emitting element; a second transistor configured to be controlled in operating timing thereof by a first scan signal, and electrically connected to a data line so that a voltage corresponding to a data voltage inputted from the data line is transmitted to the first node; and a bias control transistor configured to be controlled in operating timing thereof by a bias control signal, and configured to switch electrical connection between the second node and a bias power line for transmitting a bias voltage. In one frame period a voltage level of the bias voltage to be applied to the second node of the first transistor may be constant, and as a frame is changed to another frame, the voltage level of the bias voltage to be applied to the second node of the first transistor may be increased and then sequentially reduced.

An embodiment of the present disclosure provides a display device including: a display panel in which a plurality of pixels each including a light emitting element and a first transistor configured to drive the light emitting element are disposed, a bias power line for transmitting a bias voltage to be applied to the first transistor is disposed, and a plurality of data lines electrically connected to the plurality of pixels are disposed; a data driving circuit configured to supply a data voltage to the plurality of data lines; and a power supply circuit configured to output the bias voltage to the bias power line. In one frame period, the power supply circuit may sequentially increase a voltage level of the bias voltage and outputs the bias voltage to the bias power line.

A plurality of first scan lines electrically connected to the plurality of pixels may be disposed in the display panel. The display device may further include a first scan driving circuit configured to output, to the plurality of first scan lines, a first scan signal for controlling a timing at which the data voltage is inputted to the plurality of pixels. The one frame period may include: a data writing cycle in which the first scan driving circuit outputs the first scan signal having a turn-on level to the plurality of first scan lines, the data voltage is inputted to the plurality of pixels, and the light emitting element emits light based on the data voltage inputted to the plurality of pixels; and a hold cycle in which the light emitting element emits light based on the data voltage inputted to the plurality of pixels in the data writing cycle.

In the case where the number of hold cycles increases to a preset number or more between two successive frames, the power supply circuit may include the voltage level of the bias voltage and outputs the bias voltage.

The bias voltage may have one peak voltage. The peak voltage may be a voltage level of the bias voltage to be outputted from the power supply circuit to a last hold cycle in the one frame.

As a frame is changed to another frame, the power supply circuit may reduce a voltage level increment of the bias voltage and output the bias voltage.

As a frame is changed to another frame, the power supply circuit may reduce a peak voltage of the bias voltage and output the bias voltage to the bias power line.

An embodiment of the present disclosure provides a controller including: an interface configured to receive input image data; a counter configured to compute an input cycle at which the input image data is inputted; a memory configured store information about a level of a bias voltage, information about a parameter corresponding to the level of the bias voltage, and information about a voltage increment; a processor configured to update the information about the level of the bias voltage such that the bias voltage increases by the voltage increment in the case where a present cycle is determined to be a hold cycle based on the computed input cycle; and a signal output component configured to output the parameter as a power supply circuit control signal based on the information about the level of the bias voltage stored in the memory.

The memory may further include information about a hold cycle count, information about a data writing cycle count, and initialization value information. The initialization value information may include information about the data writing cycle count having a first value greater than 2, information about the hold cycle count having a value of 0, information about the voltage level of the bias voltage that is a first peak voltage, and information about the voltage increment that is a first increment.

In the case where the present cycle is determined to be the data writing cycle, the processor may determine whether a driving operation is a low speed driving operation. In the case where the driving operation is determined to be the low speed driving operation, the processor may determine whether the information about the data writing cycle count is 0. In the case where the information about the data writing cycle count is not 0, the processor may reduce the data writing cycle count by 1 and updates the information about the data writing cycle count, reduce the voltage increment and updates the information about the voltage increment, and initialize the voltage level of the bias voltage to the first peak voltage and updates the level information of the bias voltage.

In the case where the present cycle is determined to be the hold cycle, the processor may determine whether the information about the data writing cycle count is 0. In the case where the information about the data writing cycle count is determined not to be 0, the processor may include information about the hold cycle count by 1 and store the information about the hold cycle count in the memory, update the information about the voltage level of the bias voltage such that the voltage level of the bias voltage is increased by the voltage increment, and store the information about the voltage level in the memory. The signal output component may output the power supply circuit control signal according to a value of the parameter.

An embodiment of the present disclosure may provide a method of driving a display device including a bias power line. The bias power line may be electrically connected to a plurality of pixels disposed in the display device, and at least one pixel among the plurality of pixels may include a light emitting element, and a first transistor configured to supply a driving current to the light emitting element. The bias power line may be electrically connected to a first electrode of the first transistor. The method may include: inputting an emission control signal having a turn-on level to a bias control transistor in the at least one pixel configured to switch electrical connection between the bias power line and the first transistor; inputting an emission control signal having a turn-off level to the bias control transistor, and increasing a voltage of the bias power line while the emission control signal having the turn-off level is inputted to the bias control transistor; and inputting the emission control signal having the turn-on level while the voltage of the bias power line is increased.

Inputting the emission control signal having the turn-on level to the bias control transistor, inputting the emission control signal having the turn-off level, and inputting the emission control signal having the turn-on level while the voltage of the bias power line is increased may be included in one frame period.

In one frame period, the voltage of the bias power line may sequentially increase.

The method may further include computing a frame frequency of an image to be displayed by the display device. In the case where the frame frequency is reduced, the voltage of the bias power line may be increased.

In the case where a frame starts, the voltage level of the bias power line may be sequentially increased from a preset first peak voltage.

In a first frame period, the voltage level of the bias power line may be sequentially increased from the first peak voltage by a preset first voltage increment. In a second frame period after the first frame period, the voltage level of the bias power line may be sequentially increased from the first peak voltage by a preset second voltage increment. The second voltage increment may be less than the first voltage increment.

In any one frame period, a length of a period in which the voltage level of the bias power line is maintained at the first peak voltage may not exceed a preset time. In the case where a length of the any one frame period exceeds the preset time, the voltage level of the bias power line may increase from the first peak voltage.

DETAILED DESCRIPTION

Figure 1:
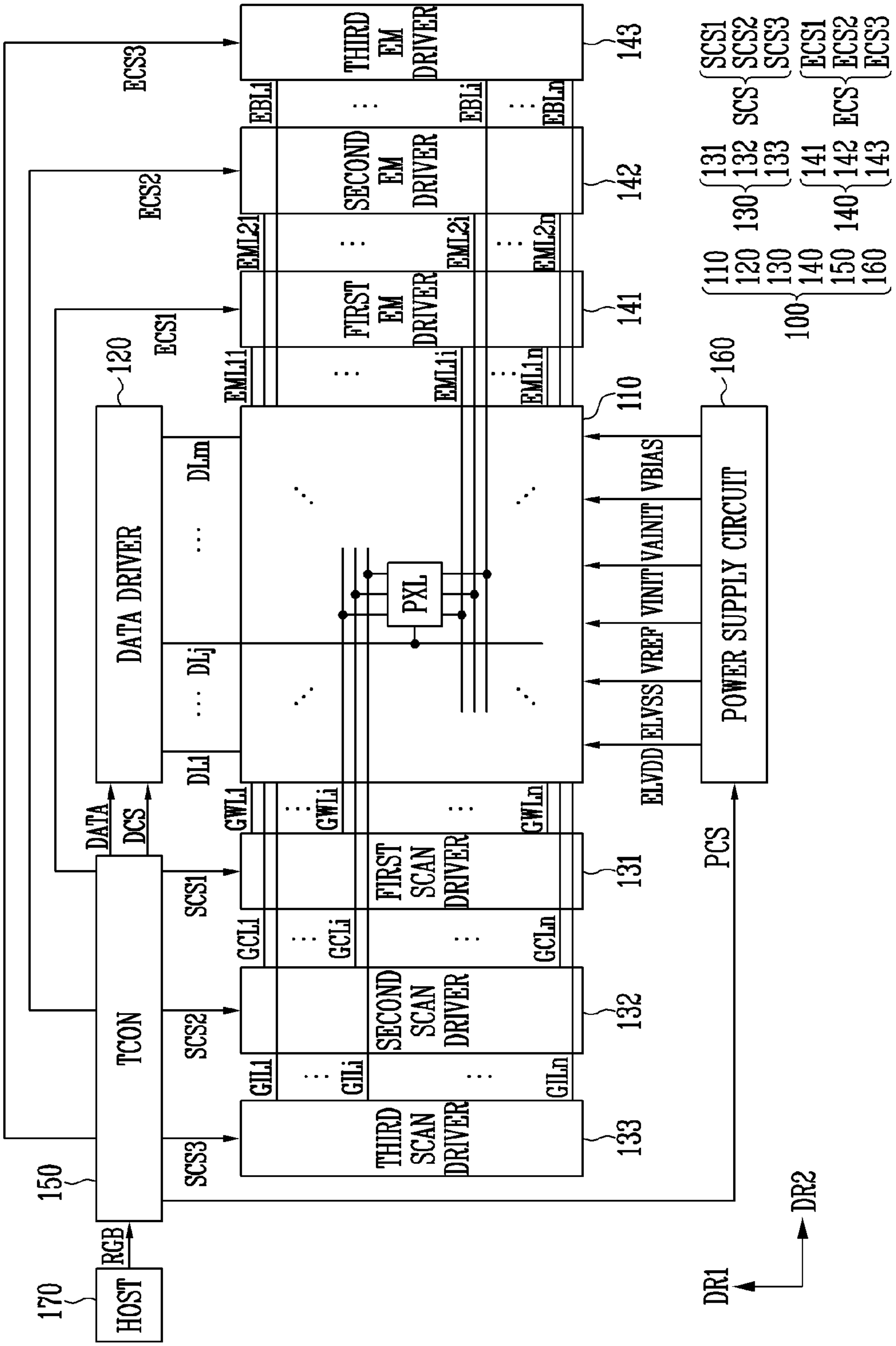
FIG. 1 is a system block diagram illustrating a display device in accordance with embodiments of the present disclosure.

Hereinafter, embodiments of the present invention will be described in detail with reference to the attached drawings, such that those skilled in the art can easily implement the present invention. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, the expression "being the same" may mean "being substantially the same". In other words, the expression "being the same" may include a range that can be tolerated by those skilled in the art. The other expressions may also be expressions from which "substantially" has been omitted.

FIG. 1 is a system block diagram illustrating a display device 100 in accordance with embodiments of the present disclosure.

Referring to FIG. 1, the display device 100 may include a display panel 110, a data driving circuit 120, a scan driving circuit 130, an emission driving circuit 140, a timing controller 150, a power supply circuit 160, and the like.

The display panel 110 may include a plurality of first scan lines GWL1, . . . , GWLn (or a plurality of first scan lines GWL1 to GWLn) (where n is an integer of 2 or more), a plurality of second scan lines GCL1, . . . , GCLn (or a plurality of second scan lines GCL1 to GCLn), a plurality of third scan lines GIL1, . . . , GILn (or a plurality of third scan lines GIL1 to GILn), a plurality of first emission control lines EML11, . . . , EML1*n* (or a plurality of first emission control lines EML11 to EML1*n*), a plurality of second emission control lines EML21, . . . , EML2*n* (or a plurality of second emission control lines EML21 to EML2*n*), a plurality of third emission control lines EBL1, . . . , EBLn (or a plurality of third emission control lines EBL1 to EBLn), a plurality of data lines DL1, . . . , DLm (where m is an integer of 2 or more) (or a plurality of data lines DL1 to DLm), and at least one pixel PXL.

Referring to FIG. 1, the pixel PXL may be electrically connected to each of the first scan line GWLi (where i is a natural number of n or less), the second scan line GCLi, the third scan line GILi, the first emission control line EML1*i*, the second emission control line EML2*i*, the third emission control line EBLi, and the data line DLj (where j is a natural number of m or less).

Two or more pixels PXL may be disposed in the display panel. The two or more pixels PXL may be arranged in a matrix type or a diamond type, and may be arranged in various other types different from the foregoing.

The plurality of data lines DL1, . . . , DLm may be disposed in the display panel 110 and extend in a first direction DR1. The first direction DR1 may be, for example, a direction in which an upper side and a lower side of the display panel 110 are connected to each other, may be, for example, a direction in which a left side and a right side of the display panel 110 are connected to each other, and may be implemented as a direction different from the foregoing. In the following description, for convenience of explanation, there is described that the first direction DR1 is the direction in which the upper side and the lower side of the display panel 110 are connected to each other, but the present disclosure is not limited thereto.

The expression "the plurality of data lines DL1, . . . , DLm are disposed to extend in the first direction DR1" may mean that the plurality of data lines DL1, . . . , DLm are disposed to generally extend from the upper side to the lower side, and may include that the plurality of data lines DL1, . . . , DLm partially extend in a direction different from the first direction DR1.

The plurality of first scan lines GWL1, . . . , GWLn, the plurality of second scan lines GCL1, . . . , GCLn, the plurality of third scan lines GIL1, . . . , GILn, the plurality of first emission control lines EML11, . . . , EML1*n*, the plurality of second emission control lines EML21, . . . , EML2*n*, and the plurality of third emission control lines EBL1, . . . , EBLn may be disposed in the display panel 110 and extend in a second direction DR2 different from the first direction DR1. The second direction DR2 may be, for example, a direction intersecting with the first direction DR1, and may be a direction perpendicular to the first direction DR1. The second direction DR2 may be, for example, a direction in which the left side and the right side of the display panel 110 are connected to each other, may be, for example, a direction in which the upper side and the lower side of the display panel 110 are connected to each other, and may be implemented as a direction different from the foregoing. In the following description, for convenience of explanation, there is described that the second direction DR2 is the direction in which the left side and the right side of the display panel 110 are connected to each other, but the present disclosure is not limited thereto.

The expression "the plurality of first scan lines GWL1, . . . , GWLn, the plurality of second scan lines GCL1, . . . , GCLn, the plurality of third scan lines GIL1, . . . , GILn, the plurality of first emission control lines EML11, . . . , EML1*n*, the plurality of second emission control lines EML21, . . . , EML2*n*, and the plurality of third emission control lines EBL1, . . . , EBLn are disposed to extend in the second direction DR2" may mean that they are disposed to generally extend from the left side of the display panel 110 to the right side, and may include that they partially extend in a direction different from the second direction DR2.

The data driving circuit 120 may be configured to drive the plurality of data lines DL1, . . . , DLm. For example, the data driving circuit 120 may generate a data voltage for displaying an image, and output the generated data voltage to the plurality of data lines DL1, . . . , DLm. The data driving circuit 120 may receive image data DATA and a data driving circuit control signal DCS from the timing controller 150, generate a data voltage, and output the generated data voltage to the plurality of data lines DL1, . . . , DLm at correct timings.

The data driving circuit control signal DCS may include a data enable signal, a vertical synchronization signal, a horizontal synchronization signal, and the like.

The scan driving circuit 130 may include a first scan driving circuit 131, a second scan driving circuit 132, and a third scan driving circuit 133. The scan driving circuit 130 may receive a scan driving circuit control signal SCS from the timing controller 150, and output a scan signal having a turn-on level or a turn-off level to the display panel 110 at correct timings. The turn-on level or the turn-off level of the scan signal may be changed depending on the type of a transistor that is electrically connected with the corresponding scan line, and the foregoing will be described in detail below with reference to FIG. 2.

The first scan driving circuit 131 may be configured to drive the plurality of first scan lines GWL1, . . . , GWLn. For example, the first scan driving circuit 131 may receive a first scan driving circuit control signal SCS1 from the timing controller 150, generate a first scan signal, and sequentially output the generated first scan signal to the plurality of first scan lines GWL1, . . . , GWLn.

The second scan driving circuit 132 may be configured to drive the plurality of second scan lines GCL1, . . . , GCLn. For example, the second scan driving circuit 132 may receive a second scan driving circuit control signal SCS2 from the timing controller 150, generate a second scan signal, and sequentially output the generated second scan signal to the plurality of second scan lines GCL1, . . . , GCLn.

The third scan driving circuit 133 may be configured to drive the plurality of third scan lines GIL1, . . . , GILn. For example, the third scan driving circuit 133 may receive a third scan driving circuit control signal SCS3 from the timing controller 150, generate a third scan signal, and sequentially output the generated third scan signal to the plurality of third scan lines GIL1, . . . , GILn.

The emission driving circuit 140 may include a first emission driving circuit 141, a second emission driving circuit 142, and a third emission driving circuit 143. The emission driving circuit 140 may receive an emission driving circuit control signal ECS from the timing controller 150, and output an emission control signal having a turn-on level or a turn-off level to the display panel 110 at correct timings. The turn-on level or the turn-off level of the emission control signal may be changed depending on the type of a transistor that is electrically connected with the corresponding emission control line, and the foregoing will be described in detail below with reference to FIG. 2.

The first emission driving circuit 141 may be configured to drive the plurality of first emission control lines EML11, . . . , EML1*n*. For example, the first emission driving circuit 141 may receive a first emission driving circuit control signal ECS1 from the timing controller 150, generate a first emission control signal, and sequentially output the generated first emission control signal to the plurality of first emission control lines EML11, . . . , EML1*n*.

The second emission driving circuit 142 may be configured to drive the plurality of second emission control lines EML21, . . . , EML2*n*. For example, the second emission driving circuit 142 may receive a second emission driving circuit control signal ECS2 from the timing controller 150, generate a second emission control signal, and sequentially output the generated second emission control signal to the plurality of second emission control lines EML21, . . . , EML2*n*.

The third emission driving circuit 143 may be configured to drive the plurality of third emission control lines EBL1, . . . , EBLn. For example, the third emission driving circuit 143 may receive a third emission driving circuit control signal ECS3 from the timing controller 150, generate a third emission control signal, and sequentially output the generated third emission control signal to the plurality of third emission control lines EBL1, . . . , EBLn.

The timing controller 150 may receive input image data RGB from a host system 170. The host system 170 may be disposed at the outside of the display device 100. The timing controller 150 may convert the input image data RGB to image data DATA in response to a preset interface, and transmit the image data DATA to the data driving circuit 120. The preset interface may be, for example, a low voltage differential signal ("LVDS") interface, a serial peripheral interface ("SPI"), I2C, or an embedded display port ("eDP").

The timing controller 150 may generate the image data DATA, taking into account arrangement of a plurality of pixels PXL disposed in the display panel 110. For example, the timing controller 150 may convert RGB-type input image data RGB to RGBG-type image data DATA and transmit the RGBG-type image data DATA to the data driving circuit 120.

The host system 170 may receive original video data corresponding to original images from an external device. The host system 170 may be, for example, an application processor ("AP"), a graphic processing unit (GPU), or the like, but the present disclosure is not limited thereto.

The data driving circuit 120 may be disposed in the display device 100, for example, as an integrated circuit ("IC"). For example, the data driving circuit 120 may be implemented as a source driver integrated circuit ("SDIC") and disposed in the display device 100.

The data driving circuit 120 may be directly disposed on a substrate which forms the display panel 110, and may be electrically connected to the display panel 110 by a connector (not illustrated) or the like. The connector may be, for example, a flexible flat cable ("FFC"), a flexible printed circuit ("FPC"), or the like.

The scan driving circuit 130 may include at least one shift register (or referred also to as a stage) to receive a scan driving circuit control signal SCS from the timing controller 150, generate a pulse-type scan signal, and output the generated scan signal toward the display panel 110. The scan driving circuit control signal SCS may include a start signal, a clock signal, and the like.

The emission driving circuit 140 may include at least one shift register to receive an emission driving circuit control signal ECS from the timing controller 150, generate a pulse-type emission control signal, and output the generated emission control signal toward the display panel 110. The emission driving circuit control signal ECS may include a start signal, a clock signal, and the like. The emission driving circuit 140 may have substantially the same circuit structure as the circuit structure of the scan driving circuit 130, but the present disclosure is not limited thereto.

The scan driving circuit 130 and the emission driving circuit 140 may be disposed on opposite sides (e.g., the left side and the right side) of the display panel 110, respectively. Depending on designs, both the scan driving circuit 130 and the emission driving circuit 140 may be disposed on one side (e.g., the left side or the right side) of the display panel 110.

The timing controller 150 may be designed as an integrated circuit (IC) and disposed in the display device 100, or may be implemented as a processor, a logic, or the like and disposed in the display device 100. The timing controller 150 may include at least one register.

Referring to FIG. 1, the display device 100 in accordance with embodiments of the present disclosure may further include a power supply circuit 160 configured to supply various power voltages to the display panel 110.

The power supply circuit 160 may supply various power voltages to drive the pixels PXL. For example, the power supply circuit 160 may supply a first power voltage ELVDD, a second power voltage ELVSS, a third power voltage VREF, a fourth power voltage VINIT, a fifth power voltage VAINIT, a sixth power voltage VBIAS, and the like to the display panel 110. Power lines (not illustrated) may be further disposed in the display panel 110 to transmit the foregoing power voltages to a plurality of pixels PXL. The first to sixth power voltages ELVDD, ELVSS, VREF, VINIT, VAINIT, and VBIAS will be described in more detail with reference to FIG. 2.

The data driving circuit 120, the scan driving circuit 130, the emission driving circuit 140, the timing controller 150, and the like are functionally distinguished from each other. In some cases, at least two components among the foregoing components may be disposed in the display device 100 in the form of a single integrated circuit IC. For example, the data driving circuit 120 and the timing controller 150 may be implemented as a single integrated circuit. For example, the emission driving circuit 140 may be included in the scan driving circuit 130.

The power supply circuit 160 may receive a power supply circuit control signal PCS from the timing controller 150 so that an operating timing of the power supply circuit 160 can be controlled.

Figure 2:
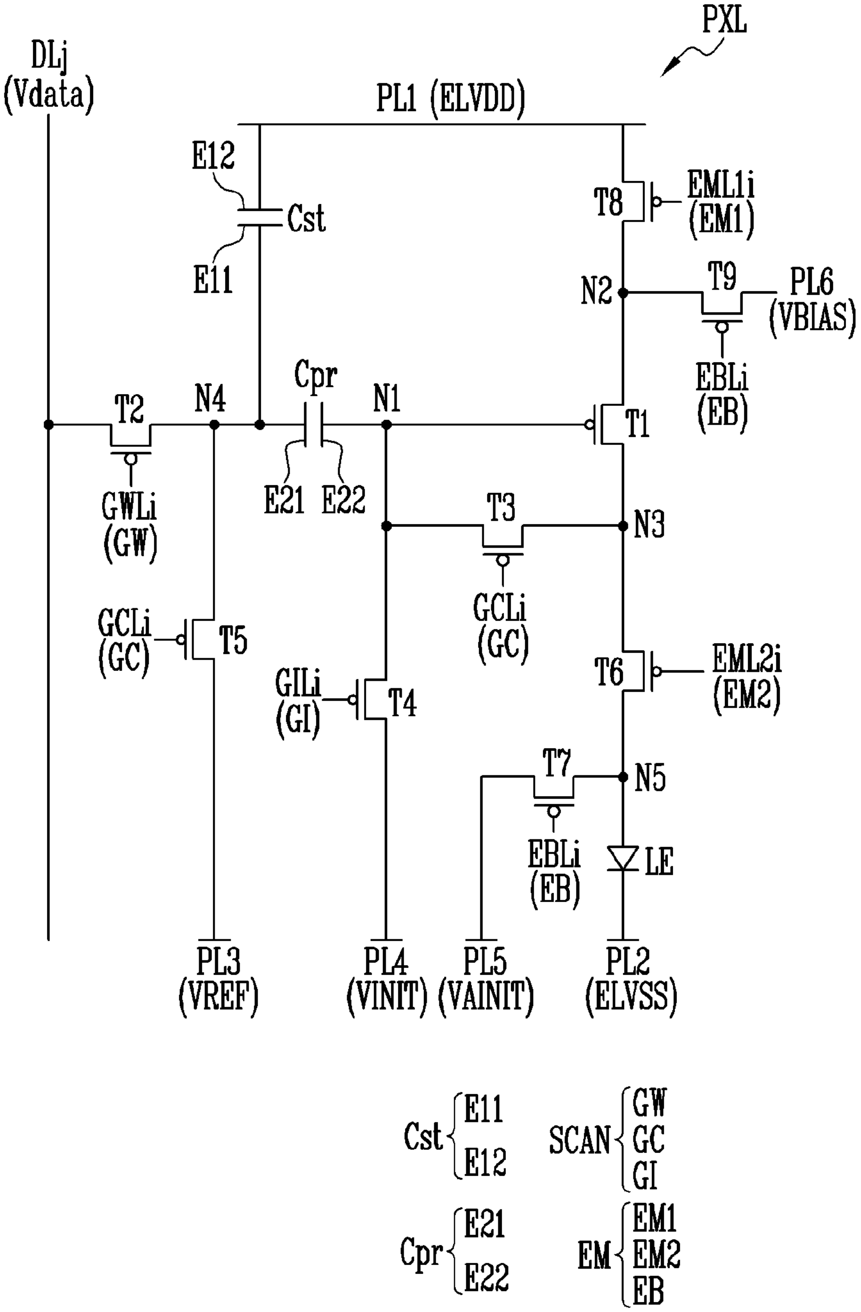
FIG. 2 illustrates an example of a pixel structure in accordance with embodiments of the present disclosure.

FIG. 2 illustrates an example of the structure of the pixel PXL in accordance with embodiments of the present disclosure.

FIG. 2 illustrates a pixel PXL disposed on an i-th pixel row and a j-th pixel column in the case where a plurality of pixels PXL are disposed in a matrix type.

Referring to FIG. 2, the pixel PXL may include a light emitting element LE and a pixel circuit (or a pixel driving circuit) configured to control the amount of current that flows to the light emitting element LE.

Referring to FIG. 2, the light emitting element LE may include a first electrode and a second electrode. The first electrode of the light emitting element LE may be electrically connected to a fifth node N5. The second electrode of the light emitting element LE may be electrically connected to a second power line PL2. The first electrode of the light emitting element LE may be an anode electrode or a cathode electrode. The second electrode of the light emitting element LE may be a cathode electrode or an anode electrode. In the following description, for convenience of explanation, it is assumed that the first electrode of the light emitting element LE is an anode electrode, and the second electrode of the light emitting element LE is a cathode electrode, but the present disclosure is not limited thereto. The light emitting element LE may emit light having a luminance corresponding to driving current provided from the pixel circuit.

The light emitting element LE may be an inorganic light emitting diode including an inorganic emission layer. The light emitting element LE may be an organic light emitting diode including an organic emission layer. The light emitting element LE may include GaN- or AlGaInP-based inorganic material, and may be formed of an inorganic light emitting diode such as a micro light emitting diode ("LED"), or a quantum dot light emitting diode. The light emitting element LE may be formed of a light emitting diode formed of a combination of organic material and inorganic material. Although FIG. 2 illustrates that the pixel PXL includes a single light emitting element LE, the pixel PXL may include a plurality of light emitting elements. The plurality of light emitting elements may be connected in series, parallel or series-parallel to each other.

The second power line PL2 may be a line to which the second power voltage ELVSS is to be applied. The second power voltage ELVSS may be a low potential voltage compared to the first power voltage ELVDD. The second power voltage ELVSS may be a base voltage.

The pixel circuit in accordance with embodiments of the present disclosure may include two or more transistors and at least one capacitor.

The pixel circuit in accordance with embodiments of the present disclosure may include, for example, first to ninth transistors T1, . . . , T9 (or first to ninth transistor T1 to T9), and first and second capacitors Cst and Cpr. The pixel circuit may generate driving current to be supplied to the light emitting element LE.

At least one transistor of the first to ninth transistors T1, . . . , T9 may be implemented as a P-type thin-film transistor including a P-type semiconductor. In some cases, at least one transistor of the first to ninth transistors T1, . . . , T9 may be implemented as an N-type thin-film transistor including an N-type semiconductor.

In the case of the P-type thin-film transistor, a turn-on level may correspond to a low-level voltage, and a turn-off level may correspond to a high-level voltage. In the case of the N-type thin-film transistor, a turn-on level may correspond to a high-level voltage, and a turn-off level may correspond to a low-level voltage.

Referring to FIG. 2, although for convenience of explanation there is illustrated the case where the first to ninth transistors T1, . . . , T9 of the pixel PXL in accordance with embodiments of the present disclosure are implemented as P-type thin-film transistors, the present disclosure is not limited thereto, and at least one transistor of the first to ninth transistors T1, . . . , T9 may be implemented as an N-type thin-film transistor.

At least one transistor of the first to ninth transistors T1, . . . , T9 may include a poly-silicon semiconductor. In some cases, at least one transistor of the first to ninth transistors T1, . . . , T9 may include a single-crystal silicon semiconductor, an oxide semiconductor, an amorphous silicon semiconductor, or the like.

The first transistor T1 may include a gate electrode, a first electrode, and a second electrode. The first transistor T1 may include a first node N1 electrically connected to the gate electrode, a second node N2 through which the first electrode is electrically connected to a first power line PL1, and a third node N3 through which the second electrode is electrically connected to the light emitting element LE. The first transistor T1 may also be referred to as a "driving transistor." The first electrode of the first transistor T1 may be any one of a source electrode and a drain electrode. The second electrode of the first transistor T1 may be a remaining one of the source electrode and the drain electrode. For example, the first electrode may be a source electrode, and the second electrode may be a drain electrode. The first transistor T1 may control the amount of driving current that flows to the light emitting element LE, in response to a difference between a voltage of the source electrode and a voltage of the gate electrode.

The first power line PL1 may be a line to which the first power voltage ELVDD is to be applied. The first power voltage ELVDD may be a high potential voltage compared to the second power voltage ELVSS. The difference in voltage between the first power voltage ELVDD and the second power voltage ELVSS may be greater than a threshold voltage of the light emitting element LE.

The second transistor T2 may be configured to switch electrical connection between the data line DLj and a fourth node N4. A gate electrode of the second transistor T2 may be electrically connected to a first scan signal line GWLi. An operating timing of the second transistor T2 may be controlled by a first scan signal GW. If the second transistor T2 is turned on, a data voltage Vdata applied to the data line DLj may be transmitted to the fourth node N4. The second transistor T2 may transmit a voltage corresponding to the data voltage Vdata to the gate electrode (or the first node N1)

of the first transistor T1. The second transistor T2 may also be referred to as a "scan transistor."

The third transistor T3 may be configured to switch electrical connection between the first node N1 and the third node N3 of the first transistor T1. An operating timing of the third transistor T3 may be controlled by a second scan signal GC. For example, a gate electrode of the third transistor T3 may be electrically connected to an i-th second scan line GCLi. If the third transistor T3 is turned on, the first node N1 and the third node N3 of the first transistor T1 may be electrically connected to each other. If the third transistor T3 is turned on, the first transistor T1 may be turned on in the form of a diode, and a voltage corresponding to a difference between a voltage of the second node N2 (e.g., the first power voltage ELVDD) and the threshold voltage of the first transistor T1 may be sampled on the first node N1 of the first transistor T1. As described above, the third transistor T3 may function to compensate for a change in characteristics (e.g., the threshold voltage) of the first transistor T1. The third transistor T3 may also be referred to as a "compensation transistor."

The fourth transistor T4 may be configured to switch electrical connection between the first node N1 of the first transistor T1 and a fourth power line PL4. A gate electrode of the fourth transistor T4 may be electrically connected to the third scan line GILi. An operating timing of the fourth transistor T4 may be controlled by a third scan signal GI. If the fourth transistor T4 is turned on, the fourth power voltage VINT is applied to the gate electrode of the first transistor T1. The fourth power voltage VINIT may also be referred to as a "first initialization voltage." The fourth transistor T4 may also be referred to as a "first initialization transistor." If the fourth transistor T4 is turned on, a voltage to be applied to the gate electrode of the first transistor T1 may be initialized to the fourth power voltage VINIT.

The fifth transistor T5 may be configured to switch electrical connection between the fourth node N4 and a third power line PL3. An operating timing of the fifth transistor T5 may be controlled by a second scan signal GC. For example, a gate electrode of the fifth transistor T5 may be electrically connected to the i-th second scan line GCLi. If the fifth transistor T5 is turned on, the third power voltage VREF is applied to the fourth node N4. The third power voltage VREF may also be referred to as a "reference voltage."

The first capacitor Cst may include a first electrode E11 which is electrically connected to the fourth node N4, and a second electrode E12 which is electrically connected to the first power line PL1. The second electrode E12 of the first capacitor Cst is connected to the first power line PL1 and supplied with a constant voltage, so that the first capacitor Cst may store a voltage applied to the fourth node N4. The first capacitor Cst may also be referred to as a "storage capacitor."

The second capacitor Cpr may include a first electrode E21 which is electrically connected to the fourth node N4, and a second electrode E22 which is electrically connected to the first node N1 of the first transistor T1. As such, the second capacitor Cpr is further disposed between the fourth node N4 and the first node N1 of the first transistor T1. Hence, even if the voltage of the first node N1 of the first transistor T1 fluctuates, the fluctuation of the voltage of the first node N1 may not be reflected in the first electrode E11 of the first capacitor Cst. Therefore, as will be described below, a data write period and a threshold voltage compensation period of the first transistor T1 may be separated from each other. Thereby, the display device may embody high resolution and excellent display quality. The second capacitor Cpr may also be referred to as a "hold capacitor."

The sixth transistor T6 may be configured to switch electrical connection between the third node N3 of the first transistor T1 and the light emitting element LE. The sixth transistor T6 may be electrically connected to the first electrode of the light emitting element LE on the fifth node N5. A gate electrode of the sixth transistor T6 may be electrically connected to the second emission control line EML2*i*. An operating timing of the sixth transistor T6 may be controlled by a second emission control signal EM2. If the sixth transistor T6 is turned on, driving current can flow to the light emitting element LE. The sixth transistor T6 may also be referred to as a "second emission control transistor."

The seventh transistor T7 may be configured to switch electrical connection between the first electrode of the light emitting element LE and a fifth power line PL5. The seventh transistor T7 may be electrically connected to the first electrode of the light emitting element LE on the fifth node N5. An operating timing of the seventh transistor T7 may be controlled by a third emission control signal EB. For example, a gate electrode of the seventh transistor T7 may be electrically connected to the i-th third emission control line EBLi. If the seventh transistor T7 is turned on, the fifth power voltage VAINIT is applied to the first electrode of the light emitting element LE. The seventh transistor T7 may also be referred to as a second initialization transistor (or an "anode reset transistor").

The fifth power line PL5 is a line to which the fifth power voltage VAINIT is to be applied. The fifth power voltage VAINIT may be a voltage for initializing a voltage to be applied to the first electrode (e.g., the anode electrode) of the light emitting element LE. The fifth power voltage VAINIT may also be referred to as a "second initialization voltage." A voltage level of the fifth power voltage VAINIT may be set to a value close to the second power voltage ELVSS, and the value may be changed depending on designs. The voltage level of the fifth power voltage VAINIT may be identical to or different from the voltage level of the fourth power voltage VINIT.

The eighth transistor T8 may be configured to switch electrical connection between the first power line PL1 and the second node N2 of the first transistor T1. A gate electrode of the eighth transistor T8 may be electrically connected to the first emission control line EML1*i*. An operating timing of the eighth transistor T8 may be controlled by a first emission control signal EM1. If the eighth transistor T8 is turned on, the first power voltage ELVDD may be applied to the second node N2 of the first transistor T1. The eighth transistor T8 may also be referred to as a "first emission control transistor."

The ninth transistor T9 may be configured to switch electrical connection between the second node N2 of the first transistor T1 and a sixth power line PL6. An operating timing of the ninth transistor T9 may be controlled by a third emission control signal EB. For example, a gate electrode of the ninth transistor T9 may be electrically connected to the i-th third emission control line EBLi. If the ninth transistor T9 is turned on, the sixth power voltage VBIAS may be applied to the second node N2 of the first transistor T1. The ninth transistor T9 may also be referred to as a "bias control transistor," and the third emission control signal EB may also be referred to as a "bias control signal."

The sixth power line PL6 may be a line to which the sixth power voltage VBIAS is to be applied. The sixth power voltage VBIAS may be a "bias voltage" to be applied to the first transistor T1, and may be defined as a voltage for mitigating hysteresis of the first transistor T1. The sixth power line PL6 may be electrically connected to the pixel PXL. The sixth power line PL6 may transmit the sixth power voltage VBIAS to the pixel PXL. A change in transmission characteristics of the first transistor T1 may be mitigated by the sixth power voltage VBIAS. The sixth power line PL6 may also be referred to as a "bias power line."

If the sixth power voltage VBIAS is periodically applied to the first transistor T1, the hysteresis of the first transistor T1 may be mitigated. Hence, a phenomenon in which the threshold voltage of the first transistor T1 is shifted during an emission period may be mitigated by adjusting the transmission characteristics of the first transistor T1 such that the first transistor T1 has specific voltage-current characteristics. Therefore, a phenomenon in which the driving current that flows to the light emitting element LE during the emission period is changed can be minimized, so that visibility improvement effect can be obtained in terms of the display device 100 (refer to FIG. 1).

Referring to FIG. 2, a scan signal SCAN may include a first scan signal GW, a second scan signal GC, and a third scan signal GI. An emission control signal EM may include a first emission control signal EM1, a second emission control signal EM2, and a third emission control signal EB.

Although there is illustrated the case where the third transistor T3 and the fifth transistor T5 are electrically connected to the same second scan line GCLi, the third transistor T3 and the fifth transistor T5 may be electrically connected to different second scan lines (e.g., GCLi and CGLi+6, and the like) depending on designs.

The first to ninth transistors T1, . . . , T9 may be formed of transistors having similar structures and sizes. Alternatively, at least one of the first to ninth transistors T1, . . . , T9 may be formed of a transistor having structure and size different from those of the other transistors.

At least one transistor of the first to ninth transistors T1, . . . , T9 may be implemented as a dual gate transistor (or a transistor including a plurality of sub-transistors connected in series to each other).

The foregoing structure of the pixel PXL is only illustrative, and the present disclosure is not limited thereto.

Figure 3:
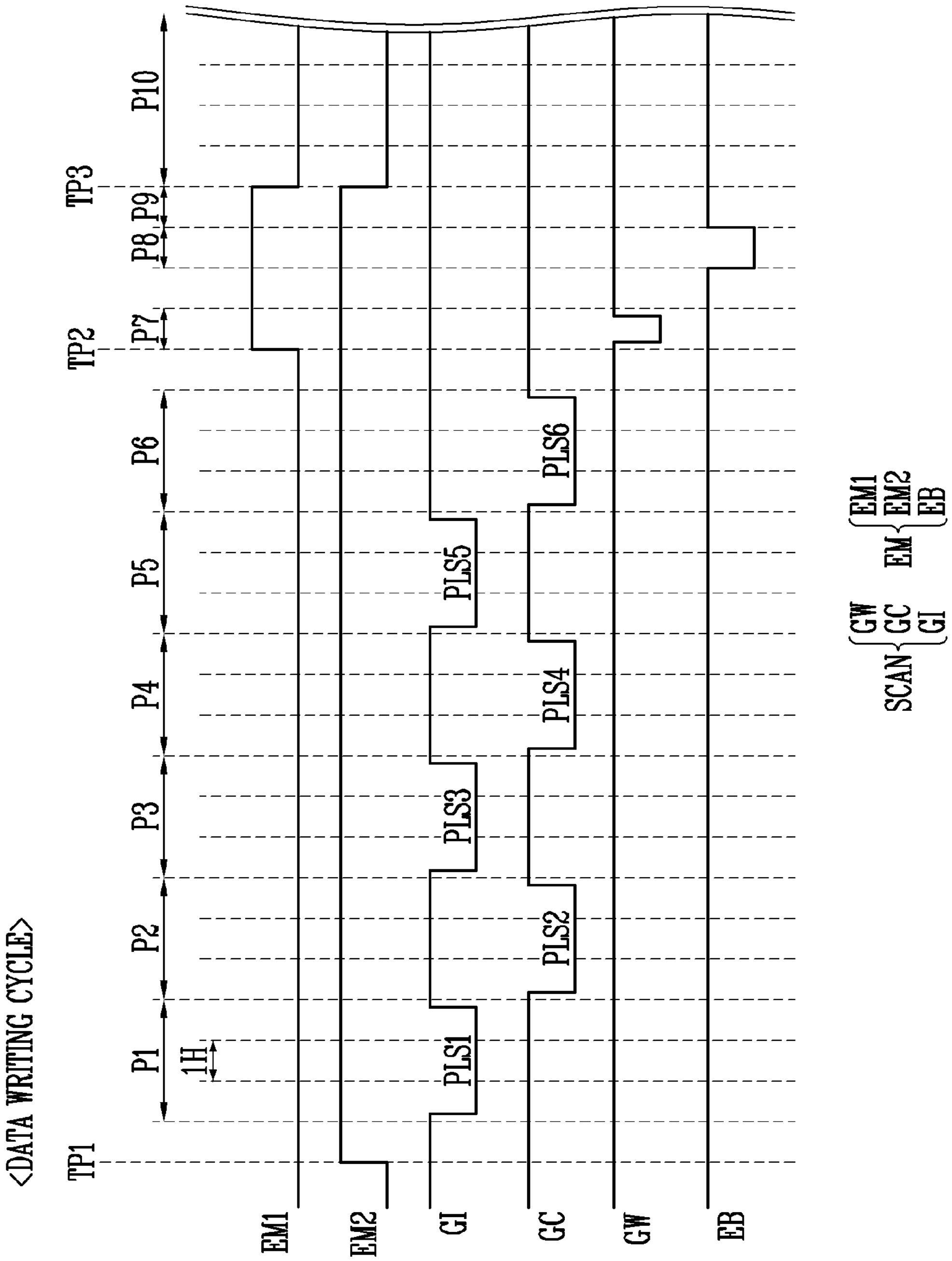
FIG. 3 illustrates an example of a timing diagram of a data writing cycle for driving the pixel of FIG. 2.

FIG. 3 illustrates an example of a timing diagram of a data writing cycle DATA WRITING CYCLE for driving the pixel PXL of FIG. 2.

FIG. 3 illustrates waveforms of a scan signal SCAN and an emission control signal EM in the data writing cycle DATA WRITING CYCLE.

Referring to FIG. 3, the data writing cycle DATA WRITING CYCLE may include first to tenth periods P1 to P10.

Here, the first to sixth periods P1, . . . , P6 (or the first to sixth period P1 to P6) are included in a period between a first time point TP1 and a second time point TP2. The period between the first time point TP1 and the second time point TP2 may be a threshold voltage compensation period of the first transistor (hereinafter, referred to simply as "threshold voltage compensation period").

The seventh to ninth periods P7, P8, and P9 may be included in a period between the second time point TP2 and a third time point TP3. The period between the second time point TP2 and the third time point TP3 may be a data writing period.

The tenth period P10 may be included in a period after the third time point TP3. The tenth period P10 may be an emission period.

A low level voltage of each of the scan signal SCAN and the emission control signal EM may correspond to a turn-on level, and a high level voltage thereof may correspond to a turn-off level.

Referring to FIG. 3, a time interval between dotted lines is indicated as one horizontal period 1H. The one horizontal period 1H may refer to a time interval between pixel rows to be sequentially scanned, or may be a time allocated to apply a data signal to one pixel row. For example, in the case where the display device 100 (refer to FIG. 1) displays an image at a frequency of 240 Hz, the one horizontal period 1H may be approximately 1.84 μs or less.

Although there is illustrated the case where each of the first to sixth periods P1, . . . P6 has a length corresponding to approximately three horizontal periods (3H), the length may have a value greater the three horizontal periods (3H) or may have a value less than the three horizontal periods (3H), depending on a driving method. Furthermore, at least one period of the first to sixth periods P1, . . . , P6 may have a length different from each of the lengths of the other periods.

Hereinafter, the first to tenth periods P1, . . . , P10 will be described in detail with reference to FIGS. 4 to 13.

Figure 4:
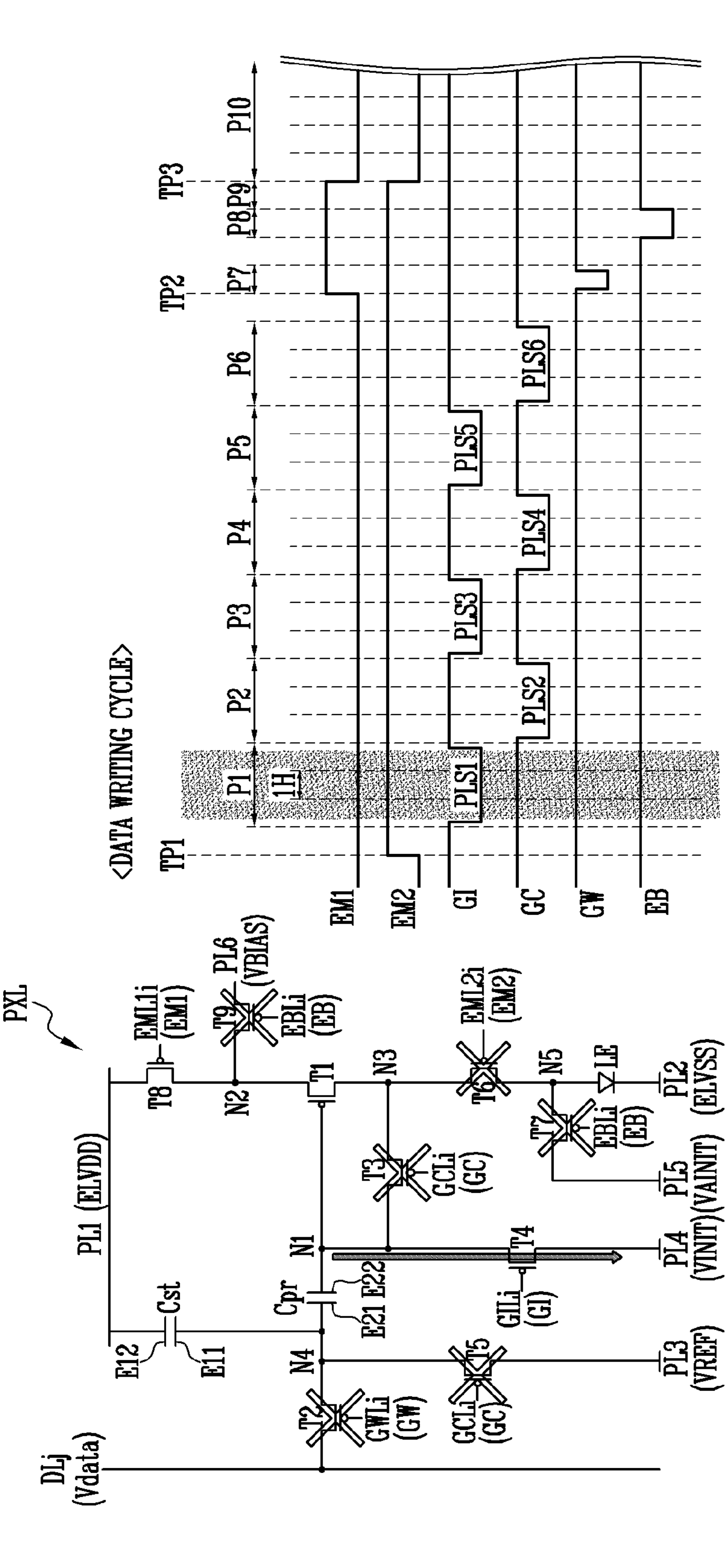
FIG. 4 is a diagram illustrating a first period of the timing diagram of FIG. 3 along with the pixel structure of FIG. 2.

FIG. 4 is a diagram illustrating the first period P1 of the timing diagram of FIG. 3 along with the structure of the pixel PXL of FIG. 2.

The first period P1 may be a period formed to initialize the voltage of the first node N1 of the first transistor T1. For example, the first period P1 may be a period for initializing the voltage of the first node N1 to the fourth power voltage VINIT.

Referring to FIG. 4, during the first period P1, a first emission control signal EM1 having a turn-on level may be inputted, and a third scan signal GI (or a third scan signal PLS1) having a turn-on level may be inputted.

During the first period P1, a second emission control signal EM2 having a turn-off level, a first scan signal GW having a turn-off level, a second scan signal GC having a turn-off level, and a third emission control signal EB having a turn-off level may be inputted.

If the first emission control signal EM1 having a turn-on level is inputted, the first power voltage ELVDD is applied to the second node N2 of the first transistor T1. If the third scan signal PLS1 having a turn-on level is inputted, the fourth power voltage VINIT is applied to the first node N1 of the first transistor T1. A data voltage Vdata of a previous frame is stored in the first capacitor Cst. The fourth node N4 that is electrically connected to the first electrode E21 of the second capacitor Cpr may float. As the first initialization voltage VINIT is applied to the first node N1, a voltage of the fourth node N4 may be slightly reduced from the data voltage Vdata of the previous frame.

Referring to FIG. 4, a length of a period in which the third scan signal GI (or the third scan signal pulse PLS1) having a turn-on level may be set to be slightly less than the first period P1 of the three horizontal periods (3H). In this case, a margin period in which a third signal GI having a turn-off level is inputted may be present before an/or after the period in which the third scan signal PLS1 having a turn-on level is inputted.

Figure 5:
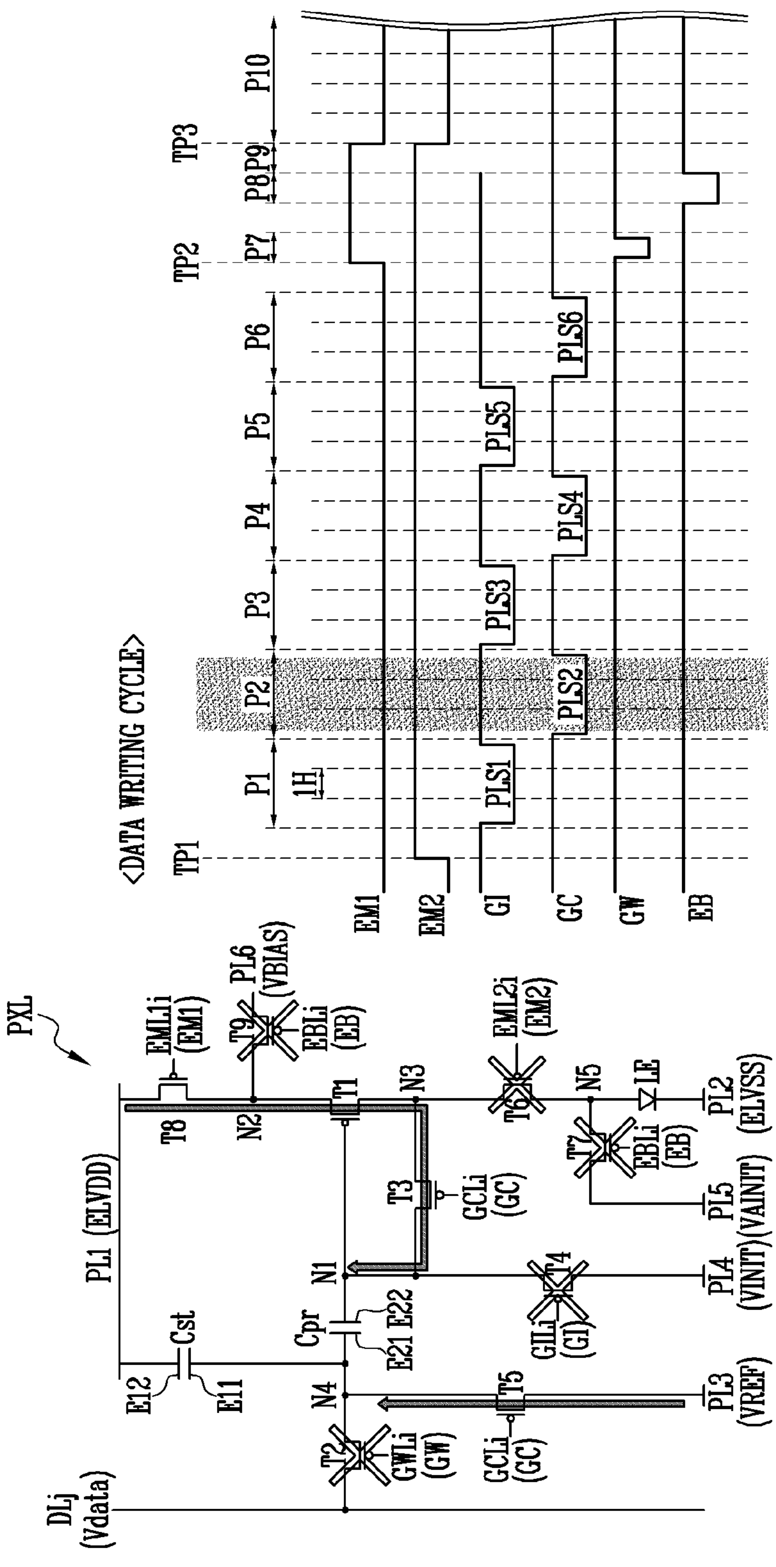
FIG. 5 is a diagram illustrating a second period of the timing diagram of FIG. 3 along with the pixel structure of FIG. 2.

FIG. 5 is a diagram illustrating the second period P2 of the timing diagram of FIG. 3 along with the structure of the pixel PXL of FIG. 2.

The second period P2 may be a period provided to compensate for a change in threshold voltage of the first transistor T1 and apply the third power voltage VREF (or the reference voltage VREF) to the fourth node N4.

Referring to FIG. 5, during the second period P2, a first emission control signal EM1 having a turn-on level may be inputted, and a second scan signal GC (or a second scan signal pulse PLS2) having a turn-on level may be inputted.

During the second period P2, a second emission control signal EM2 having a turn-off level and a third scan signal GI having a turn-off level may be inputted, a first scan signal GW having a turn-off level may be inputted, and a third emission control signal EB having a turn-off level may be inputted.

During the second period P2, the first emission control signal EM1 having a turn-on level is inputted, and the second scan signal GC (or the second scan signal pulse PLS2) having a turn-on level is inputted, so that the first node N1 and the third node N3 of the first transistor T1 may be connected in the form of a diode. Hence, a voltage corresponding to a voltage difference (i.e., ELVDD−Vth) between the first power voltage ELVDD and the threshold voltage (e.g., Vth) of the first transistor T1 may be applied to the first node N1 of the first transistor T1.

Along with the foregoing operation, the fifth transistor T5 is turned on so that the third power voltage VREF is applied to the fourth node N4. During the foregoing process, the voltage of the first node N1 of the first transistor T1 may fluctuate.

In detail, the voltage of the fourth node N4 may be changed from the data voltage Vdata of the previous frame to the third power voltage VREF. The first electrode E21 of the hold capacitor Cpr may be electrically connected to the fourth node N4. The second electrode E22 may be electrically connected to the first node N1 of the first transistor T1. The voltage of the first node N1 may also be changed by a change in voltage of the fourth node N4. Hence, during the second period P2, a voltage different from the voltage (i.e., ELVDD−Vth) corresponding to a difference between the first power voltage and the threshold voltage of the first transistor may be applied to the first node N1.

Therefore, it is desirable to perform an operation of compensating for the threshold voltage of the first transistor T1 while the voltage of the fourth node N4 is fixed to the third power voltage VREF.

Figure 6:
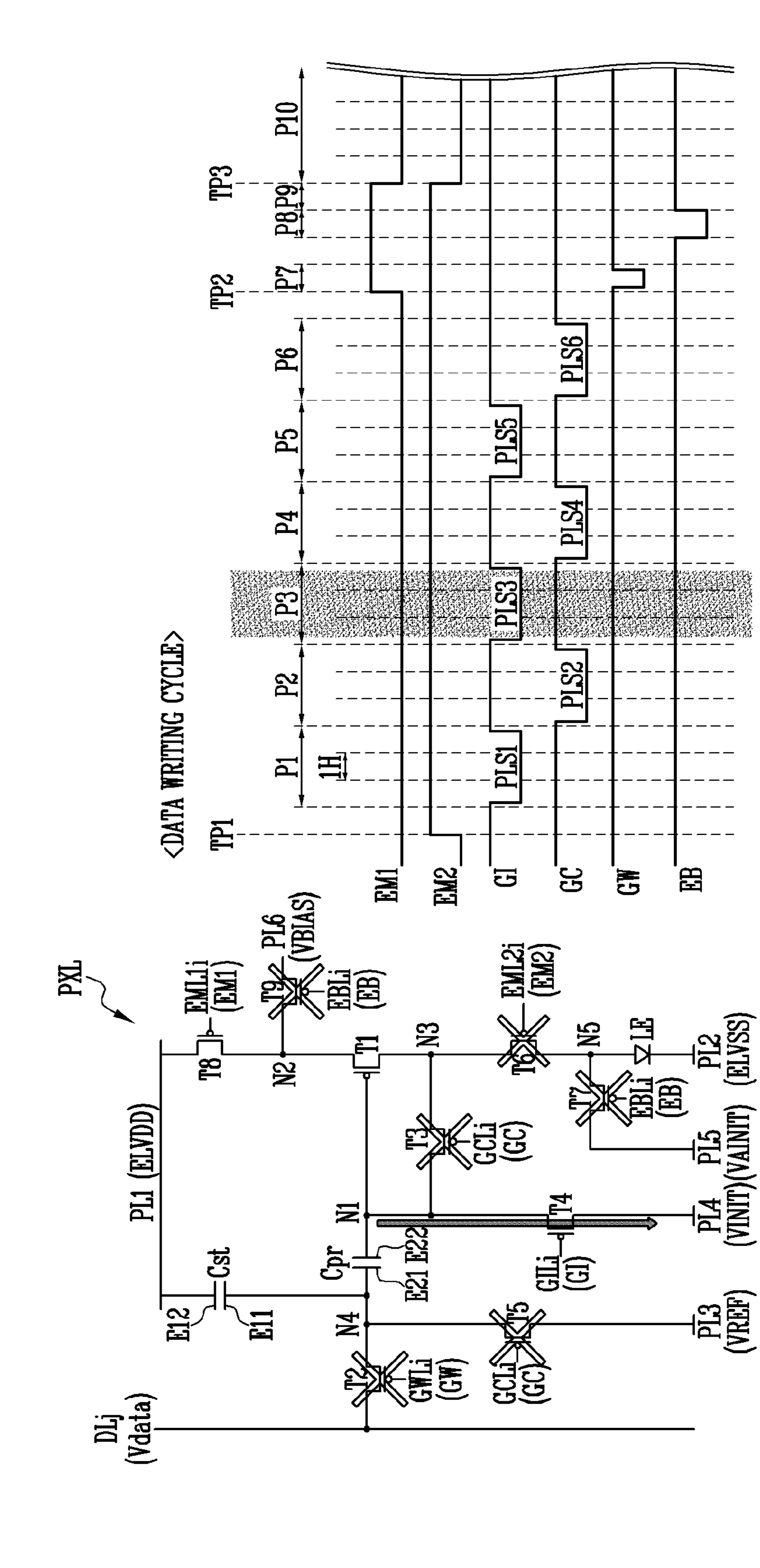
FIG. 6 is a diagram illustrating a third period of the timing diagram of FIG. 3 along with the pixel structure of FIG. 2.
Figure 7:
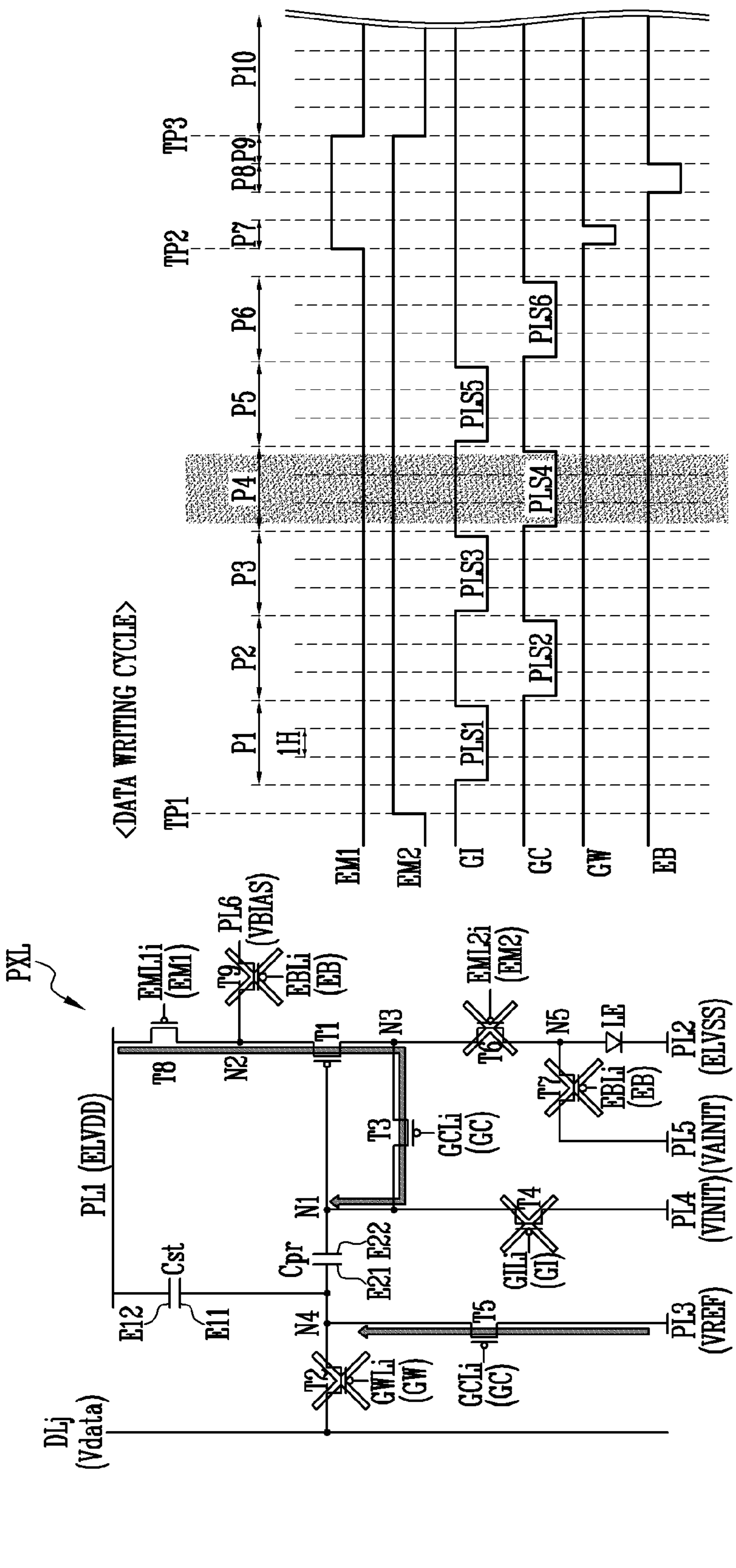
FIG. 7 is a diagram illustrating a fourth period of the timing diagram of FIG. 3 along with the pixel structure of FIG. 2.

FIG. 6 is a diagram illustrating the third period P3 of the timing diagram of FIG. 3 along with the structure of the pixel PXL of FIG. 2. FIG. 7 is a diagram illustrating the fourth period P4 of the timing diagram of FIG. 3 along with the structure of the pixel PXL of FIG. 2.

Referring to FIG. 6, during the third period P3, signals may be supplied to the pixels PXL in a manner identical or similar to that of FIG. 4 described above.

In other words, during the third period P2, a first emission control signal EM1 having a turn-on level may be inputted, and a third scan signal GI (or a third scan signal pulse PLS3) having a turn-on level may be inputted.

During the third period P3, a second emission control signal EM2 having a turn-off level, a first scan signal GW having a turn-off level, a second scan signal GC having a turn-off level, and a third emission control signal EB having a turn-off level may be inputted.

Hence, the fourth power voltage VINIT may be applied to the first node N1 of the first transistor T1.

Referring to FIG. 7, during the fourth period P4, signals may be supplied to the pixels PXL in a manner identical or similar to that of FIG. 5 described above.

In other words, during the fourth period P4, a first emission control signal EM1 having a turn-on level may be inputted, and a second scan signal GC (or a second scan signal pulse PLS4) having a turn-on level may be inputted.

During the fourth period P4, a second emission control signal EM2 having a turn-off level, a third scan signal GI having a turn-off level, a first scan signal GW having a turn-off level, and a third emission control signal EB having a turn-off level may be inputted.

Hence, the third power voltage VREF is re-applied to the fourth node N4. A voltage (i.e., ELVDD-Vth) corresponding to a difference between the first power voltage and the threshold voltage of the first transistor T1 may be applied to the first node N1 of the first transistor T1.

Because the third period P3 and the fourth period P4 are provided as described above, a change in threshold voltage of the first transistor T1 can be more accurately compensated for.

The length of the third period P3 may be set to be identical to or different from the length of the first period P1. The length of the fourth period P4 may be set to be identical to or different from the length of the second period P2.

Figure 8:
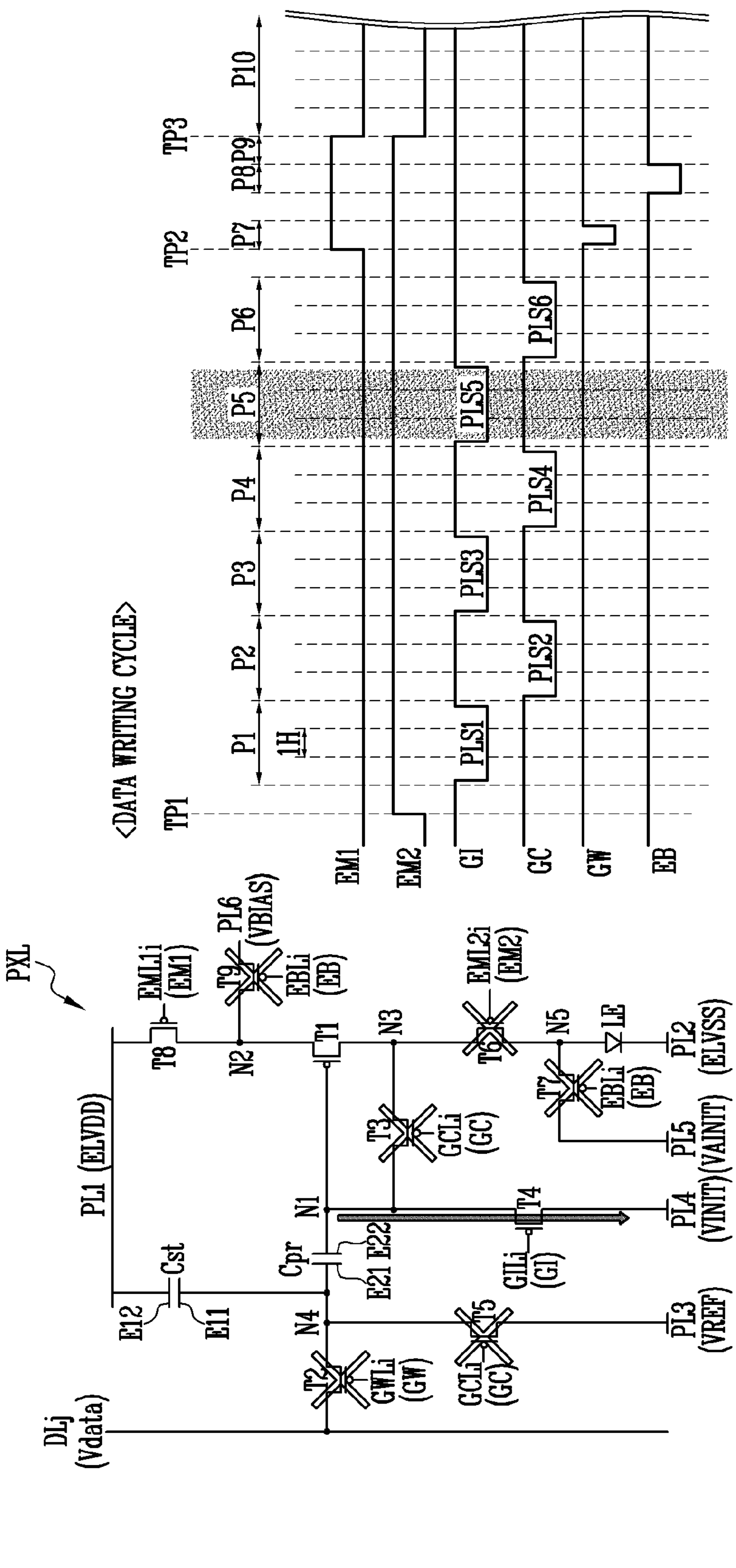
FIG. 8 is a diagram illustrating a fifth period of the timing diagram of FIG. 3 along with the pixel structure of FIG. 2.
Figure 9:
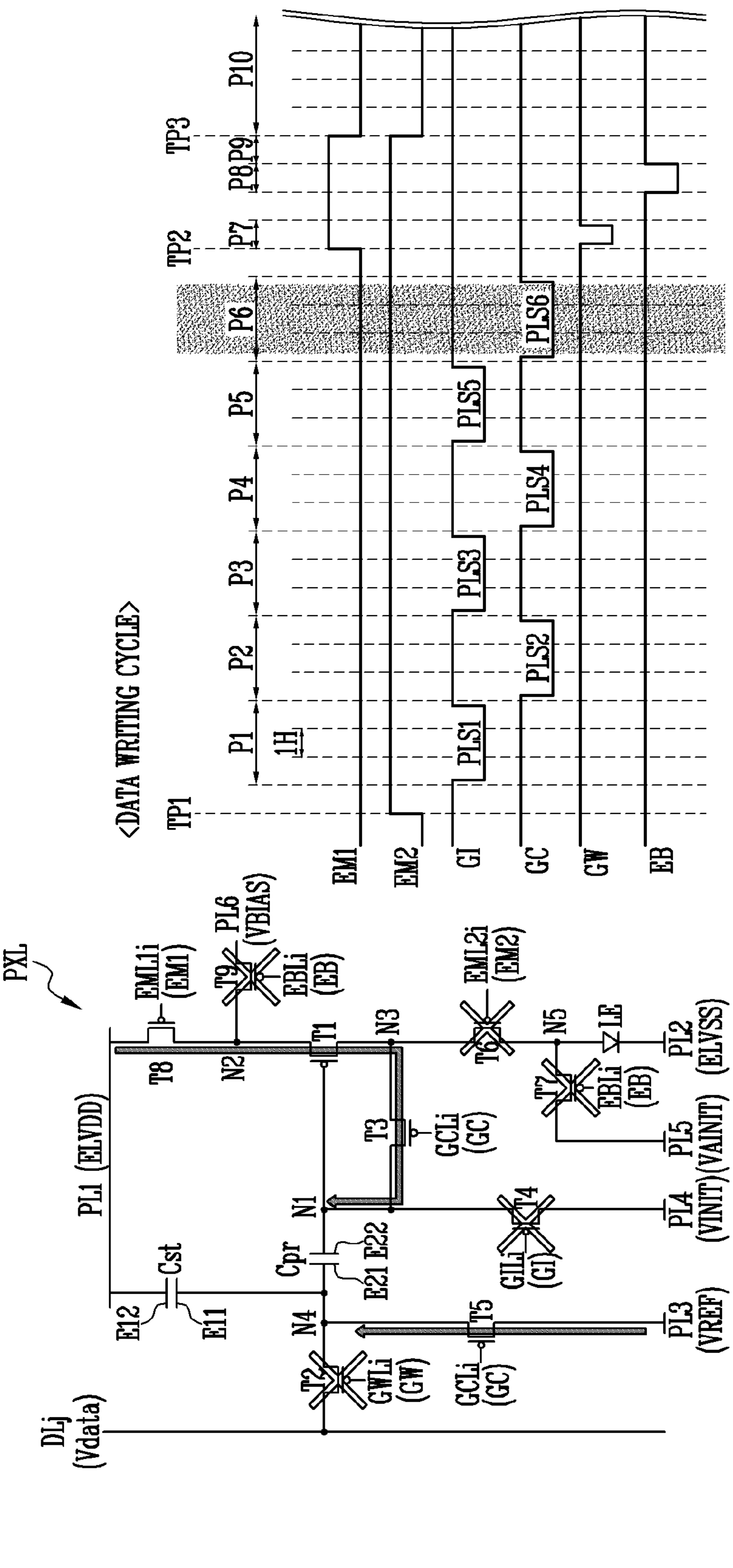
FIG. 9 is a diagram illustrating a sixth period of the timing diagram of FIG. 3 along with the pixel structure of FIG. 2.

FIG. 8 is a diagram illustrating the fifth period P5 of the timing diagram of FIG. 3 along with the structure of the pixel PXL of FIG. 2. FIG. 9 is a diagram illustrating the sixth period P6 of the timing diagram of FIG. 3 along with the structure of the pixel PXL of FIG. 2.

Referring to FIG. 8, during the fifth period P5, signals may be supplied to the pixels PXL in a manner identical or similar to the manner of FIGS. 4 and 6 described above.

In other words, during the fifth period P5, a first emission control signal EM1 having a turn-on level may be inputted, and a third scan signal GI (or a third scan signal pulse PLS5) having a turn-on level may be inputted.

During the fifth period P5, a second emission control signal EM2 having a turn-off level, a first scan signal GW having a turn-off level, a second scan signal GC having a turn-off level, and a third emission control signal EB having a turn-off level may be inputted.

Hence, the fourth power voltage VINIT may be applied to the first node N1 of the first transistor T1.

Referring to FIG. 9, during the sixth period P6, signals may be supplied to the pixels PXL in a manner identical or similar to the manner of FIGS. 5 and 7 described above.

In other words, during the sixth period P6, a first emission control signal EM1 having a turn-on level may be inputted, and a second scan signal GC (or a second scan signal pulse PLS6) having a turn-on level may be inputted.

During the sixth period P6, a second emission control signal EM2 having a turn-off level, a third scan signal GI having a turn-off level, a first scan signal GW having a turn-off level, and a third emission control signal EB having a turn-off level may be inputted.

Hence, the third power voltage VREF is re-applied to the fourth node N4. A voltage (i.e., ELVDD-Vth) corresponding to a difference between the first power voltage LVDD and the threshold voltage of the first transistor T1 may be applied to the first node N1 of the first transistor T1.

Because the fifth period P5 and the sixth period P6 are provided as described above, a change in threshold voltage of the first transistor T1 can be more accurately compensated for.

The length of the fifth period P5 may be set to be the same as the length of the first period P1 or the third period P3, or may be set to be different from the length of any one period of the first period P1 and the third period P3. The length of the sixth period P6 may be set to be the same as the length of the second period P2 or the fourth period P4, or may be set to be different from the length of any one period of the second period P2 or the fourth period P4.

In some cases, the fifth period P5 and the sixth period P6 may be omitted. In this case, the seventh period P7 may follow the fourth period P4.

The first period P1, the third period P3, and the fifth period P5 may correspond to a first node initialization operation for initializing the voltage of the first node N1 of the first transistor T1.

The second period P2, the fourth period P4, and the sixth period P6 may correspond to a threshold voltage compensation operation of substantially compensating for a change in threshold voltage of the first transistor T1.

The first node initialization operation and the threshold voltage compensation operation may be successively performed. The first node initialization operation and the threshold voltage compensation operation may be repeated two or more times.

Figure 10:
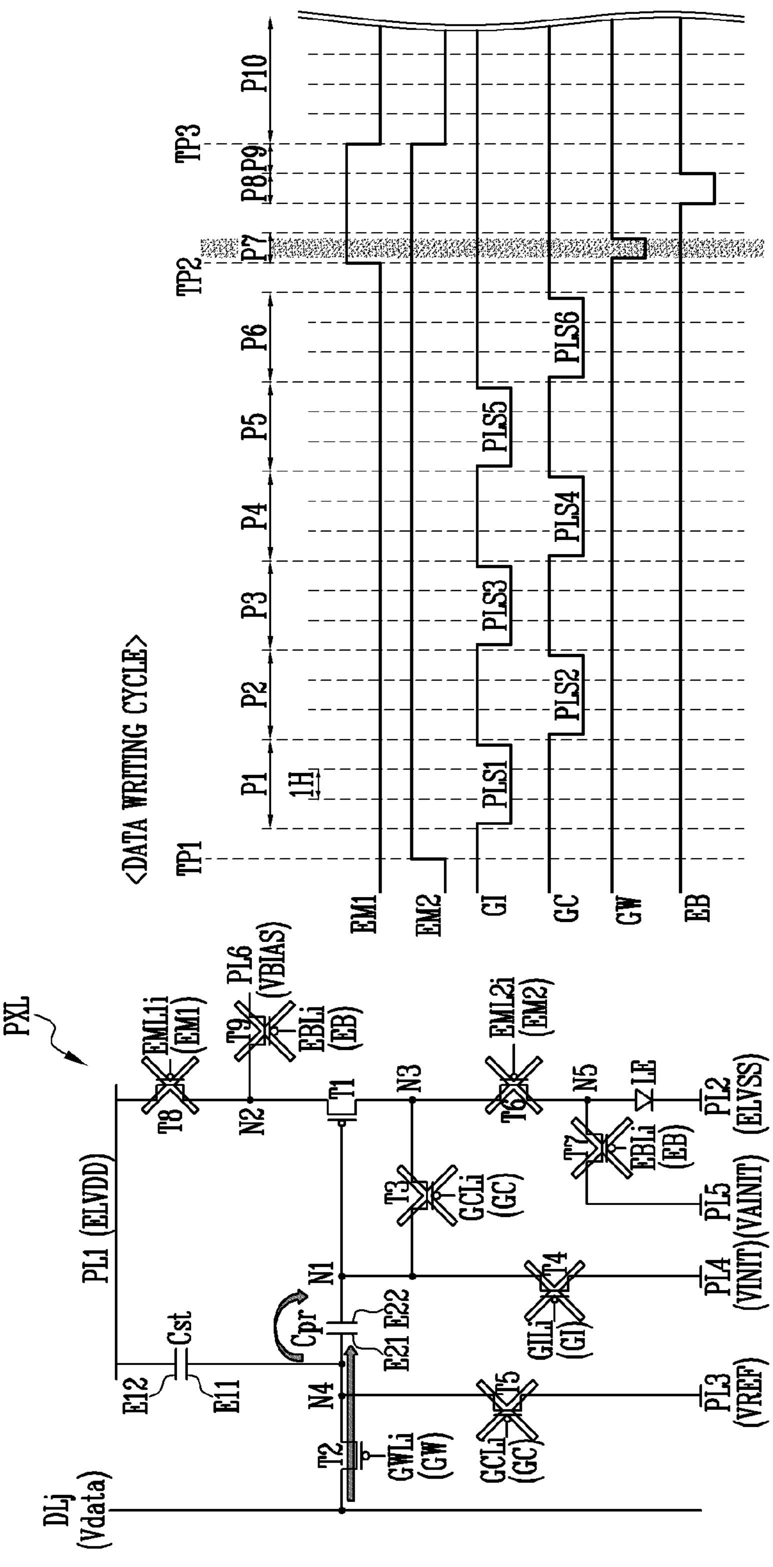
FIG. 10 is a diagram illustrating a seventh period of the timing diagram of FIG. 3 along with the pixel structure of FIG. 2.

FIG. 10 is a diagram illustrating the seventh period P7 of the timing diagram of FIG. 3 along with the structure of the pixel PXL of FIG. 2.

During the seventh period P7, a first scan signal GW having a turn-on level may be inputted. During the seventh period P7, a first emission control signal EM1 having a turn-off level, a second emission control signal EM2 having a turn-off level, a third scan signal GI having a turn-off level, a second scan signal GC having a turn-off level, and a third emission control signal EB having a turn-off level may be inputted.

If the first scan signal GW having a turn-on level is inputted, the data voltage Vdata applied to the data line DLj is applied to the fourth node N4 and stored in the first capacitor Cst.

As the voltage of the fourth node N4 changes from the third power voltage VREF to the data voltage Vdata, the voltage level of the second electrode E22 of the second capacitor Cpr changes by a change in voltage level of the first electrode E21. The foregoing may be described as a coupling phenomenon of a capacitor. Thereby, the voltage level of the second electrode E22 of the second capacitor Cpr may change by a voltage corresponding to a voltage difference (i.e., Vdata−VREF) between the data voltage Vdata and the third power voltage VREF.

Therefore, the voltage of the second electrode E22 of the second capacitor Cpr (i.e., the voltage of the first node N1; simply designated as N1 in the following equation 1) at a time point at which the seventh period P7 ends may be defined by the following equation 1:

$$N1{:}ELVDD-Vth+Vdata-VREF. \quad \text{[Equation 1]}$$

In Equation 1, ELVDD denotes the first power voltage ELVDD, Vth denotes the threshold voltage of the first transistor T1, Vdata denotes a data voltage inputted to the pixel PXL of a corresponding frame, and VREF denotes the third power voltage VREF.

Therefore, a change in the threshold voltage Vth of the first transistor T1 may be compensated for, and a voltage corresponding to the data voltage Vdata may be applied to the first node N1 of the first transistor T1.

In addition, the seventh period P7 in which the data voltage Vdata is inputted to the pixel PXL is distinguished from the first to sixth periods P1, . . . , P6 of "threshold voltage compensation period". Hence, even if the length of the seventh period P7 in which the data voltage Vdata is inputted to the pixel PXL is shortened, a sufficient length of "threshold voltage compensation period" can be secured. Thereby, a high-resolution display device 100 (refer to FIG. 1) in which a plurality of pixel rows are arranged can be embodied, so that the display device 100 may display can display an image at a high scanning rate (or frame frequency).

Figure 11:
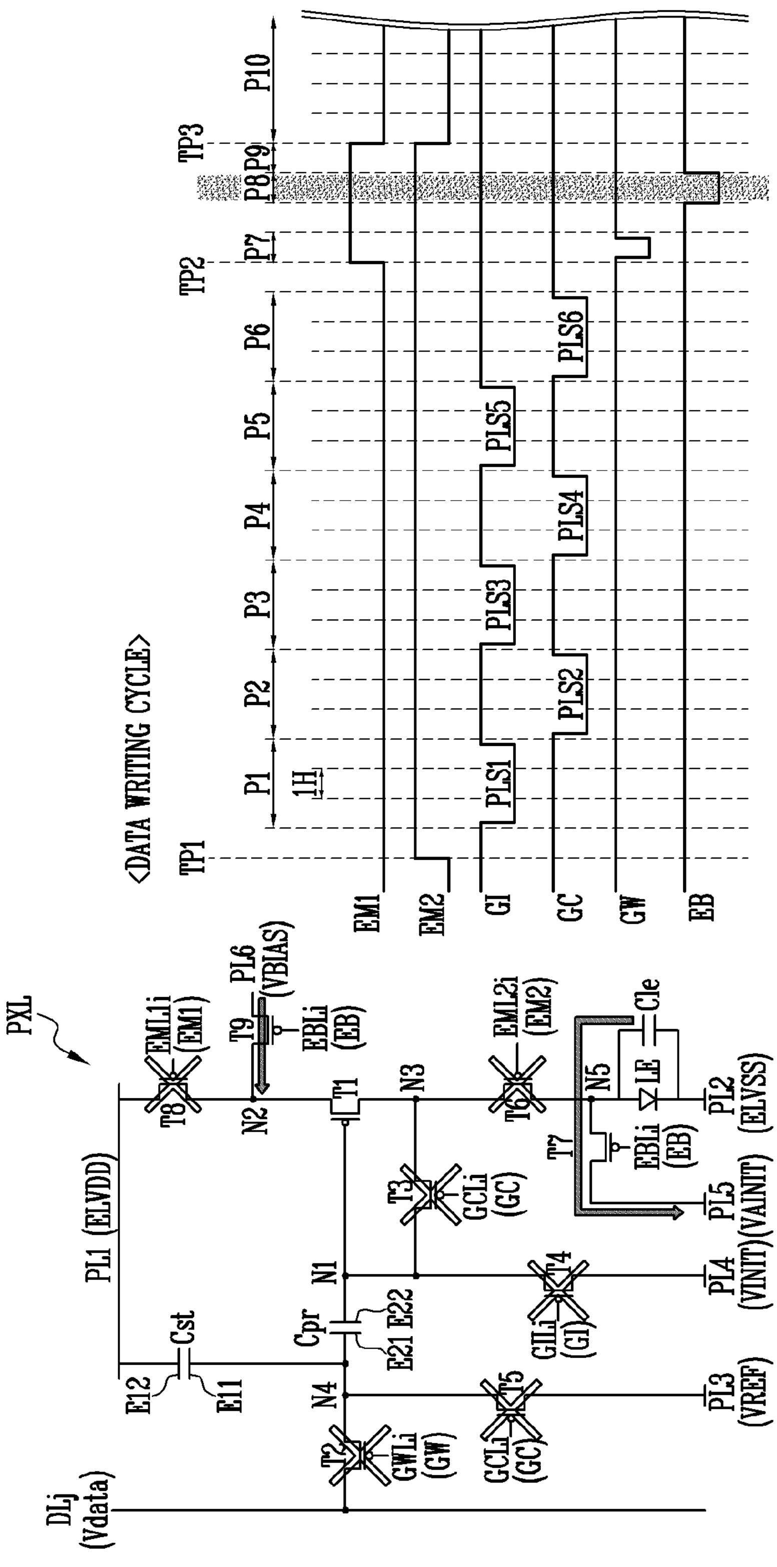
FIG. 11 is a diagram illustrating an eighth period of the timing diagram of FIG. 3 along with the pixel structure of FIG. 2.

FIG. 11 is a diagram illustrating the eighth period P8 of the timing diagram of FIG. 3 along with the structure of the pixel PXL of FIG. 2.

During the eighth period P8, a third emission control signal EB having a turn-on level may be inputted. During the eighth period P8, a first emission control signal EM1 having a turn-off level, a second emission control signal EM2 having a turn-off level, a third scan signal GI having a turn-off level, a second scan signal GC having a turn-off level, and a first scan signal GW having a turn-off level may be inputted.

As the third emission control signal EB having a turn-on level is inputted, the sixth power voltage VBIAS may be inputted to the second node N2 of the first transistor T1. Hence, the first transistor T1 may be preset to have specific voltage-current transmission characteristics.

Figure 12:
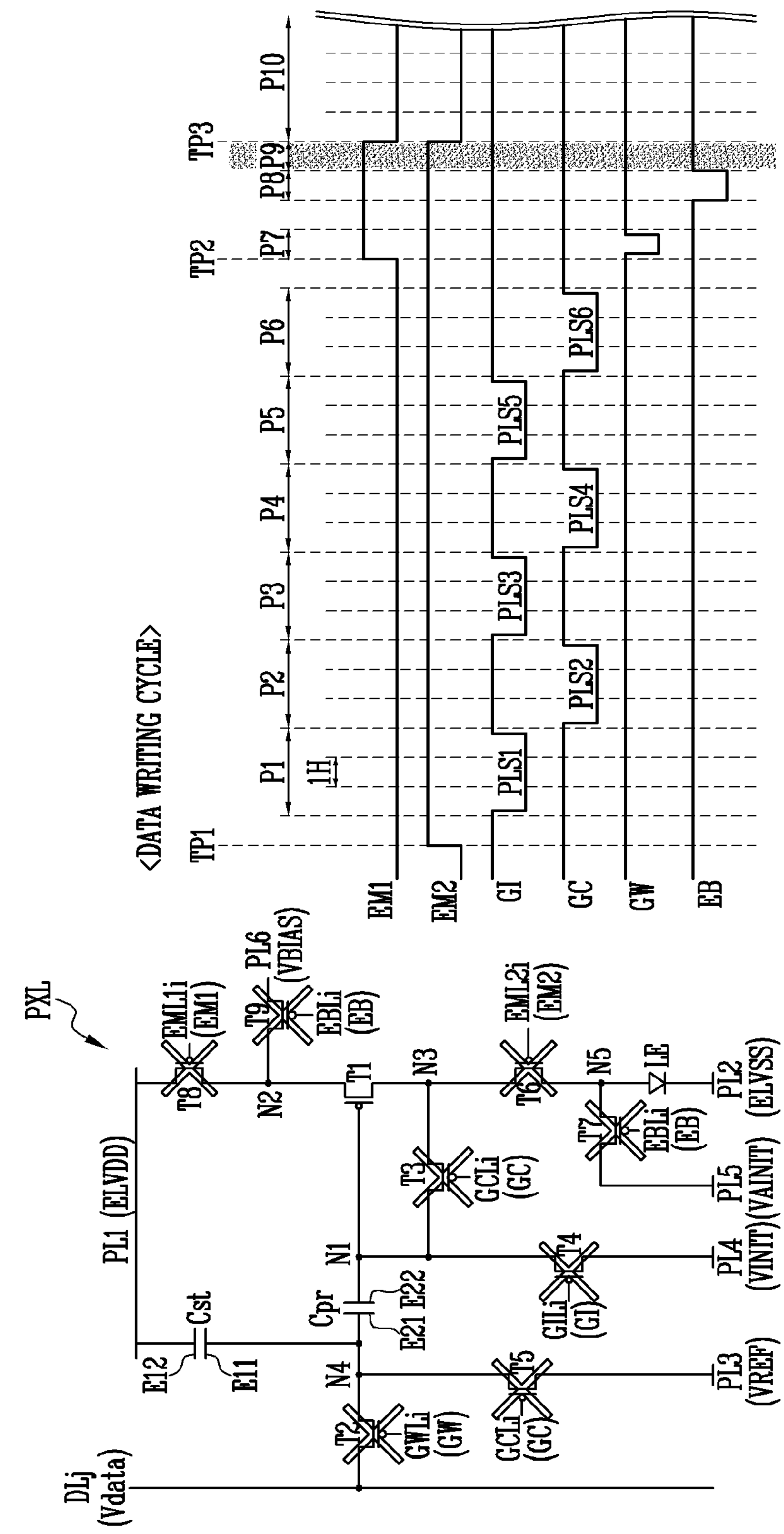
FIG. 12 is a diagram illustrating a ninth period of the timing diagram of FIG. 3 along with the pixel structure of FIG. 2.

FIG. 12 is a diagram illustrating the ninth period P9 of the timing diagram of FIG. 3 along with the structure of the pixel PXL of FIG. 2.

During the ninth period P9, a first emission control signal EM1 having a turn-off level, a second emission control signal EM2 having a turn-off level, a third scan signal GI having a turn-off level, a second scan signal GC having a turn-off level, a first scan signal GW having a turn-off level, and a third emission control signal EB having a turn-off level may be inputted.

Because the ninth period P9 is present between the eighth period P8 and the tenth period P10, a time margin can be secured between a period in which the sixth power voltage VBIAS is applied to the second node N2 of the first transistor T1 and a period in which the light emitting element LE emits light.

Figure 13:
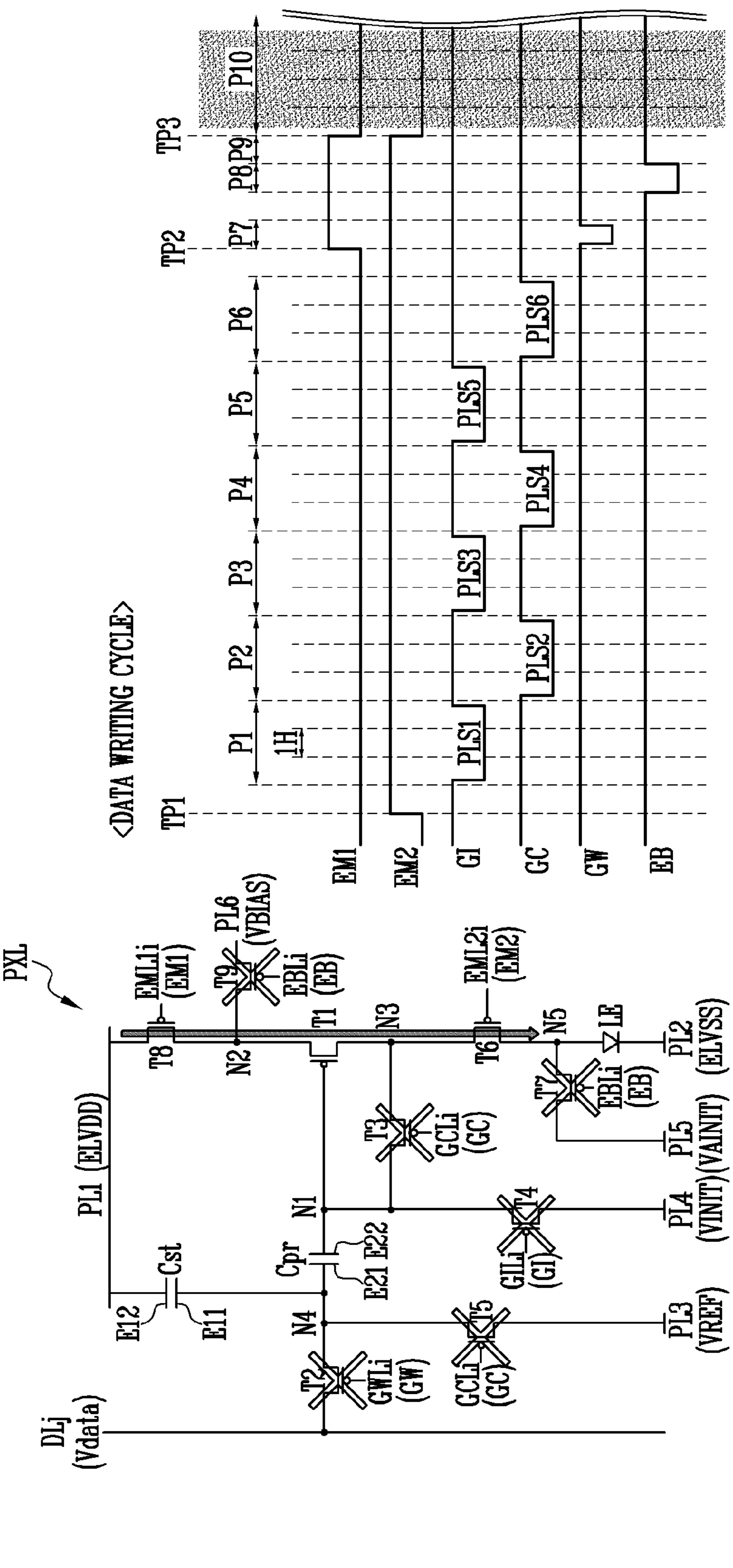
FIG. 13 is a diagram illustrating a tenth period of the timing diagram of FIG. 3 along with the pixel structure of FIG. 2.

FIG. 13 is a diagram illustrating the tenth period P10 of the timing diagram of FIG. 3 along with the structure of the pixel PXL of FIG. 2.

During the tenth period P10, a first emission control signal EM1 having a turn-on level and a second emission control signal EM2 having a turn-on level may be inputted.

During the tenth period P10, a third scan signal GI having a turn-off level, a second scan signal GC having a turn-off level, a first scan signal GW having a turn-off level, and a third emission control signal EB having a turn-off level may be inputted.

During the tenth period P10, as the first emission control signal EM1 having a turn-on level is inputted, the voltage of the second node N2 of the first transistor T1 may be changed from the sixth power voltage VBIAS to the first power voltage ELVDD.

During the tenth period P10, as the first emission control signal EM1 having a turn-on level and the second emission control signal EM2 having a turn-on level are inputted, driving current may flow to the light emitting element LE through the first transistor T1. Due to the foregoing, the tenth period P10 may also be referred to as an emission period.

During current flowing to the light emitting element LE during the tenth period P10 may be calculated by the following equation 2:

$$I_{LE} = \frac{1}{2}uCox\frac{W}{L}(Vsg - Vth)^2 - \quad \text{[Equation 2}$$

-continued $$\frac{1}{2}uCox\frac{W}{L}\left((ELVDD)-\left(\begin{matrix}ELVDD-Vth+\\Vdata-VREF\end{matrix}\right)-Vth\right)^2$$
$$=\frac{1}{2}uCox\frac{W}{L}(VREF-Vdata)^2$$

In Equation 2, "$I_{LE}$" denotes driving current flowing to the light emitting element LE, "u" denotes mobility of the first transistor T1, "Cox" denotes parasitic capacitance of the first transistor T1, "W" denotes a channel width of the first transistor T1, "L" denotes a channel length of the first transistor T1, "Vsg" denotes a voltage difference (i.e., Vs−Vg) between the source electrode and the gate electrode of the first transistor T1, and "Vth" denotes the threshold voltage of the first transistor T1.

In addition, "ELVDD" denotes the first power voltage ELVDD as the voltage of the second node N2 of the first transistor T1 (i.e., the voltage of the source node of the first transistor T1), and "ELVDD−Vth+Vdata−VREF" denotes the voltage of the first node N1 of the first transistor T1 (i.e., the voltage of the gate node of the first transistor T1).

Therefore, driving current $I_{LE}$ that flows to the light emitting element LE may not be affected by the threshold voltage Vth of the first transistor T1, so that the visibility can be improved.

The data writing cycle DATA WRITING CYCLE includes the first to tenth periods P1 to P10, so that an operation of compensating for a change in the threshold voltage Vth of the first transistor T1, a data writing operation, an emission operation, and the like may be performed.

Figure 14:
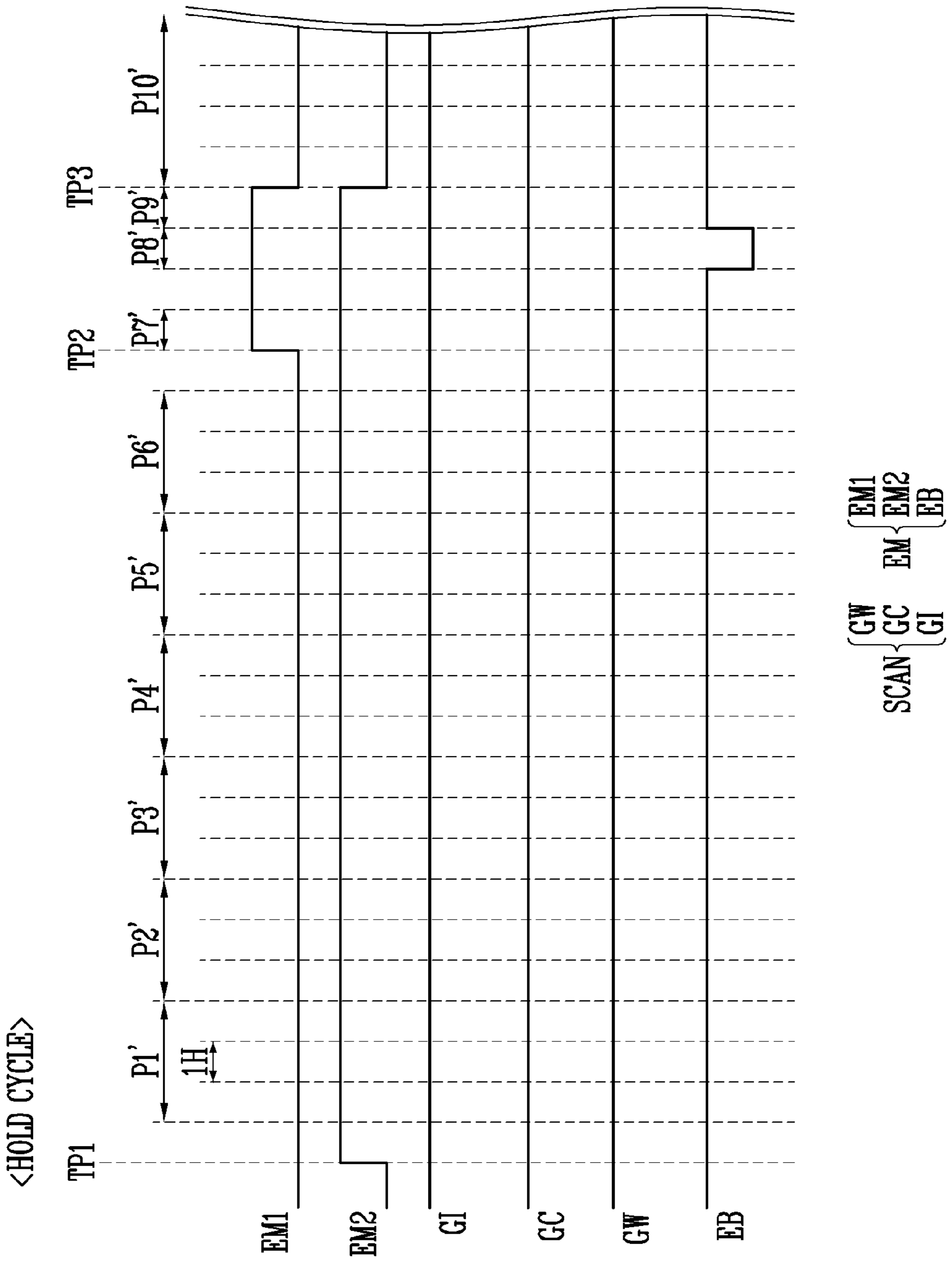
FIG. 14 illustrates an example of a timing diagram of a hold cycle for driving the pixel of FIG. 2.

FIG. 14 illustrates an example of a timing diagram of a hold cycle HOLD CYCLE for driving the pixel of FIG. 2.

The hold cycle HOLD CYCLE may be a period in which data written to the pixel during the previous data writing cycle is intactly used to emit light, so that an image can be re-displayed without changing the frame. In other words, one frame may include one data writing cycle, and one frame may include one or more hold cycles HOLD CYCLE. The one or more hold cycles HOLD CYCLE may be successively present after the data writing cycle.

Compared to the data writing cycle DATA WRITING CYCLE, in the hold cycle HOLD CYCLE, an operation of compensating for the threshold voltage of the first transistor and an operation of writing data may be omitted, and an emission operation may be performed.

A length of the hold cycle HOLD CYCLE may be the same as the length of the data writing cycle DATA WRITING CYCLE (refer to FIG. 3). In this case, the hold cycle HOLD CYCLE may include first to tenth periods P1', . . . , P10' corresponding to the first to tenth periods P1, . . . , P10 in the data writing cycle DATA WRITING CYCLE. The first to sixth periods P1, . . . , P6' may be present between a first time point TP1 and a second time point TP2. The seventh to ninth periods P7', P8', and P9' may be present between the second time point TP2 and a third time point TP3. The tenth period P10' may be present after the third time point TP3.

Figure 15:
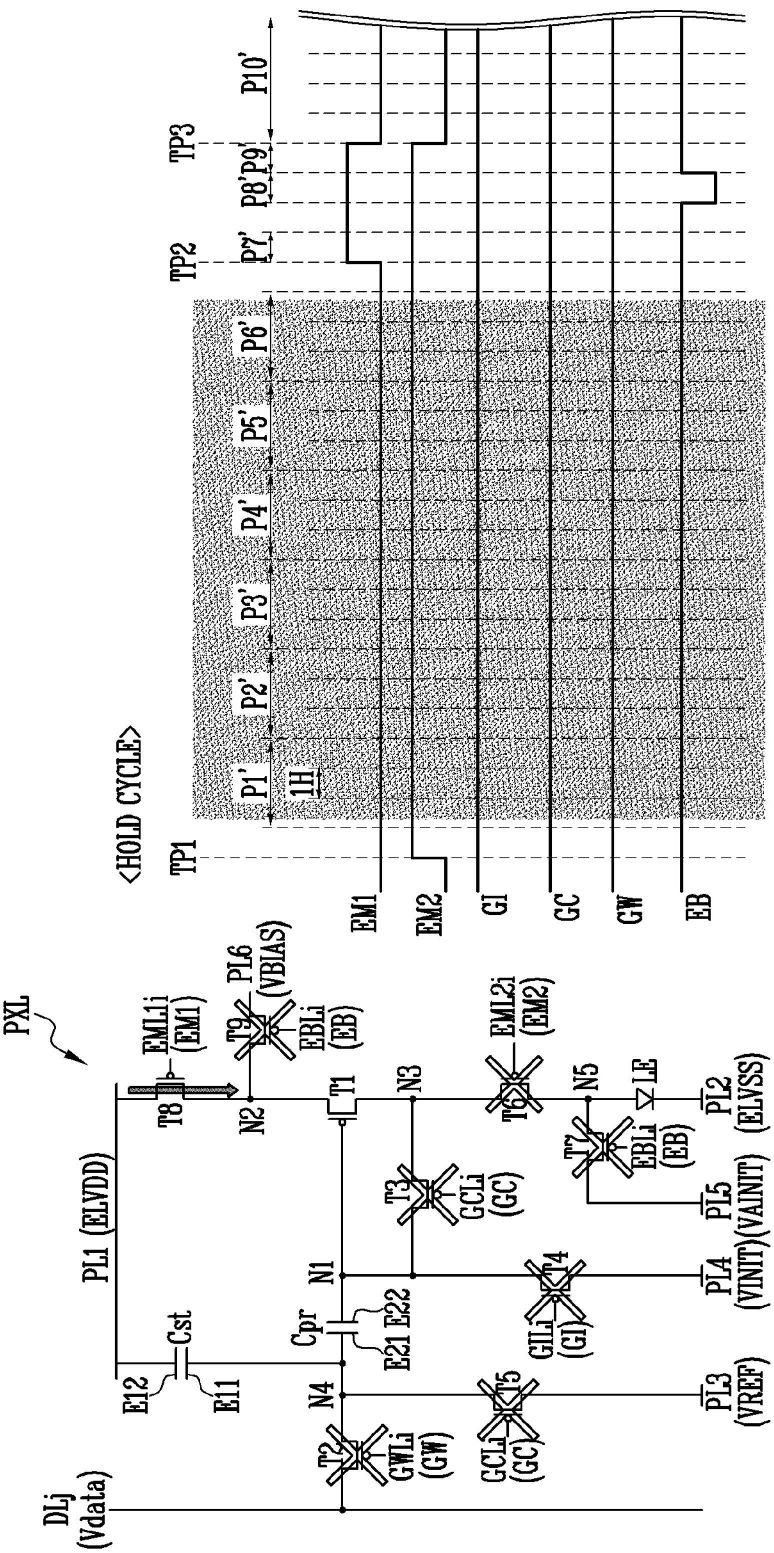
FIG. 15 is a diagram illustrating first to sixth periods of the timing diagram of FIG. 14 along with the pixel structure of FIG. 2.

FIG. 15 is a diagram illustrating first to sixth periods P1', . . . , P6' of the timing diagram of FIG. 14 along with the structure of the pixel PXL of FIG. 2.

During the first to sixth periods P1', . . . , P6', a first emission control signal EM1 having a turn-on level may be inputted. During the first to sixth periods P1, . . . , P6, a second emission control signal EM2 having a turn-off level, a third scan signal GI having a turn-off level, a second scan signal GC having a turn-off level, a first scan signal GW having a turn-off level, and a third emission control signal EB having a turn-off level may be inputted.

During the first to sixth periods P1', . . . , P6', as the first emission control signal EM1 having a turn-on level is inputted, the first power voltage ELVDD is applied to the second node N2 of the first transistor T1.

In the hold cycle HOLD CYCLE, because the first scan signal GW having a turn-off level, the second scan signal GC having a turn-off level, and the third scan signal GI having a turn-off level are inputted, the voltage of the first node N1 of the first transistor T1 may be identical or similar to a voltage applied to the first node N1 during the emission period of the data writing cycle DATA WRITING CYCLE (refer to FIG. 13). In other words, during the first to sixth periods P1', . . . , P6', the voltage of the first node N1 of the first transistor T1 may be identical or similar to "ELVDD−Vth+Vdata−VREF" (refer to the foregoing equation 2).

Figure 16:
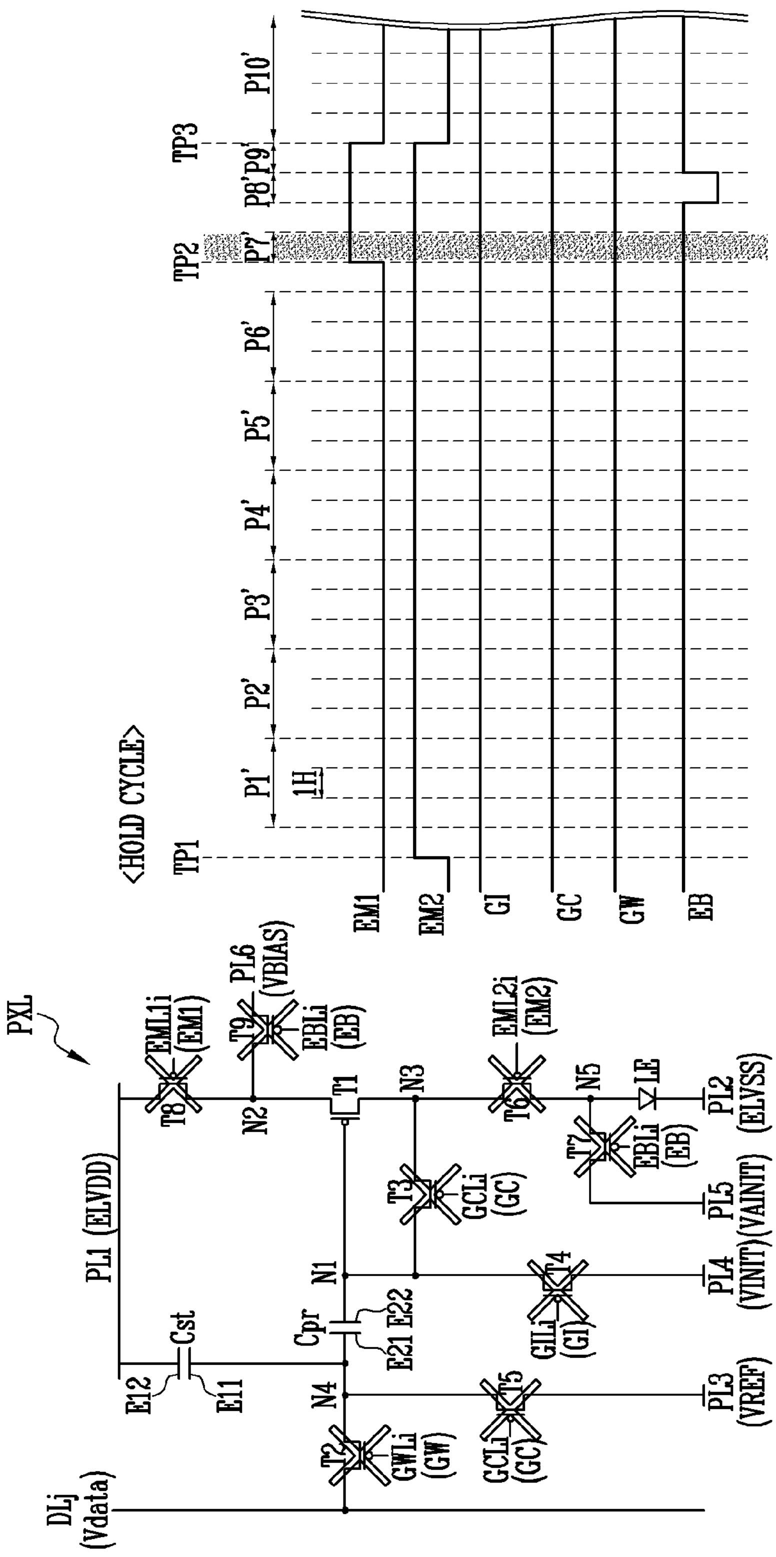
FIG. 16 is a diagram illustrating a seventh period of the timing diagram of FIG. 14 along with the pixel structure of FIG. 2.

FIG. 16 is a diagram illustrating the seventh period P7' of the timing diagram of FIG. 14 along with the structure of the pixel PXL of FIG. 2.

The seventh period P7' may be a period to provide a time margin for separating the first to sixth periods P1', . . . , P6' from the eighth period P8'.

During the seventh period P7', a first emission control signal EM1 having a turn-off level, a second emission control signal EM2 having a turn-off level, a third scan signal GI having a turn-off level, a second scan signal GC having a turn-off level, a first scan signal GW having a turn-off level, and a third emission control signal EB having a turn-off level may be inputted.

During the seven period P7', a constant voltage may not be applied to the second node N2 of the first transistor T1.

Figure 17:
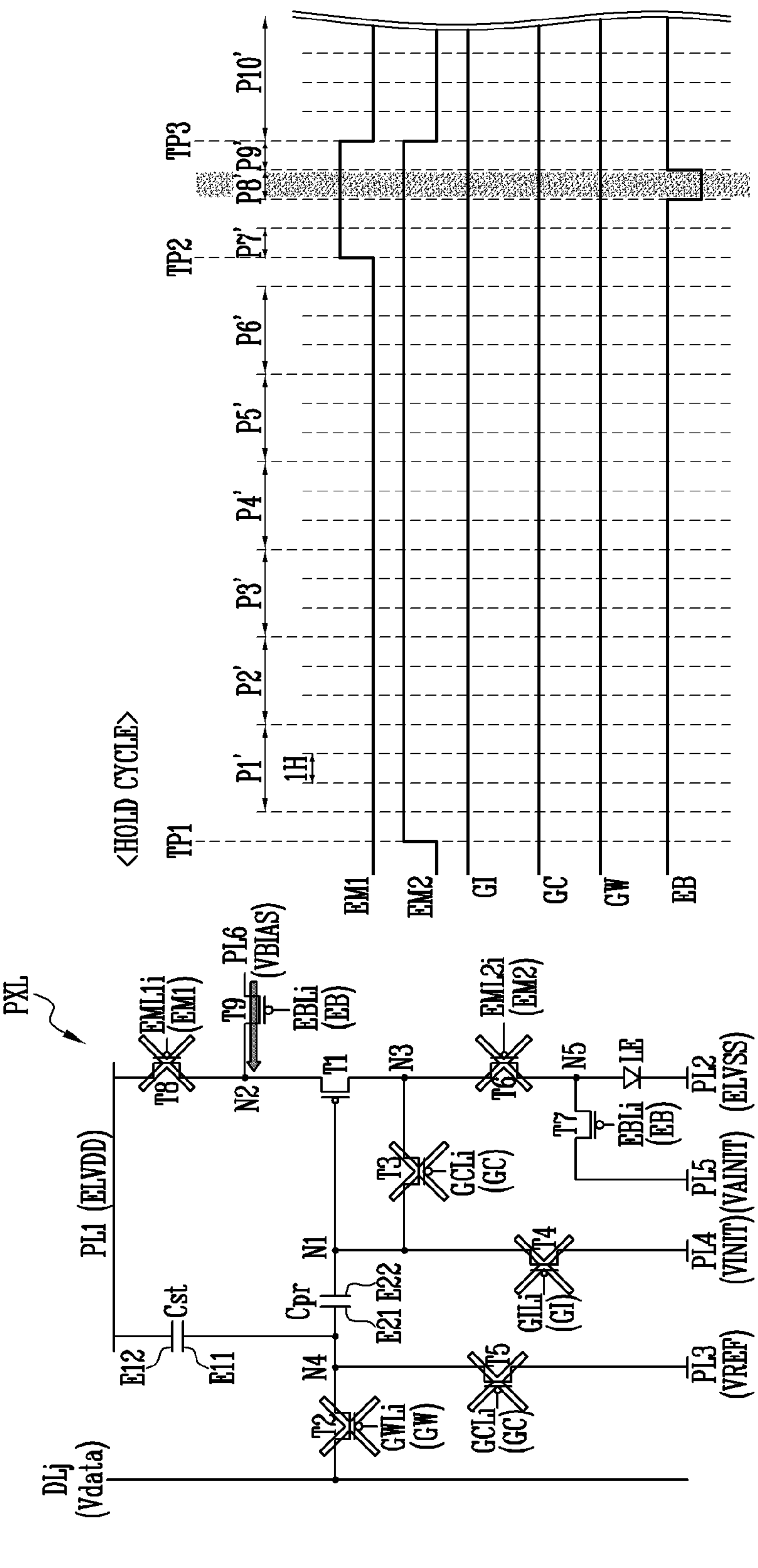
FIG. 17 is a diagram illustrating an eighth period of the timing diagram of FIG. 14 along with the pixel structure of FIG. 2.

FIG. 17 is a diagram illustrating the eighth period P8' of the timing diagram of FIG. 14 along with the structure of the pixel PXL of FIG. 2.

The eighth period P8' may be a period in which the sixth power voltage VBIAS is applied to the second node N2 of the first transistor T1 so that the transmission characteristics of the first transistor T1 can be adjusted such that the first transistor T1 has specific voltage-current characteristics. Thereby, a phenomenon in which the threshold voltage of the first transistor T1 is shifted during an emission operation may be mitigated.

During the eighth period P8', a third emission control signal EB having a turn-on level may be inputted. During the eighth period P8', a first emission control signal EM1 having a turn-off level, a second emission control signal EM2 having a turn-off level, a third scan signal GI having a turn-off level, a second scan signal GC having a turn-off level, and a first scan signal GW having a turn-off level may be inputted.

Figure 18:
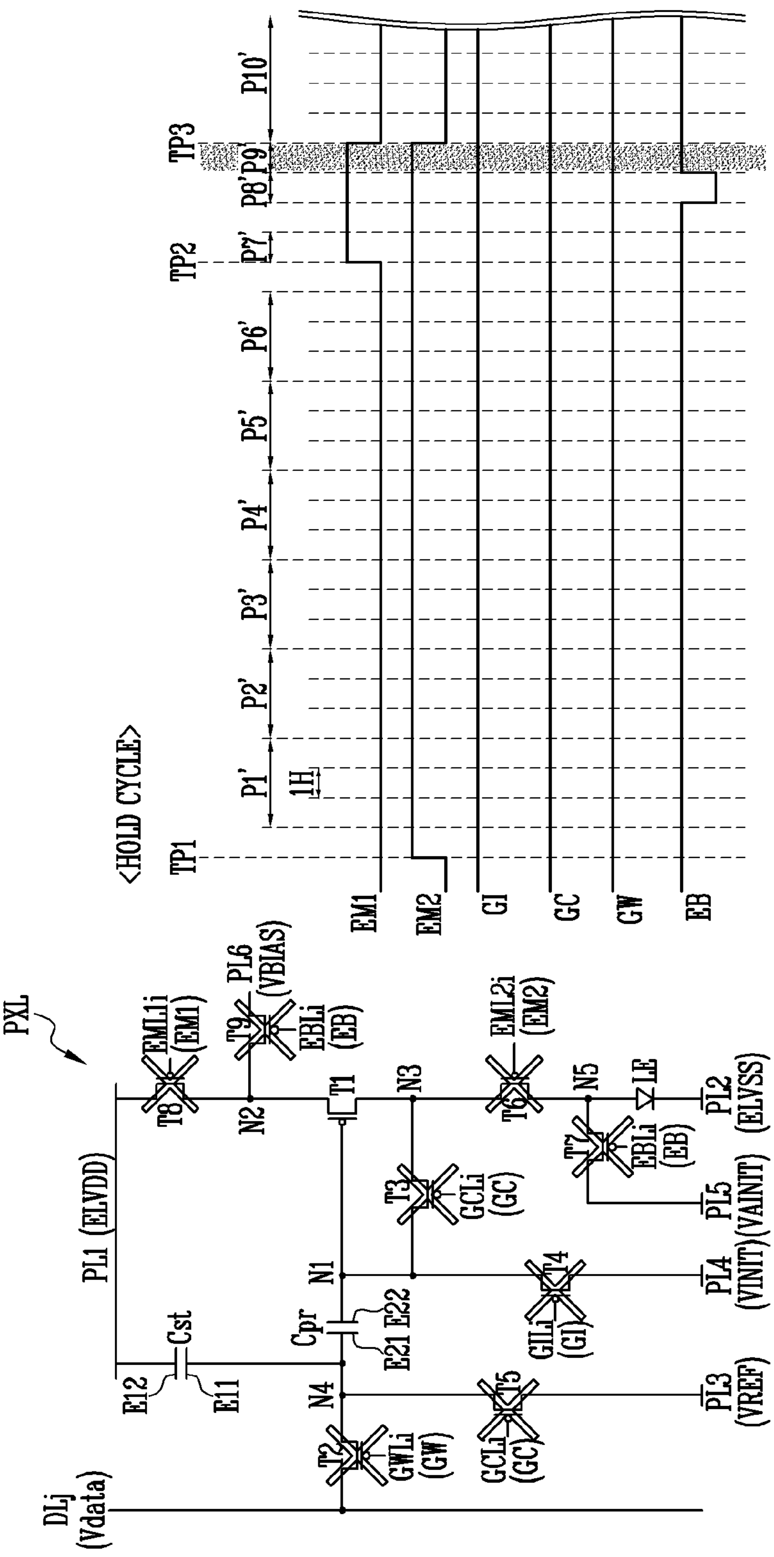
FIG. 18 is a diagram illustrating a ninth period of the timing diagram of FIG. 14 along with the pixel structure of FIG. 2.

FIG. 18 is a diagram illustrating the ninth period P9' of the timing diagram of FIG. 14 along with the structure of the pixel PXL of FIG. 2.

The ninth period P9' may be a period formed to provide a time margin for separating the eighth period P8' and the tenth period P10' from each other.

During the ninth period P9', a first emission control signal EM1 having a turn-off level, a second emission control signal EM2 having a turn-off level, a third scan signal GI having a turn-off level, a second scan signal GC having a turn-off level, a first scan signal GW having a turn-off level, and a third emission control signal EB having a turn-off level may be inputted.

Figure 19:
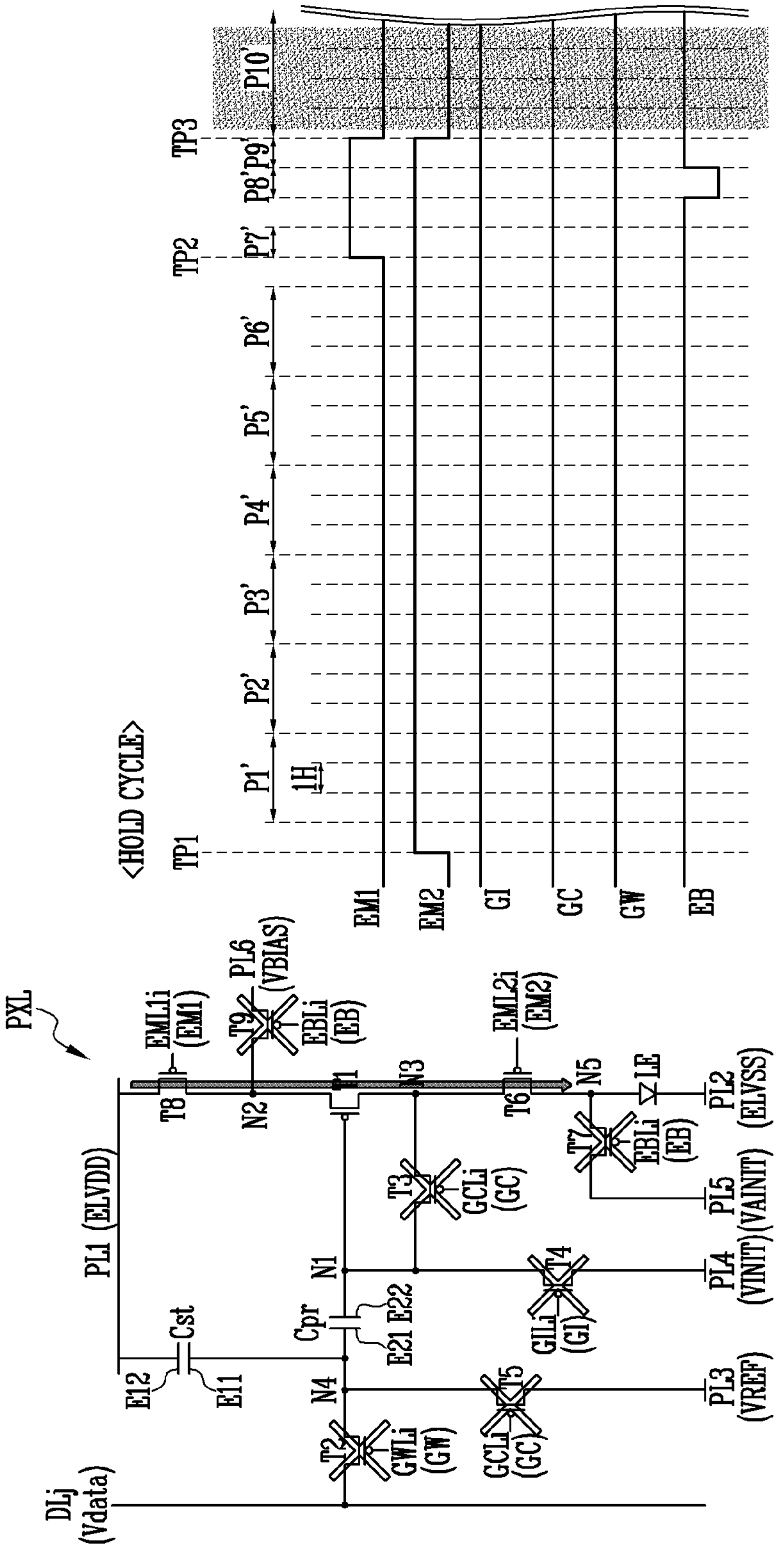
FIG. 19 is a diagram illustrating a tenth period of the timing diagram of FIG. 14 along with the pixel structure of FIG. 2.

FIG. 19 is a diagram illustrating the tenth period P10' of the timing diagram of FIG. 14 along with the structure of the pixel PXL of FIG. 2.

The tenth period P10' may be a period in which the light emitting element LE emits light. The light emitting element LE may emit light based on the data voltage Vdata stored in the data writing cycle before the corresponding hold cycle HOLD CYCLE.

When entering the tenth period P10, the voltage of the second node N2 of the first transistor T1 may be changed to the first power voltage ELVDD. The magnitude of driving current that flows to the light emitting element LE during the tenth period P10' may be calculated as described in the foregoing equation 2; therefore, detailed explanation thereof will be omitted.

Consequently, the display device 100 (refer to FIG. 1) in accordance with embodiments of the present disclosure may include the data writing cycle DATA WRITING CYCLE (refer to FIG. 3) and the hold cycle HOLD CYCLE and embody various frame frequencies.

Furthermore, in the hold cycle HOLD CYCLE, because a first scan signal GW having a turn-off level, a second scan signal GC having a turn-off level, a third scan signal GI having a turn-off level are continuously inputted to the pixel PXL, there may be easy to control the scan driving circuit 130 (refer to FIG. 1) in the hold cycle HOLD CYCLE.

In addition, in the hold cycle HOLD CYCLE, a first emission control signal EM1 having a turn-on level, a second emission control signal EM2 having a turn-on level, and a third emission control signal EB having a turn-on level may be inputted to the pixel PXL at the same timings as those of the data writing cycle DATA WRITING CYCLE (refer to FIG. 3).

Hence, the emission driving circuit 140 (refer to FIG. 1) is allowed to be controlled in the same manner in the data writing cycle DATA WRITING CYCLE and the hold cycle HOLD CYCLE, so that the structure of the display device 100 (refer to FIG. 1) can be simplified.

Figure 20:
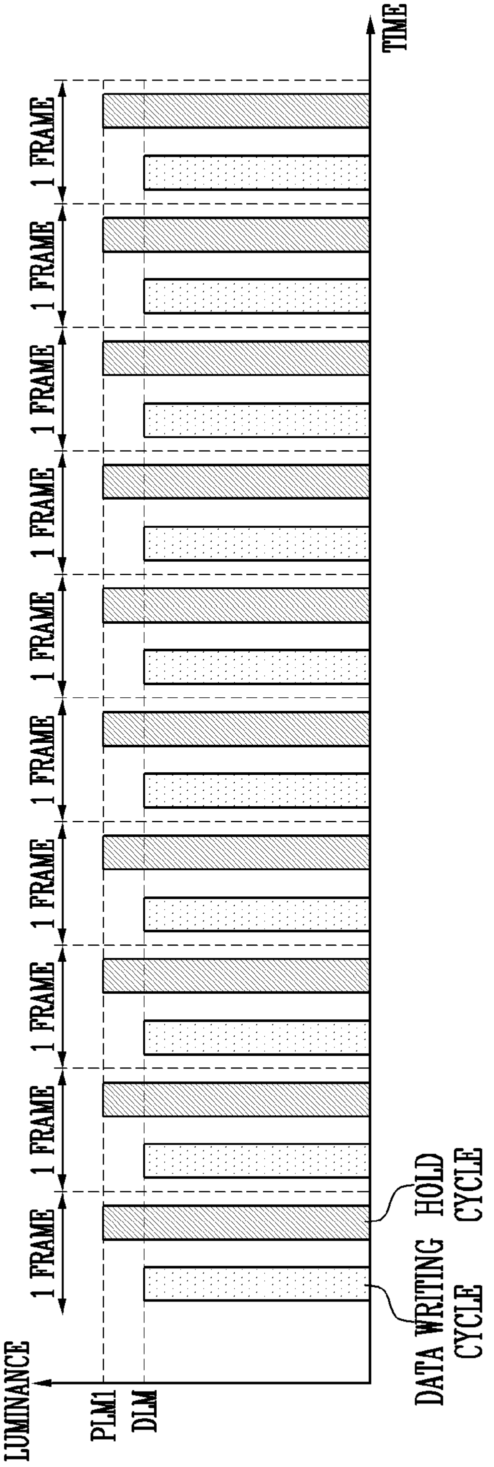
FIG. 20 is a diagram for describing an example of a high speed driving operation of a display device in accordance with embodiments of the present disclosure.

FIG. 20 is a diagram for describing an example of a high speed driving operation of the display device 100 (refer to FIG. 1) in accordance with embodiments of the present disclosure.

During a high speed driving operation, one frame 1 FRAME may include one data writing cycle DATA WRITING CYCLE and one or more hold cycles HOLD CYCLE. In some cases, during the high speed driving operation, one frame 1 FRAME may be formed of only one data writing cycle DATA WRITING CYCLE.

FIG. 20 illustrates the case where one frame 1 FRAME includes one data writing cycle DATA WRITING CYCLE and one hold cycle HOLD CYCLE.

For example, in the case where an image is displayed at a frame frequency of 240 Hz, the frequency of each of the data writing cycle DATA WRITING CYCLE and the hold cycle HOLD CYCLE may be 480 Hz. Alternatively, in the case where an image is displayed at a frame frequency of 144 Hz, the frequency of each of the data writing cycle DATA WRITING CYCLE and the hold cycle HOLD CYCLE may be 288 Hz.

In other words, the display device 100 (refer to FIG. 1) in accordance with embodiments of the present disclosure may display an image at the data writing cycle DATA WRITING CYCLE and the hold cycle HOLD CYCLE each having a frequency faster than the maximum frame frequency In the following description, for convenience of description, it is assumed that the frame frequency illustrated in FIG. 20 is 240 Hz, but the present disclosure is not limited thereto.

Referring to FIG. 20, there are illustrated a luminance DLM at the data writing cycle DATA WRITING CYCLE and a first peak luminance PLM1 at the hold cycle HOLD CYCLE in the case where an image of the same grayscale is continuously displayed in a high speed driving operation.

The first peak luminance PLM1 at the hold cycle HOLD CYCLE has a value higher than the luminance at the data writing cycle DATA WRITING CYCLE. The foregoing luminance difference may be derived from that the first power voltage ELVDD is applied as a bias voltage to the second node N2 of the first transistor T1 during the first to sixth periods P1', . . . , P6' of the hold cycle HOLD CYCLE (refer to FIG. 15).

The data writing cycle DATA WRITING CYCLE and the hold cycle HOLD CYCLE may be different from each other in voltage-current characteristics of the first transistor T1 during the eighth period P8, P8' (respectively refer to FIGS. 11 and 17) in which the sixth power voltage VBIAS is applied to the first transistor T1 as a bias voltage. The foregoing may be checked by the fact that the luminance DLM in the data writing cycle DATA WRITING CYCLE differs from the first peak luminance PLM1 in the hold cycle HOLD CYCLE.

A user of the display device 100 (refer to FIG. 1) may recognize a luminance of one frame 1 FRAME as a value (e.g., an average value) between the luminance DLM in the data writing cycle DATA WRITING CYCLE and the first peak luminance PLM1 in the hold cycle HOLD CYCLE.

Figure 21A:
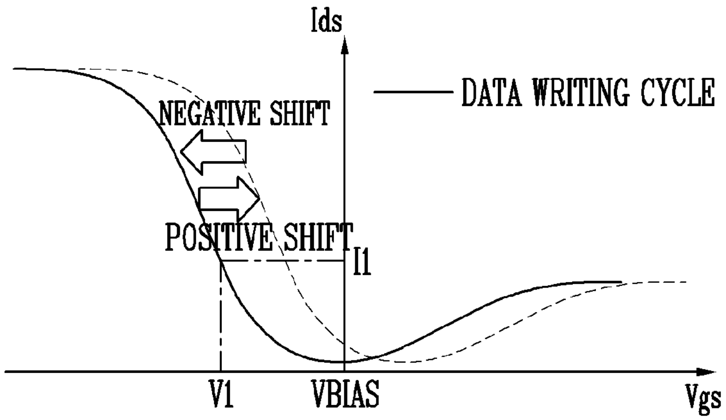
FIGS. 21A and 21B are diagrams for simply describing a reason for a difference in luminance between a data writing cycle and a hold cycle.
Figure 21B:
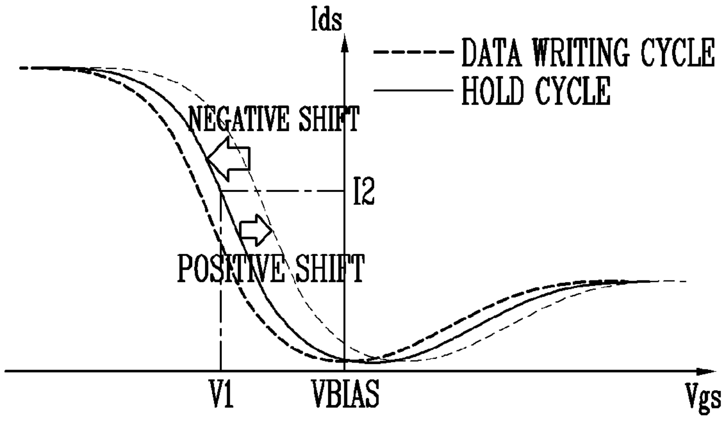

FIGS. 21A and 21B are diagrams for schematically describing the reason of a difference in luminance between the data writing cycle DATA WRITING CYCLE and the hold cycle HOLD CYCLE.

The graph shown in FIGS. 21A and 21B illustrate the transmission characteristics of the first transistor T1 (refer to FIG. 2) of the pixel.

The graph shown in FIG. 21A illustrates that in the data writing cycle DATA WRITING CYCLE the voltage-current characteristics of the first transistor is generally negatively shifted and then is positively shifted by application of the sixth power voltage VBIAS as a bias voltage.

The graph shown in FIG. 21B illustrates that in the hold cycle HOLD CYCLE the voltage-current characteristics of the first transistor is generally shifted in a negative direction and then is shifted in a positive direction by application of the sixth power voltage VBIAS as a bias voltage.

In terms of the threshold voltage of the first transistor, the threshold voltage of the first transistor in the data writing cycle DATA WRITING CYCLE is relatively largely shifted in the negative direction, and the threshold voltage of the first transistor in the hold cycle HOLD CYCLE is relatively slightly shifted in the negative direction.

Even if the same sixth power voltage VBIAS is applied as a bias voltage to the data writing cycle DATA WRITING CYCLE and the hold cycle HOLD CYCLE, the time needed to shift the voltage-current characteristics of the first transistor to the same level may be different between the data writing cycle DATA WRITING CYCLE and the hold cycle HOLD CYCLE.

With regard to a gate-source electrode voltage difference Vgs of the first transistor T1 (refer to FIG. 2) and drain current Ids corresponding to the driving current, the magnitude of the drain current Ids in the hold cycle HOLD CYCLE may be greater than that in the data writing cycle DATA WRITING CYCLE under conditions of the same gate-source electrode voltage difference Vgs. Here, the drain current Ids may correspond to the above-mentioned driving current $I_{LE}$ (refer to Equation 2).

Referring to FIGS. 21A and 21B, the magnitude of the drain current Ids of the data writing cycle DATA WRITING CYCLE may be first current I1 under conditions in which the gate-source electrode voltage difference Vgs of the first transistor is a first voltage V1 that is a turn-on level voltage. On the other hand, under the same conditions, the magnitude of the drain current Ids of the hold cycle HOLD CYCLE may be second current 12 greater than the first current I1.

Hence, even if the same sixth power voltage VBIAS is applied as a bias voltage in each of the data writing cycle DATA WRITING CYCLE and the hold cycle HOLD CYCLE, the luminance of the pixel in the hold cycle HOLD CYCLE may be greater than the luminance of the pixel in the data writing cycle DATA WRITING CYCLE.

Figure 22:
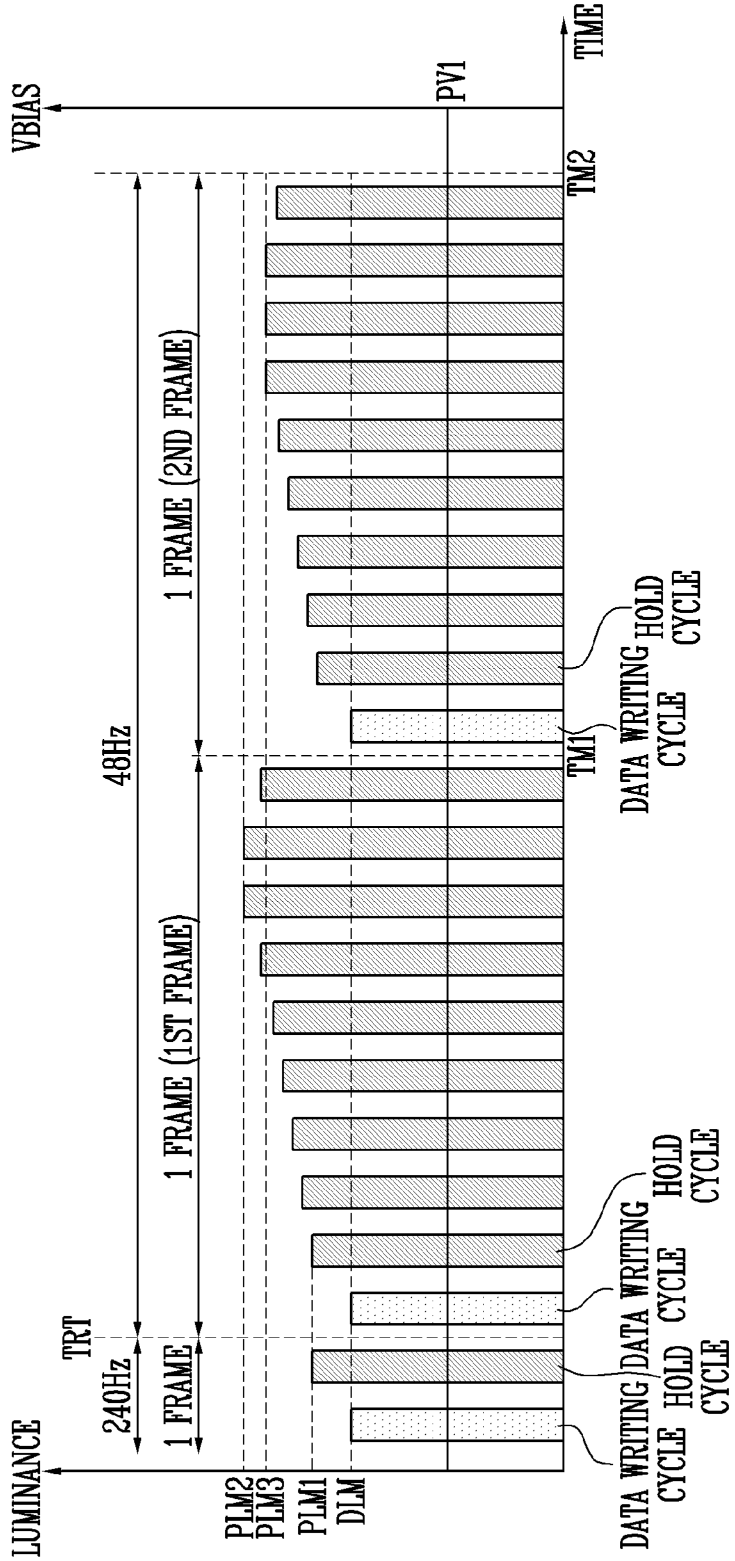
FIG. 22 is a diagram for comparing a high speed driving operation and a low speed driving operation of the display device in accordance with embodiments of the present disclosure.

FIG. 22 is a diagram for comparing a high speed driving operation and a low speed driving operation of the display device 100 (refer to FIG. 1) in accordance with embodiments of the present disclosure.

During a low speed driving operation, one frame 1 FRAME may include one data writing cycle DATA WRITING CYCLE and two or more hold cycles HOLD CYCLE.

The high speed driving operation and the low speed riving operation may be concepts relative to each other. In some cases, the high speed driving operation and the low speed riving operation may be distinguished from each other based on a preset frame frequency. In this case, even if operations are driven at different frame frequencies, all of the operations may correspond to the high speed driving operation, or may correspond to the low speed driving operation.

Although in the following descriptions the case where the frequency of the high speed driving operation is 240 Hz and the frequency of the low speed driving operation is 48 Hz or less will be described by way of example, the present disclosure is not limited thereto. The frequencies of the high speed driving operation and the low speed driving operation may be determined in various ways.

Referring to FIG. 22, there is illustrated a transition time point TRT at which the driving operation is converted from the high speed driving operation to the low speed driving operation, and the case where the frame frequency of the high speed driving operation is 240 Hz and the frame frequency of the low speed driving operation is 48 Hz is illustrated by way of example. In other words, based on the transition time point TRT, the high speed driving operation is performed during a previous period, and the low speed driving operation is performed during a following period.

In this case, during the high speed driving operation, one frame 1 FRAME may include one data writing cycle DATA WRITING CYCLE and one hold cycle HOLD CYCLE. During a low speed driving operation, one frame 1 FRAME may include one data writing cycle DATA WRITING CYCLE and nine successive hold cycles HOLD CYCLE.

FIG. 22 illustrates the case for displaying an image having the same gray scale during a high speed driving period (a 240 Hz driving period) and a low speed driving period (a 48 Hz driving period), and the luminance DLM in the data writing cycle DATA WRITING CYCLE is the same in all of the frames.

Referring to FIG. 22, the sixth power voltage VBIAS of a first peak voltage PV1 may be applied in the data writing cycle DATA WRITING CYCLE and the hold cycles HOLD CYCLE. The peak voltage may refer to a highest voltage level that the sixth power voltage VBIAS can have.

In a first frame 1ST FRAME after the transition time point TRT, the nine hold cycles HOLD CYCLE gradually increase in luminance. In the first frame 1ST FRAME after the transition time point TRT, a second peak luminance PLM2 is formed to have a value higher than the first peak luminance PLM1.

In a second frame 2ND FRAME after the transition time point TRT, the nine hold cycles HOLD CYCLE gradually increase in luminance. In the second frame 2ND FRAME after the transition time point TRT, a third peak luminance PLM3 is formed to have a value lower than the second peak luminance PLM2 and higher than the first peak luminance PLM1.

Referring to FIGS. 21A and 21B described above, the data writing cycle DATA WRITING CYCLE and the hold cycle HOLD CYCLE are different from each other in degree to which the voltage-current characteristics of the transistor (particularly, the first transistor T1 (refer to FIG. 19)) are changed or degree to which the threshold voltage is negatively shifted. Hence, even if the sixth power voltage VBIAS having the same voltage level is applied to the transistor as a bias voltage, the time needed to recover the threshold voltage may be different between the data writing cycle DATA WRITING CYCLE and the hold cycle HOLD CYCLE.

Consequently, a phenomenon in which the luminance is temporarily largely increased in the first frame 1ST FRAME after the transition time point TRT may be visible. The foregoing phenomenon may be visible to the user as a flicker phenomenon.

Therefore, measures for reducing the peak luminance (e.g., PLM2, PLM3, and the like) after the transition time point TRT are desirable.

Figure 23:
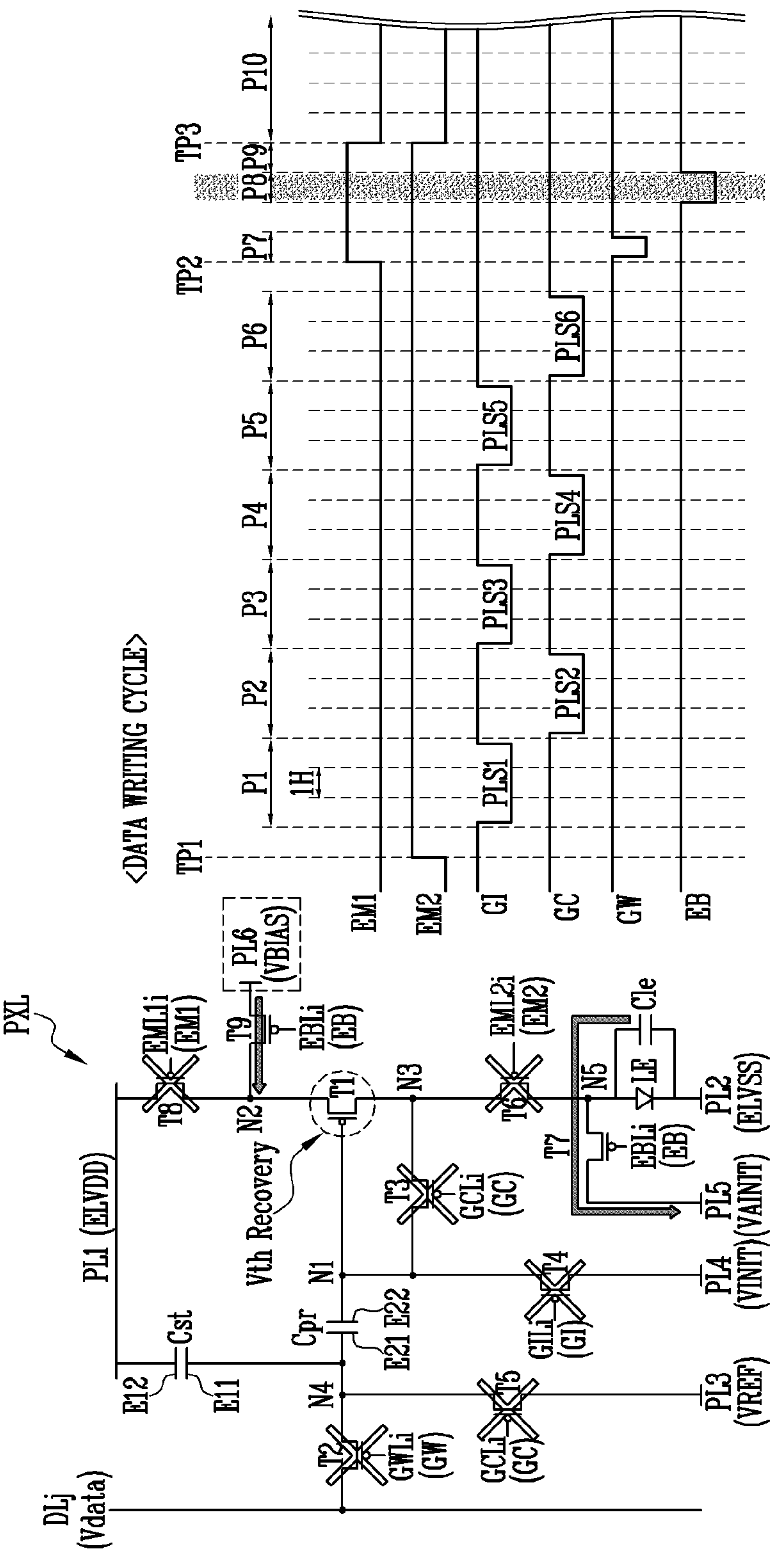
FIG. 23 is a diagram for describing a threshold voltage recovery phenomenon resulting from application of a level-shifted sixth power voltage to the pixel in the display device in accordance with embodiments of the present disclosure.

FIG. 23 is a diagram for describing a threshold voltage recovery phenomenon resulting from application of a level-shifted sixth power voltage VBIAS to the pixel PXL in the display device 100 (see FIG. 1) in accordance with embodiments of the present disclosure.

Referring to FIG. 23, the level-shifted sixth power voltage VBIAS may be applied to the sixth power line PL6.

The level-shifted sixth power voltage VBIAS may be applied to the second node N2 of the first transistor T1 during the eighth period P8 of the data writing cycle DATA WRITING CYCLE.

The level-shifted sixth power voltage VBIAS may be a voltage higher than the sixth power voltage VBIAS. If the level-shifted sixth power voltage VBIAS is applied to the second node N2 of the first transistor T1, the threshold voltage Vth of the first transistor T1 may be more rapidly shifted in the positive direction. Referring to FIGS. 21A and 21B described above, as the level-shifted sixth power voltage VBIAS is applied as a bias voltage of the first transistor T1, the threshold voltage recovery phenomenon Vth Recovery of the first transistor T1 may be accelerated.

Figure 24:
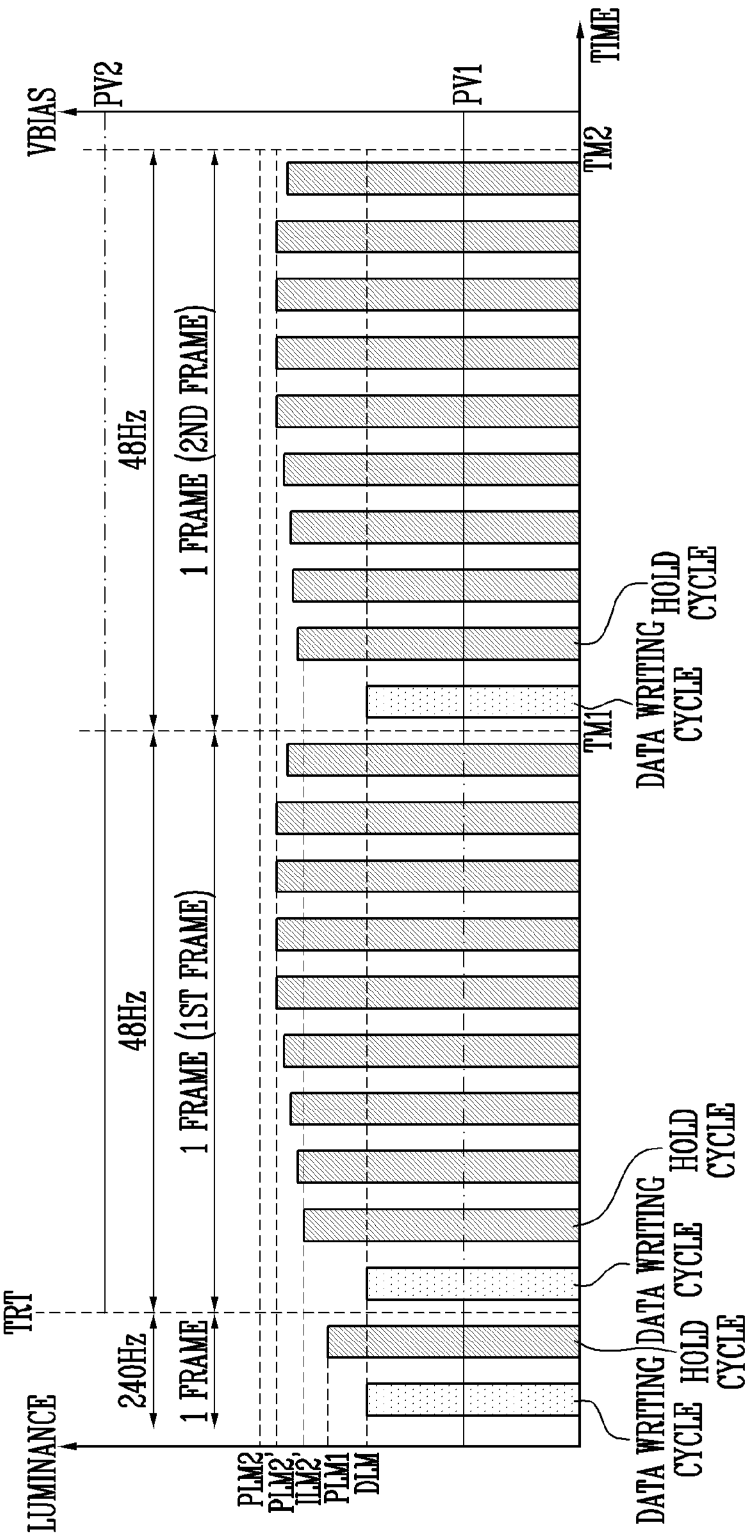
FIG. 24 is another diagram for describing the luminance of the pixel in the case where the level-shifted sixth power voltage is supplied to the pixel.
Figure 25:
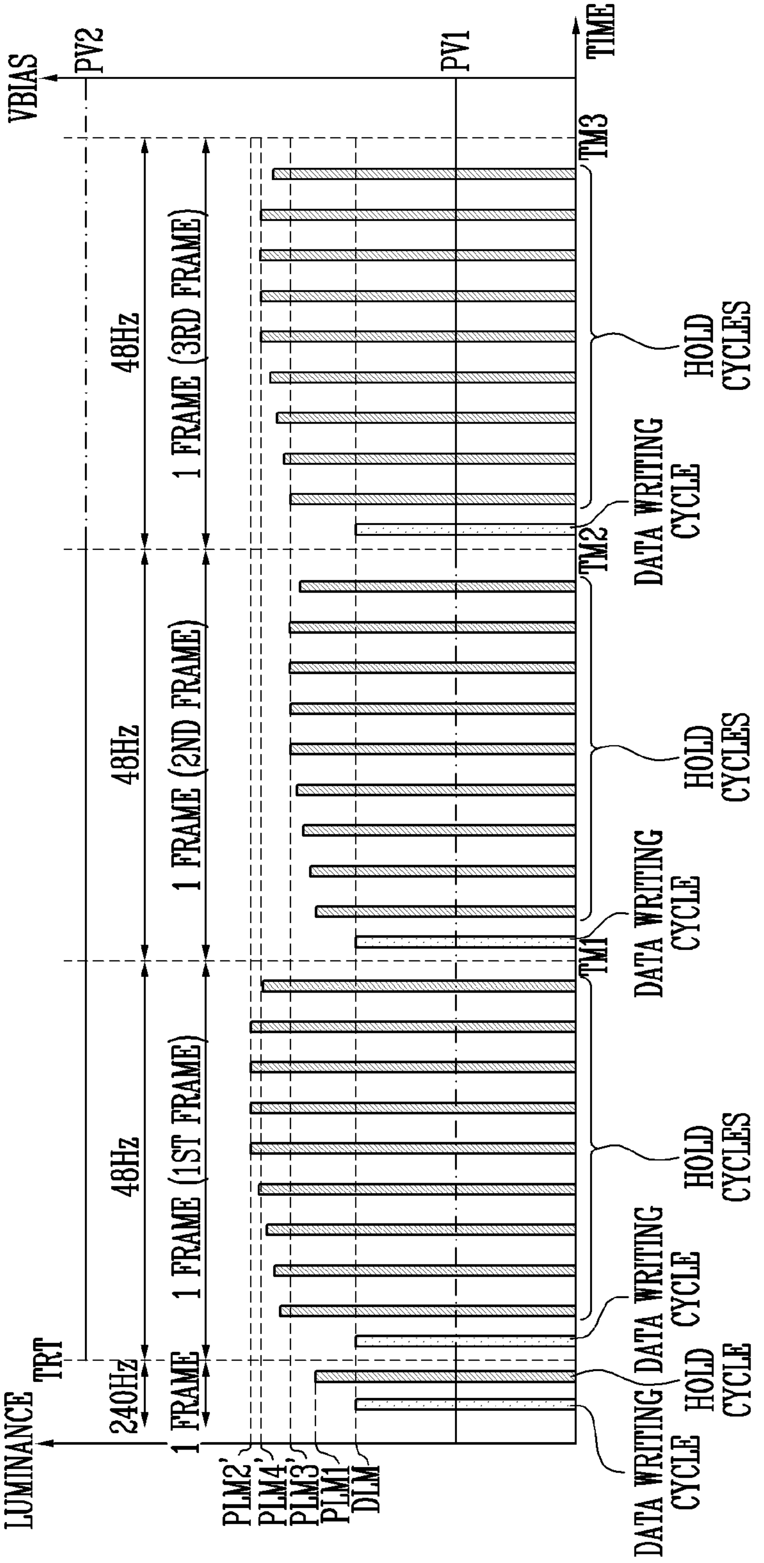
FIG. 25 is another diagram for describing the luminance of the pixel in the case where the level-shifted sixth power voltage is supplied to the pixel.

FIG. 24 is a diagram for describing the luminance of the pixel in the case where the level-shifted sixth power voltage VBIAS is supplied to the pixel. FIG. 25 is another diagram for describing the luminance of the pixel in the case where the level-shifted sixth power voltage VBIAS is supplied to the pixel.

FIG. 24 illustrates changes in luminance of the pixel in the case where the level-shifted sixth power voltage VBIAS is applied to the sixth power line PL6 (refer to FIG. 23) in the first frame 1ST FRAME immediately after the transition time point TRT.

For example, during a high speed driving operation, the voltage level of the sixth power voltage VBIAS may be a first peak voltage PV1, and the voltage level of the sixth power voltage VBIAS in the first frame 1ST FRAME after the transition time point TRT may be a second peak voltage PV2. The second peak voltage PV2 may be a voltage higher than the first peak voltage PV1.

The sixth power voltage VBIAS may be maintained at the first peak voltage PV1 during a period of one or more frames.

Referring to FIG. 24, the voltage level of the sixth power voltage VBIAS may increase from the first peak voltage PV1 to the second peak voltage PV2 at the transition time point TRT. The voltage level of the sixth power voltage VBIAS may decrease from the second peak voltage PV2 to the first peak voltage PV1 in the second frame 2ND FRAME after the transition time point TRT.

Referring to FIG. 24, the luminance DLM of the data writing cycle DATA WRITING CYCLE is constant in the first frame 1ST FRAME immediately after the transition time point TRT. On the other hand, a second peak luminance PLM2' of the hold cycle HOLD CYCLE in the first frame 1ST FRAME may be a value lower than the above-mentioned second peak luminance PLM2.

Therefore, an increase of the voltage level of the sixth power voltage VBIAS from the first peak voltage PV1 to the second peak voltage PV2 is effective in reducing the peak luminance PLM2' of the first frame 1ST FRAME after the transition time point TRT.

However, in the second frame 2ND FRAME after the transition time point TRT, the luminance of the hold cycle HOLD CYCLE is slightly higher than the luminance of the first frame 1ST FRAME. In other words, the luminance of the second frame 2ND FRAME after the transition time point TRT may be higher than the luminance of the first frame 1ST FRAME after the transition time point TRT.

The foregoing refers to the fact that an increase of the voltage level of the sixth power voltage VBIAS from the first peak voltage PV1 to the second peak voltage PV2 is effective in temporarily mitigating a flicker phenomenon but the effect of a reduction of the voltage level of the sixth power voltage VBIAS from the second peak voltage PV2 to the first peak voltage PV1 is relatively low in terms of mitigating the flicker phenomenon. In other words, overall, it may be difficult to satisfactorily mitigate the flicker phenomenon.

Referring to FIG. 25, during a high speed driving operation, the sixth power voltage VBIAS of the first peak voltage PV1 may be inputted to the pixel.

The voltage level of the sixth power voltage VBIAS may increase from the first peak voltage PV1 to the second peak voltage PV2 at the transition time point TRT. In the first frame after the transition time point TRT, the sixth power voltage VBIAS of the second peak voltage PV2 may be inputted to the pixel.

The sixth power voltage VBIAS of the second peak voltage PV2 may be inputted to the pixel in the first frame 1ST FRAME and the second frame 2ND FRAME after the transition time point TRT.

Referring to FIG. 25, the peak luminance in the first frame 1ST FRAME after the transition point TRT is a second peak luminance PLM2', and the peak luminance in the second frame 2ND FRAME after the transition point TRT is a third peak luminance PLM3'. Here, the third peak luminance PLM3' may be lower than the second peak luminance PLM2'.

According to the foregoing, while the sixth power voltage VBIAS of the second peak voltage PV2 is inputted to the pixel after the transition time point TRT, the luminance of the pixel that displays an image having the same gray scale may be gradually reduced, so that the foregoing can be regarded as being effective in temporarily mitigating the flicker phenomenon.

Referring to FIG. 25, the voltage level of the sixth power voltage VBIAS between the second frame 2ND FRAME and a third frame 3RD FRAME after the transition time point TRT is reduced from the second peak voltage PV2 to the first peak voltage PV1. Hence, during a period of the third frame 3RD FRAME, the sixth power voltage VBIAS of the first peak voltage PV1 is inputted to the pixel.

The peak luminance of the third frame 3RD FRAME may be a fourth peak luminance PLM4'. The fourth peak luminance PLM4' may be a value greater than the third peak luminance PLM3' of the second frame 2ND FRAME.

Therefore, if the voltage level of the sixth power voltage VBIAS is reduced from the second peak voltage PV2 to the first peak voltage PV1, the luminance of the hold cycle HOLD CYCLE is re-increased, so that the flicker phenomenon may be exacerbated. In other words, overall, it may be difficult to satisfactorily mitigate the flicker phenomenon.

Therefore, it is desirable for measures to prevent a phenomenon in which, when the voltage level of the sixth power voltage VBIAS is reduced (e.g., from the second peak voltage PV2 to the first peak voltage PV1), the luminance of the hold cycle HOLD CYCLE is rapidly increased.

Figure 26:
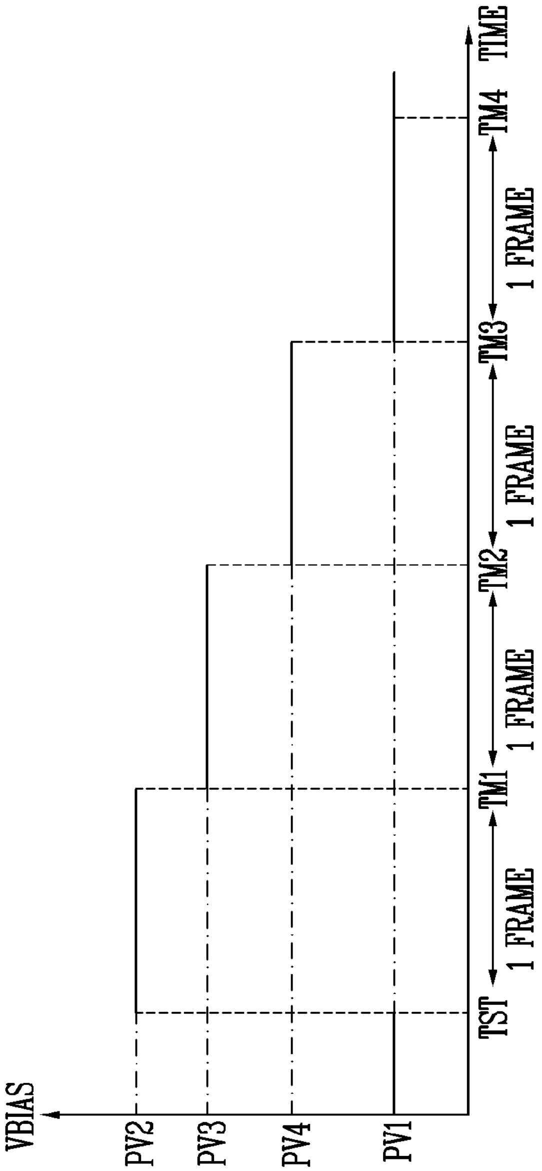
FIG. 26 is a diagram illustrating an embodiment in which the sixth power voltage is applied at a plurality of voltage levels.

FIG. 26 is a diagram illustrating an embodiment in which the sixth power voltage VBIAS is applied at a plurality of voltage levels.

Referring to FIG. 26, in embodiments of the present disclosure, the sixth power voltage VBIAS may be set to a plurality of voltage levels. In more detail, in embodiments of the present disclosure, at a transition time point TST at which the driving operation is converted from the high speed driving operation to the low speed driving operation, the level of the sixth power voltage VBIAS may be increased and then sequentially reduced.

The plurality of voltage levels may be, for example, a first peak voltage PV1, a second peak voltage PV2, a third peak voltage PV3, a fourth peak voltage PV4, and the like. The sixth power voltage VBIAS may be increased from the first peak voltage PV1 to the second peak voltage PV2, and then be sequentially reduced to the third peak voltage PV3, the fourth peak voltage PV4, and first peak voltage PV1.

The sixth power voltage VBIAS may be sequentially reduced from the second peak voltage PV2 to the first peak voltage PV1.

In this specification, the phrase "the voltage level of the sixth power voltage VBIAS is sequentially reduced" may mean that, while the sixth power voltage VBIAS of the same level is inputted to the sixth power line PL6 (refer to FIG. 23) during a period of at least one cycle, the voltage level is generally reduced. Furthermore, the phrase "the voltage level of the sixth power voltage VBIAS is sequentially increased" may mean that, while the sixth power voltage VBIAS of the same level is inputted to the sixth power line PL6 (refer to FIG. 23) during a period of at least one cycle, the voltage level is generally increased.

In an embodiment, the sixth power voltage VBIAS may be sequentially reduced from the second peak voltage PV2 to the first peak voltage PV1 via the third peak voltage PV3. Referring to FIG. 26, the sixth power voltage VBIAS may be sequentially reduced from the second peak voltage PV2 to the first peak voltage PV1 via the third peak voltage PV3 and the fourth peak voltage PV4.

The sixth power voltage VBIAS may be sequentially changed and set to the first peak voltage PV1, the second peak voltage PV2, the third peak voltage PV3 and the fourth peak voltage PV4. The second peak voltage PV2 may be a value greater than the first peak voltage PV1. The third peak voltage PV3 may be a value between the first peak voltage PV1 and the second peak voltage PV2.

Referring to FIG. 26, the voltage level of the sixth power voltage VBIAS during one frame period may be fixed to one peak voltage (e.g., the second peak voltage PV2 or the like). The voltage level of the sixth power voltage VBIAS may be increased or reduced depending on a change of the frame.

A time point at which the voltage level of the sixth power voltage VBIAS is increased from the first peak voltage PV1 to the second peak voltage PV2 may be the transition time point TST at which the driving operation is converted from the high speed driving operation to the low speed driving operation.

The foregoing case may be, for example, the case where the display device 100 (refer to FIG. 1) in accordance with embodiments of the present disclosure receives, from a host system 170 (refer to FIG. 1), information instructing the display device 100 to start a low speed driving operation. In this case, because the voltage level of the sixth power voltage VBIAS can be increased to the second peak voltage PV2 at the transition time point TST at which the low speed driving operation starts, the flicker phenomenon can be mitigated.

The voltage level of the sixth power voltage VBIAS may gradually decrease from the second peak voltage PV2 to the first peak voltage PV1 as the frame proceeds (or the frame is changed to another frame) after the transition time point TST.

According to the foregoing, the voltage level of the sixth power voltage VBIAS is sequentially reduced so that, during a certain frame period after the transition time point TST, the bias voltage to be applied to the first transistor T1 (refer to FIG. 23) may be sequentially reduced. Therefore, the voltage-current characteristics of the first transistor T1 (refer to FIG. 23) can be prevented from rapidly varying during the certain frame period. Consequently, a flicker phenomenon which may occur during a process of reducing the voltage level of the sixth power voltage VBIAS from the second peak voltage PV2 to the first peak voltage PV1 may be mitigated.

Figure 27:
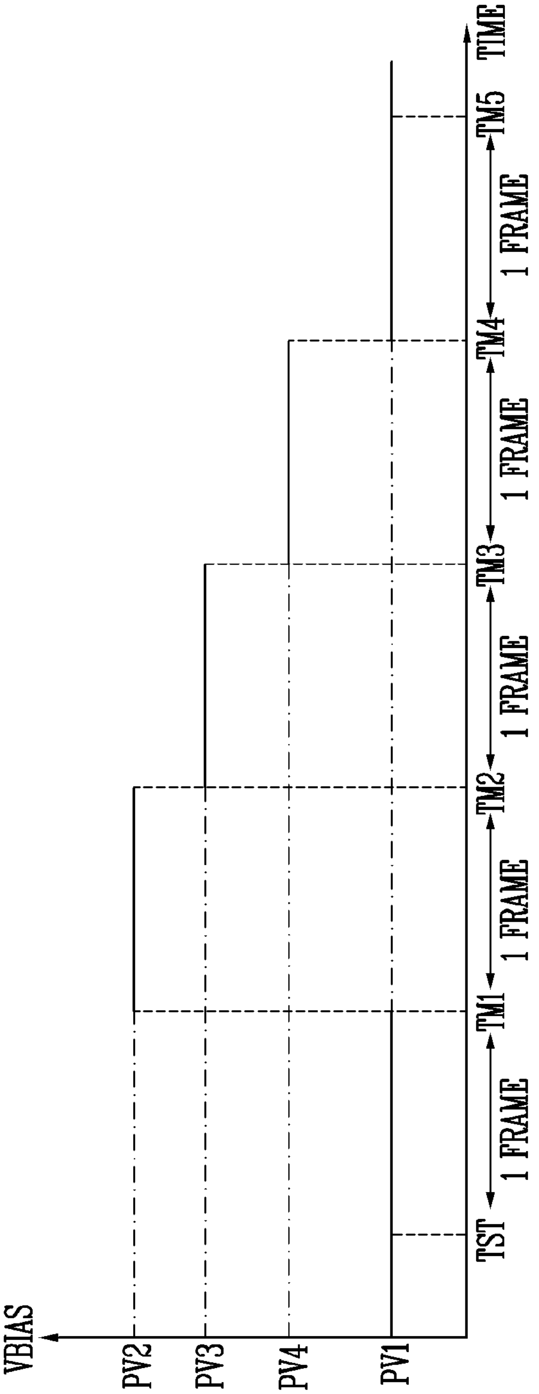
FIG. 27 is a diagram illustrating an embodiment in which the sixth power voltage is applied at a plurality of voltage levels.

FIG. 27 is a diagram illustrating an embodiment in which the sixth power voltage VBIAS is applied at a plurality of voltage levels.

Referring to FIG. 27, in embodiments of the present disclosure, during a first frame period after the transition time point TST, the voltage level of the sixth power voltage VBIAS may maintain as a first peak voltage PV1. During a second frame period after the transition time point TST, the voltage level of the sixth power voltage VBIAS may increase to the second peak voltage PV2.

The foregoing case may be, for example, the case where the display device 100 (refer to FIG. 1) in accordance with embodiments of the present disclosure does not receive, from a host system 170 (refer to FIG. 1), information instructing the display device 100 to start a low speed driving operation.

The display device 100 (refer to FIG. 1) in accordance with embodiments of the present disclosure may compute a frame frequency based on a cycle at which input image data RGB (refer to FIG. 1) is received from the host system 170 (refer to FIG. 1). In the display device 100 (refer to FIG. 1) in accordance with embodiments of the present disclosure, the transition time point TST at which the driving operation is converted from the high speed driving operation to the low speed driving operation may be specified, based on the computed frame frequency. According to the foregoing, in the display device 100 (refer to FIG. 1) in accordance with embodiments of the present disclosure, one frame (a first frame after the transition time point TST, referring to FIG. 27) for determining whether the low speed driving operation starts may be set to a margin period.

In the display device 100 (refer to FIG. 1) in accordance with embodiments of the present disclosure, the voltage level of the sixth power voltage VBIAS may be increased from the first peak voltage PV1 to the second peak voltage PV2 as the frame proceeds after the margin period. In the display device 100 (refer to FIG. 1) in accordance with embodiments of the present disclosure, the voltage level of the sixth power voltage VBIAS may be sequentially reduced from the second peak voltage PV2 to the first peak voltage PV1 as the frame proceeds after the margin period.

Consequently, a flicker phenomenon which may occur during a process of reducing the voltage level of the sixth power voltage VBIAS from the second peak voltage PV2 to the first peak voltage PV1 may be mitigated.

Figure 28:
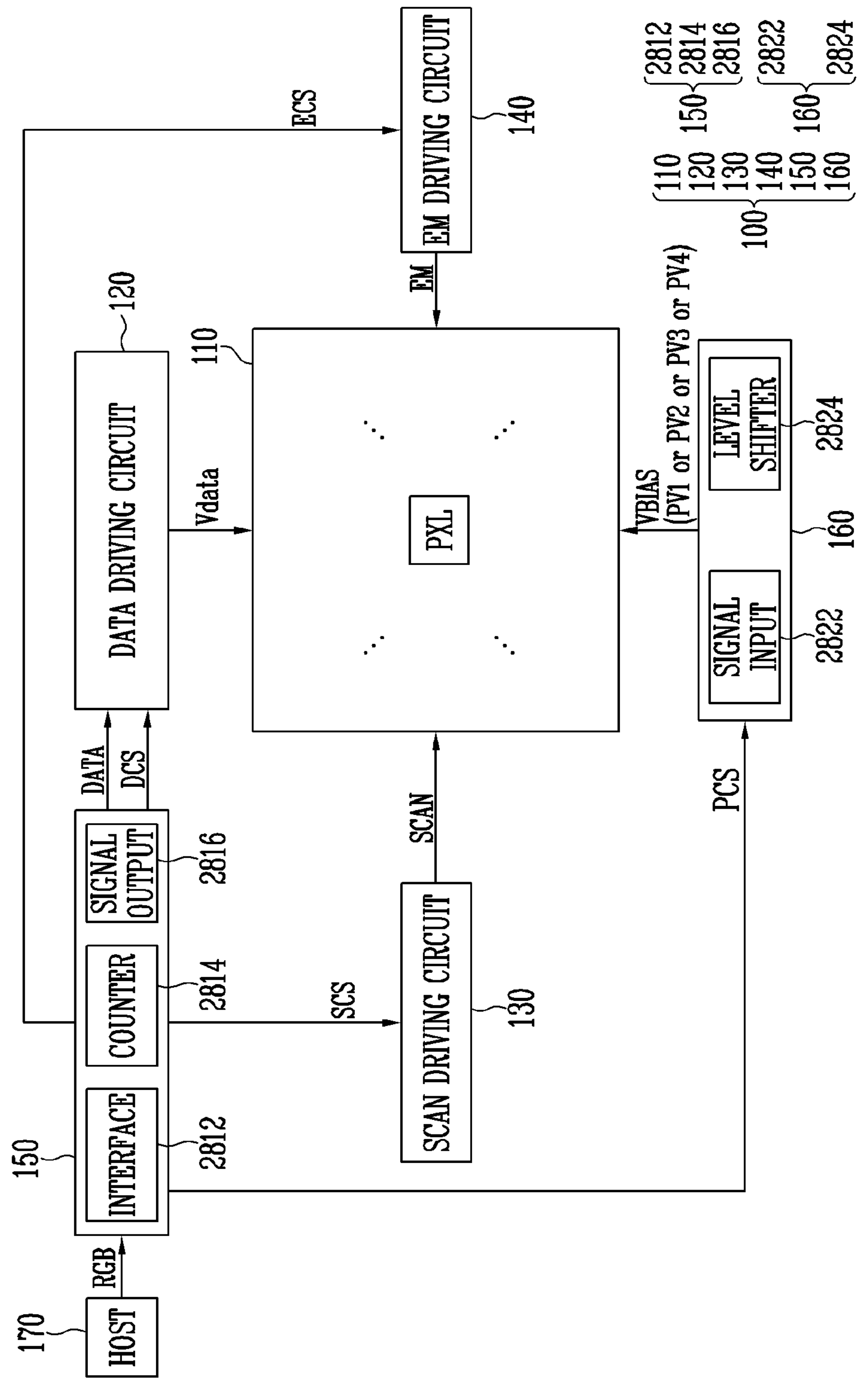
FIG. 28 illustrates an example of a system block diagram for changing the voltage level of the sixth power voltage during a low speed driving operation in the display device in accordance with embodiments of the present disclosure.

FIG. 28 illustrates an example of a system block diagram for changing the voltage level of the sixth power voltage VBIAS during a low speed driving operation in the display device in accordance with embodiments of the present disclosure.

Referring to FIG. 28, the display device 100 in accordance with embodiments of the present disclosure may calculate a frame frequency based on a time interval at which valid input image data RGB is inputted from a host system 170, and may change the level of the sixth power voltage VBIAS based on the calculated frame frequency.

In some cases, the display device 100 in accordance with embodiments of the present disclosure may receive information indicating the frame frequency from the host system 170. In some cases, the display device 100 in accordance with embodiments of the present disclosure may receive information indicating the high speed driving operation or the low speed driving operation from the host system 170.

Hereinafter, for convenience of explanation, although descriptions will be made on the assumption that the display device 100 shifts the voltage level of the sixth power voltage VBIAS based on an input cycle of the input image data RGB to be inputted from the host system 170, the present disclosure is not limited thereto.

Referring to FIG. 28, the timing controller 150 may include an interface 2812, a counter 2814, and a signal output component 2816.

The interface 2812 may be configured to receive input image data RGB from the host system 170. The interface 2812 may be, for example, implemented as a display port including a main link, an auxiliary channel, and a hot plug detector ("HPD") line. In the case where the interface 2812 is implemented as a display port, the input image data RGB may be transmitted from the host system 170 to the timing controller 150 through the main link having a simplex channel. If the input image data RGB is inputted to the interface 2812, an image of a subsequent frame may be displayed on the display panel 110 using the corresponding input image data RGB.

The counter 2814 may compute a cycle at which the input image data RGB is inputted through the interface 2812. For example, the counter 2814 may compute a cycle at which the input image data RGB is inputted to the timing controller 150, using an external clock inputted through the interface 2812 or the like, or using an internal clock generated in the timing controller 150. The counter 2814 may include, for example, two or more flip-flops, and may compute the cycle in a manner of detecting a rising edge or a falling edge of a clock. But embodiments of the present disclosure are not limited thereto.

Here, a reciprocal of the cycle at which the input image data RGB is inputted to the timing controller 150 may correspond to a frame frequency in the corresponding frame, so that the frame frequency of the corresponding frame may be computed by the counter 2814.

The signal output component 2816 may output various control signals based on the computed frame frequency. For example, in the case where the frame frequency computed by the counter 2814 is reduced, the signal output component 2816 may determine that the low speed driving operation has started. For example, in the case where the frame frequency computed by the counter 2814 is increased, the signal output component 2816 may determine that the high speed driving operation has started.

If it is determined that the low speed driving operation has started, the signal output component 2816 may output a power supply circuit control signal PCS for outputting a level-shifted sixth power voltage VBIAS (e.g., the second peak voltage PV2) to the display panel 110.

If the low speed driving operation starts, the timing controller 150 may output a power supply circuit control signal PCS for sequentially reducing the voltage level of the sixth power voltage VBIAS and outputting the sixth power voltage VBIAS during a preset frame period.

The power supply circuit control signal PCS may include a parameter value indicating the voltage level of the sixth power voltage VBIAS outputted from the power supply circuit 160.

The scan driving circuit 130 outputs a scan signal SCAN having a turn-on level to the display panel 110 if the frame is changed, so that a frame frequency may be computed based on a frequency at which the scan signal SCAN having a turn-on level is outputted. If the frequency at which the scan signal SCAN having a turn-on level is outputted from the scan driving circuit 130 is reduced, the sixth power voltage VBIAS of the second peak voltage PV2 may be outputted from the power supply circuit 160.

The power supply circuit 160 may include a signal input component 2822 and a level shifter 2824.

The signal input component 2822 may be configured to receive the power supply circuit control signal PCS outputted from the timing controller 150.

The level shifter 2824 may shift the voltage level of the sixth power voltage VBIAS based on the power supply circuit control signal PCS inputted to the signal input component 2822, and generate the sixth power voltage VBIAS having the shifted voltage level.

Thereby, the power supply circuit 160 may receive a voltage from an external device, change the level of the voltage, and output the sixth power voltage VBIAS at various voltage levels (e.g., a level of any one voltage of the first to fourth peak voltages PV1, PV2, PV3, and PV4).

Hence, the display device 100 in accordance with embodiments of the present disclosure may perform both the high speed driving operation and the low speed driving operation, and a flicker phenomenon in the low speed driving operation can be markedly mitigated.

Figure 29:
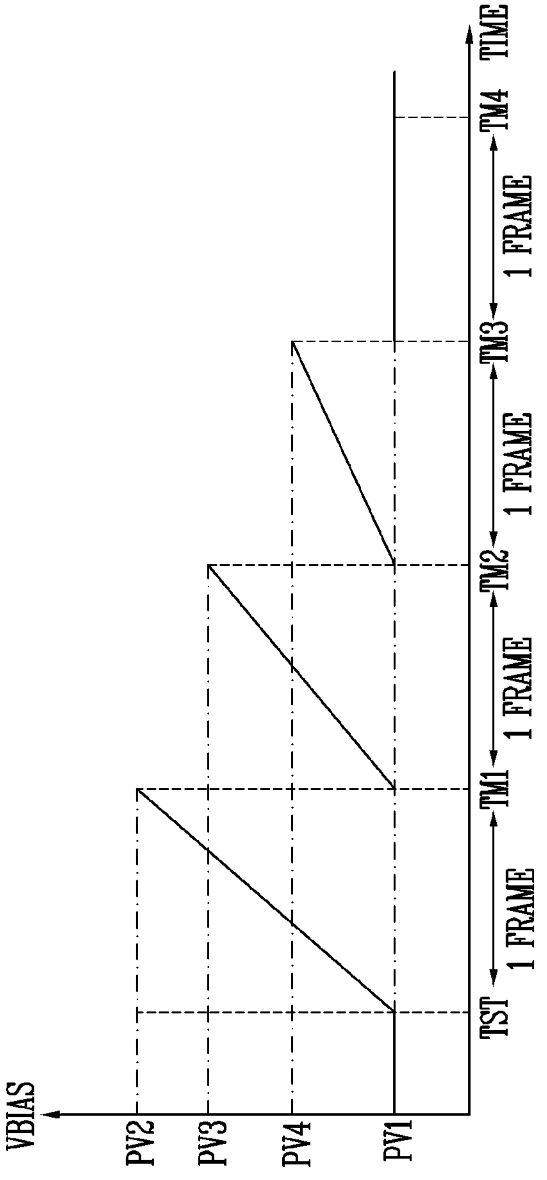
FIG. 29 is a diagram illustrating an embodiment in which the sixth power voltage is applied at a plurality of voltage levels.

FIG. 29 is a diagram illustrating an embodiment in which the sixth power voltage VBIAS is applied at a plurality of voltage levels.

Referring to FIG. 29, in embodiments of the present disclosure, the voltage level of the sixth power voltage VBIAS may be changed during each of a plurality of frame periods after the transition time point TST. Each of the plurality of frame periods may be a preset frame period.

Referring to FIG. 29, there is illustrated a graph in which the voltage level of the sixth power voltage VBIAS sequentially increases during each of three preset frame periods.

If the preset frame periods have passed, the voltage level of the sixth power voltage VBIAS may be a preset, constant voltage level. Referring to FIG. 29, if the three preset frame periods have passed, the voltage level of the sixth power voltage VBIAS may be a preset first peak voltage PV1 after a fourth frame period.

Here, as the frames pass, an inclination at which the voltage level of the sixth power voltage VBIAS increases in each frame may be gradually reduced. During the first frame period (i.e., from the transition time point TST to a first time point TM1) in which an increase in the voltage level of the sixth power voltage VBIAS starts after the transition time point TST, the voltage level of the sixth power voltage VBIAS may most rapidly increase.

Referring to FIG. 29, in the first frame after the transition time point TST, the voltage level of the sixth power voltage VBIAS may increase at the largest inclination. In the second frame (i.e., from the first time point TM1 to the second time point TM2) after the transition time point TST, the voltage level of the sixth power voltage VBIAS may increase, and the inclination at which the power voltage VBIAS increases may be less than the inclination of the first frame.

In the case where the low speed driving operation is maintained after the transition time point TST, the peak voltage level of the sixth power voltage VBIAS may gradually decrease as the frame proceeds. For example, in the first frame period after the transition time point TST, the peak voltage level of the sixth power voltage VBIAS may be a second peak voltage PV2. In the second frame period after the transition time point TST, the peak voltage level of the sixth power voltage VBIAS may be a third peak voltage PV3 lower than the second peak voltage PV2. In the third frame period (i.e., from the second time point TM2 to the third time point TM3) after the transition time point TST, the peak voltage level of the sixth power voltage VBIAS may be a fourth peak voltage PV4 lower than the third peak voltage PV3.

According to the foregoing, during a plurality of frame periods after the transition time point TST, the peak voltage level of the sixth power voltage VBIAS sequentially decreases so that there is an effect of sequentially mitigating the hysteresis of the first transistor T1 (refer to FIG. 23).

Although FIG. 29 illustrates the case where the voltage level of the sixth power voltage VBIAS increases in the first frame after the transition time point TST, those skilled in the art will appreciate that the present disclosure can also be applied to the case where a margin period is present until the voltage level of the sixth power voltage VBIAS varies after the transition time point TST, as described with reference to FIG. 27.

Hereinafter, for convenience of explanation, the case where the voltage level of the sixth power voltage VBIAS varies in the first frame period after the transition time point TST will be mainly described, and the present disclosure may also be applied to the case where one or more frames are present as a margin period until the voltage level of the sixth power voltage VBIAS varies after the transition time point TST.

Figure 30:
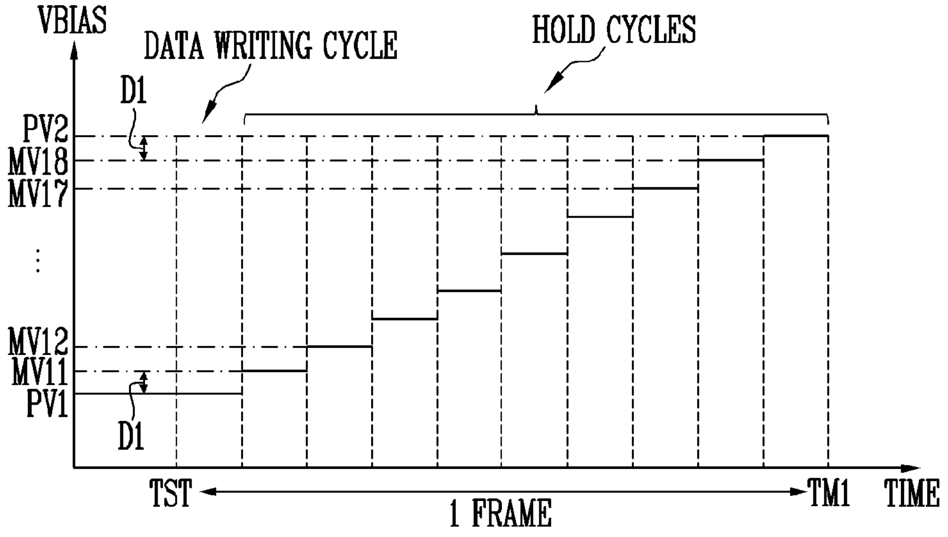
FIG. 30 is a diagram illustrating that the voltage level of the sixth power voltage increases as the cycle proceeds in one frame.

FIG. 30 is a diagram illustrating that the voltage level of the sixth power voltage VBIAS increases as cycles proceed in one frame.

Referring to FIG. 30, in one frame period, the voltage level of the sixth power voltage VBIAS may sequentially increase as the cycles proceed.

For example, in the data writing cycle DATA WRITING CYCLE, the voltage level of the sixth power voltage VBIAS may be a first peak voltage PV1 right after the transition time point TST. As the cycles proceed, the voltage level of the sixth power voltage VBIAS may sequentially increase from the first peak voltage PV1.

For example, after the transition time point TST, the voltage level of the sixth power voltage VBIAS may increase by a preset first voltage increment D1 as the cycles proceed. Unlike the foregoing, the voltage level of the sixth power voltage VBIAS may increase by different voltage increments as the cycles proceed in another embodiment.

Hereinafter, although for convenience of explanation there is illustrated the case where the voltage level of the sixth power voltage VBIAS increases by a preset first voltage increment D1, the present disclosure is not limited thereto.

Referring to FIG. 30, in the data writing cycle DATA WRITING CYCLE, the voltage level of the sixth power voltage VBIAS may be a first peak voltage PV1 right after the transition time point TST.

In a first hold cycle HOLD CYCLE immediately after the data writing cycle DATA WRITING CYCLE, the voltage level of the sixth power voltage VBIAS may be a first intermediate voltage MV11. A voltage difference (i.e., MV11−PV1) between the first intermediate voltage MV11 and the first peak voltage PV1 may correspond to a first voltage increment D1.

In a second hold cycle HOLD CYCLE immediately after the first hold cycle HOLD CYCLE, the voltage level of the sixth power voltage VBIAS may be a second intermediate voltage MV12. A voltage difference (i.e., MV12−MV11) between the second intermediate voltage MV12 and the first intermediate voltage MV11 may correspond to the first voltage increment D1.

Referring to FIG. 30, a voltage difference (i.e., PV2−MV18) between a second peak voltage PV2 and an eighth intermediate voltage MV18 for a tenth hold cycle HOLD CYCLE may also correspond to the first voltage increment D1. The second peak voltage PV2 may be the highest voltage level of the sixth power voltage VBIAS in the corresponding frame.

Referring to FIG. 30, there is illustrated the case where the sixth power voltage VBIAS increases from the first peak voltage PV1 to the second peak voltage PV2, and the sixth power voltage VBIAS increases by the first voltage increment D1 in each hold cycle.

According to the foregoing case, the voltage level of the sixth power voltage VBIAS remains constant during one hold cycle period. Hence, in one hold cycle period, the sixth power voltage VBIAS of the same voltage level may be inputted to a plurality of pixels PXL (refer to FIG. 1) disposed in the display panel 110 (refer to FIG. 1).

In some cases, during two or more hold cycles, the sixth power voltage VBIAS may be maintained at the same voltage level. Here, in the case where the voltage level of the sixth power voltage VBIAS increases, the voltage level may sequentially increase by the first voltage increment D1.

Figure 31:
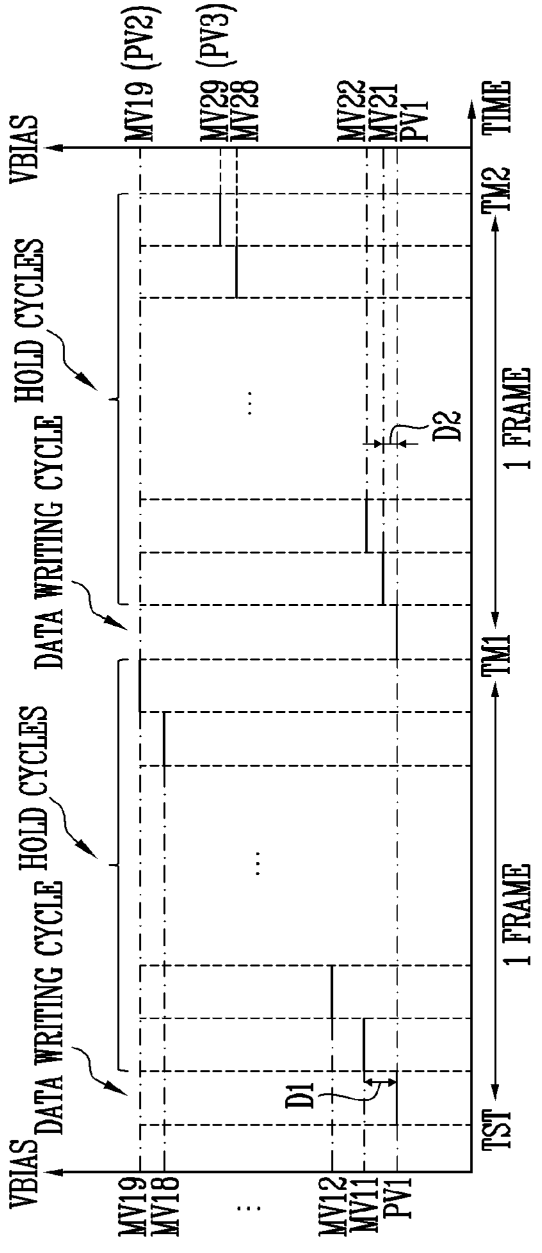
FIG. 31 is a diagram illustrating the case where a voltage level increase width of the sixth power voltage is reduced as the frame proceeds.

FIG. 31 is a diagram illustrating the case where a voltage level increment of the sixth power voltage VBIAS is reduced as the frame proceeds.

Referring to FIG. 31, the voltage level increment of the sixth power voltage VBIAS during a second frame period (i.e., a period from the first time point TM1 to the second time point TM2) after the first time point TM1 may be less than the voltage level increment of the second power voltage VBIAS during a first frame period (i.e., a period from the transition time point TST to the first time point TM1).

For example, in a second frame period after the transition time point TST a voltage difference (i.e., MV21−PV1) between a first intermediate voltage MV21 and the first peak voltage PV1 may correspond to a second voltage increment D2. Here, the second voltage increment D2 may be less than a first voltage increment D1 in a first frame period.

An inclination at which the voltage level of the sixth power voltage VBIAS increases may be reduced within a range greater than 0 as the frame proceeds.

The peak voltage (e.g., a second peak voltage PV2, or a third peak voltage PV3) of the sixth power voltage VBIAS may be expressed in terms of an intermediate voltage. For example, the second peak voltage PV2 may also be expressed as a ninth intermediate voltage MV19. The third peak voltage PV3 may also be expressed as a ninth intermediate voltage MV29. The peak voltage may be defined as a last intermediate voltage of the corresponding frame.

Figure 32:
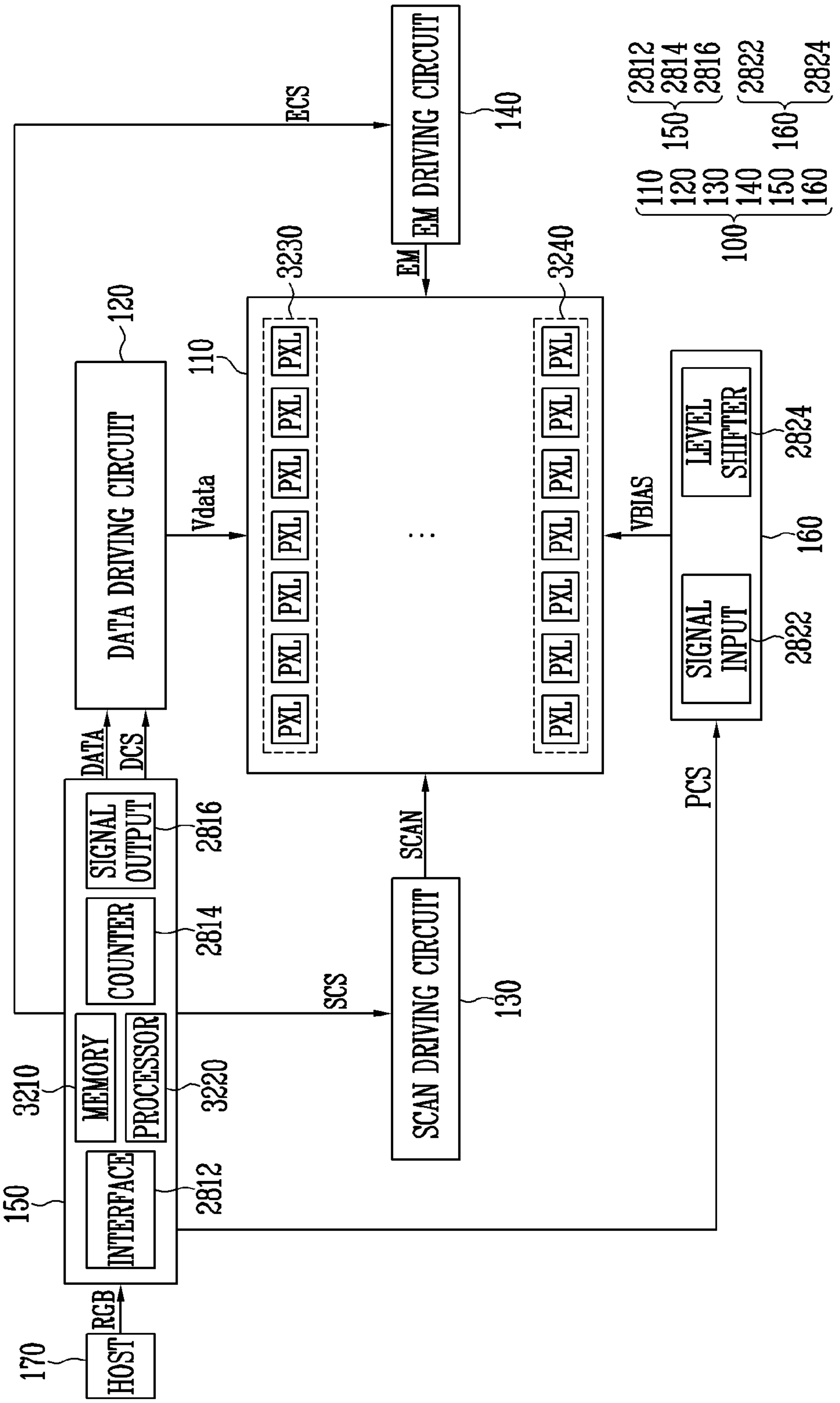
FIG. 32 illustrates an example of a system block diagram for changing the voltage level of the sixth power voltage during a low speed driving operation in the display device in accordance with embodiments of the present disclosure.

FIG. 32 illustrates an example of a system block diagram for changing the voltage level of the sixth power voltage VBIAS during a low speed driving operation in the display device 100 in accordance with embodiments of the present disclosure.

Compared to the system block diagram described above with reference to FIG. 28, additional components in the system block diagram illustrated in FIG. 32 will be mainly described, and detailed description of the components described above will be omitted.

Referring to FIG. 32, the timing controller 150 may further include a memory 3210 and a processor 3220.

The memory 3210 may include one or more memory cells. The memory 3210 may be implemented as an internal memory device disposed inside the timing controller 150, or may be implemented as an external memory device disposed outside the timing controller 150. The memory 3210 may include a register, a cache memory, and the like.

The processor 3220 may perform a computing operation based on a value stored in the memory 3210, or may perform an operation of updating the value stored in the memory 3210.

The timing controller 150 may output a power supply circuit control signal PCS to the power supply circuit 160. The power supply circuit control signal PCS may include a parameter value corresponding to a voltage level of the sixth power voltage VBIAS.

Parameter values corresponding to the voltage level of the sixth power voltage VBIAS may be stored in the memory 3210 in the form of a lookup table.

The processor 3220 may control the signal output component 2816 to output a set parameter value with reference to the lookup table stored in the memory 3210.

The signal output component 2816 may output the parameter value as the power supply circuit control signal PCS.

The power supply circuit 160 may output, based on a parameter value included in the power supply circuit control signal PCS, the sixth power voltage VBIAS as a voltage level corresponding to the parameter value.

In a data writing cycle, both a scan signal having a turn-on level and an emission control signal EM having a turn-on level may be inputted to the display panel 110. The scan signal having a turn-on level and the emission control signal EM having a turn-on level may be sequentially inputted on a pixel row basis to a plurality of pixels PXL disposed in the display panel 110.

For example, during one cycle period, the sixth power voltage VBIAS having the same voltage level may be inputted to a pixel row 3230 that is located at the uppermost side in the display panel 110 and a pixel row 3240 that is located at the lowermost side in the display panel 110.

In the display device 100 in accordance with embodiments of the present disclosure, the sixth power voltage VBIAS may be set to various voltage levels.

Figure 33:
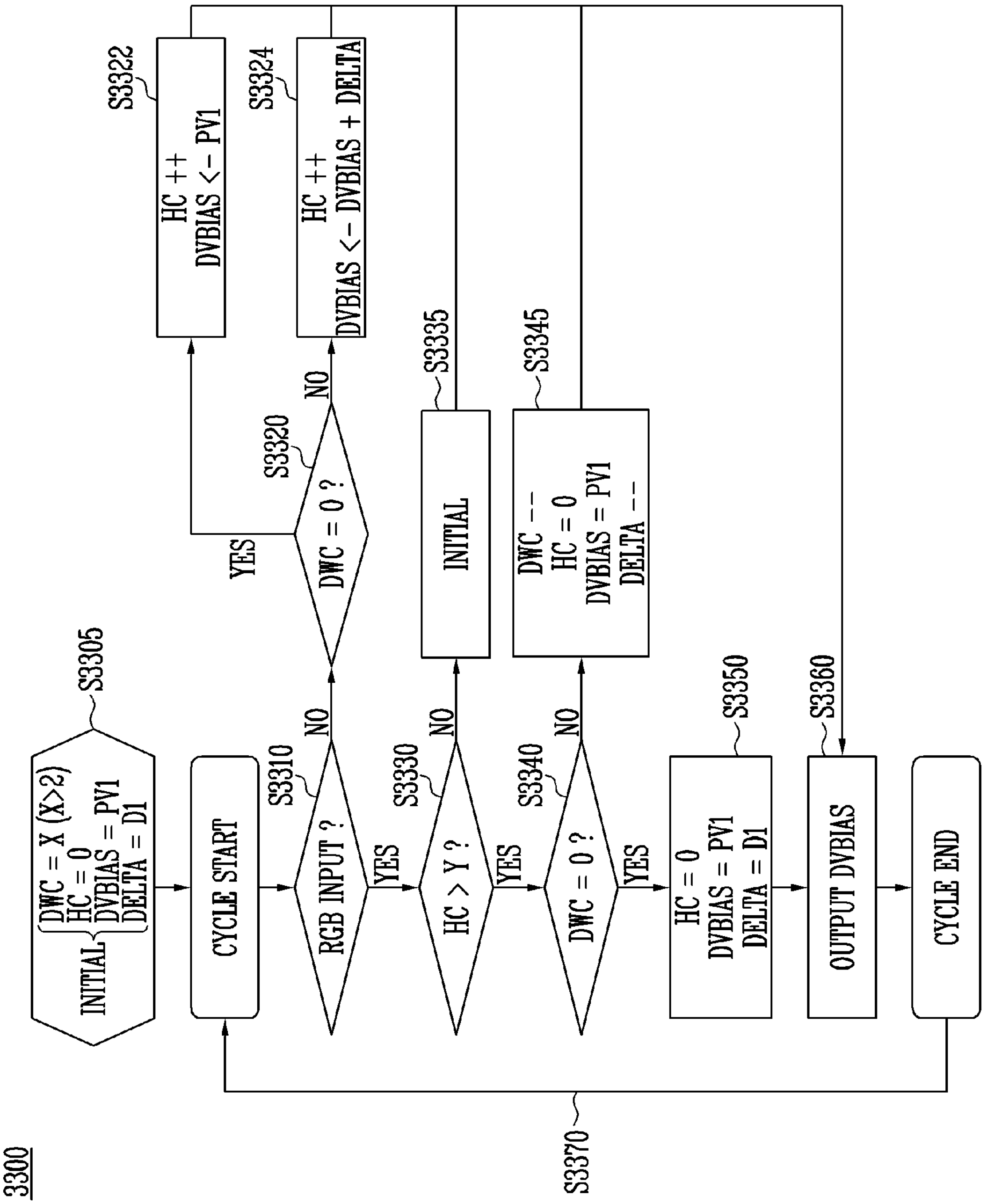
FIG. 33 is a flowchart illustrating an operation which is performed in a controller in accordance with embodiments of the present disclosure.

FIG. 33 is a flowchart 3300 illustrating an operation which is performed in a controller in accordance with embodiments of the present disclosure.

Here, the controller may be the above-mentioned timing controller 150 (refer to FIG. 32), but the present disclosure is not limited thereto.

Referring to FIG. 33, a first initialization step S3305 of setting an initialization value INITIAL is defined. The set initialization value INITIAL may be stored in a memory. Here, the memory may be the memory 3210 (refer to FIG. 32) of the timing controller 150 (refer to FIG. 32), but the present disclosure is not limited thereto.

The initialization value INITIAL may include, for example, information DWC about a data writing cycle count having a value of X (X is an integer of 2 or more), information HC about a hold cycle count having a value of 0, sixth-power-voltage level information DVBIAS (hereinafter, referred also to as "bias voltage level information") having a parameter value corresponding to a first peak voltage PV1, and voltage increment information DELTA corresponding to a first increment D1. Here, the term "information" may refer to a value stored in a register indicated by an address.

At the first initialization step S3305, the data writing cycle count information DWC, the hold cycle count information HC, the bias voltage level information DVBIAS, and the voltage increment information EDLTA may be stored in the memory as the initialization value INITIAL.

Parameter value information corresponding to the bias voltage level information DVBIAS may be stored in the memory in the form of a lookup table.

If a cycle starts, a processor may perform step S3310 of determining whether the started cycle is a data writing cycle or a hold cycle. Here, the processor may be the processor 3220 (refer to FIG. 32) of the timing controller 150 (refer to FIG. 32), but the present disclosure is not limited thereto.

The processor may determine whether the cycle is a data writing cycle or a hold cycle by determining whether new input image data RGB has been inputted. Alternatively, the processor may determine whether the cycle is a data writing cycle or a hold cycle with reference to a cycle at which the input image data RGB calculated by the counter 2814 (refer to FIG. 32) is inputted. For example, if the calculated input cycle is equal to or less than a preset value, the processor may determine that the started cycle is a data writing cycle. For example, if the calculated input cycle is more than a preset value, the processor may determine that the started cycle is a hold cycle.

If it is determined that the input image data RGB is not a new input image data, the processor may determine that the corresponding cycle is a hold cycle.

If it is determined that the corresponding cycle is a hold cycle, the processor may perform step S3320 of determining whether the data writing cycle count information DWC is 0. The data writing cycle count information DWC has a value of 0 if a low speed driving operation is maintained. The case where the data writing cycle count information DWC has a value of 0 will be described in detail in description of the step (refer to step S3345) of reducing the data writing cycle count information DWC.

If it is determined that the data writing cycle count information DWC is 0, the processor may increase the hold cycle count information HC by 1, and perform step S3322 of updating the bias voltage level information DVBIAS to a parameter value corresponding to the first peak voltage PV1.

If it is determined that the data writing cycle count information DWC is not 0, the processor may increase the hold cycle count information HC by 1, and perform step S3324 of updating the bias voltage level information DVBIAS. The processor may add the voltage increment information DELTA to the bias voltage level information DVBIAS stored in the memory to update the bias voltage level information DVBIAS.

If it is determined that the corresponding cycle is a data writing cycle, the processor may perform step S3330 of determining whether the driving operation is a high speed driving operation or a low speed driving operation.

Referring to FIG. 33, the process may determine whether the hold cycle count information HC is greater than a preset second value Y in the step S3330. In some cases, the processor may directly receive frame frequency information from an external device to perform the step of determining whether the driving operation is a high speed driving operation or a low speed driving operation. The second value Y may be a preset value. The second value Y may be a value set at the first initialization step S3305, or may be a value at a step separate from the first initialization step S3305.

Referring to FIG. 33, if the hold cycle count is greater than the preset second value Y, the process may determine that the driving operation is a low speed driving operation. If the hold cycle count is equal to or less than the preset second value Y (Y is an integer of 1 or more), the processor may determine that the driving operation is a high speed driving operation.

If it is determined that the driving operation is a high speed driving operation, the processor may perform a second initialization step S3335. The processor may store a value of X in the data writing cycle count information DWC, may store a value of 0 in the hold cycle count information HC, may store a parameter value corresponding to the first peak voltage PV1 in the bias voltage level information DVBIAS, and may store a first increment D1 in the voltage increment information DELTA.

If it is determined that the corresponding operation is a low speed driving operation, the processor may perform step S3340 of determining whether the data writing cycle count information DWC is 0.

If the low speed driving operation starts, the data writing cycle count information DWC may be reduced from a first value X by 1, and may be reduced to 0 if the low speed driving operation continues.

The first value X may correspond to the number of frame periods in which the inclination of the voltage level of the sixth power voltage VBIAS (refer to FIG. 29) is sequentially reduced.

For example, in the case where the first value X is 2, after the low speed driving operation starts, the sixth power voltage VBIAS (refer to FIG. 29) may sequentially increase during a first frame period, and the sixth power voltage VBIAS having the first peak voltage PV1 may be successively outputted from a second frame period.

For example, in the case where the first value X is 3, after the low speed driving operation starts, the sixth power voltage VBIAS (refer to FIG. 29) may sequentially increase during the first frame period, and the sixth power voltage VBIAS may sequentially increase at an inclination lower than the inclination of the first frame period, and the sixth power voltage VBIAS having the first peak voltage PV1 may be successively outputted during a third frame period.

Although FIG. 33 illustrates the case where the first value X is greater than 2 and the voltage level of the sixth power voltage VBIAS (refer to FIG. 29) sequentially increases during at least two frame periods after the low speed driving operation starts, the present disclosure is not limited thereto.

Depending on the configuration of the flowchart 3300, the relationship between the first value X and the number of frames in which the voltage level of the sixth power voltage VBIAS varies may be changed, and the foregoing example is only for illustrative purposes.

In accordance with embodiments of the present disclosure, the number of frames in which the voltage level of the sixth power voltage VBIAS successively increase may be controlled by adjusting the first value X.

Referring to FIG. 33, if it is determined that the data writing cycle count information DWC is not 0, in other words, if the data writing cycle count information DWC is greater than 0, the processor may perform a voltage increment adjusting step S3345.

At the voltage increment adjusting step S3345, the processor reduces the data writing cycle count information DWC by 1. The processor may reduce the voltage increment information DELTA by 1, and the reduction may correspond to a reduction in voltage increment from the first increment D1 (refer to FIG. 31) to the second increment D2 (refer to FIG. 31). The processor may initialize the bias voltage level information DVBIAS to a parameter value corresponding to the first peak voltage PV1. The processor may initialize the hold cycle count information HC to 0.

At the voltage increment adjusting step S3345, the voltage increment information DELTA may be adjusted. The adjusted voltage increment information DELTA may be reflected at step S3324 of updating the bias voltage level information DVBIAS.

Referring to FIG. 33 along with FIG. 31, until the data writing cycle count information DWC reaches 0, the inclination at which the voltage level of the sixth power voltage VBIAS increases may be reduced as the frame proceeds during a low speed driving operation.

Referring to FIG. 33, if it is determined that the data writing cycle count information DWC is 0, the processor may perform a low-speed-driving maintaining step S3350.

At the low-speed-driving maintaining step S3350, the processor may initialize the hold cycle count information HC to a value of 0, may initialize the bias voltage level information DVBIAS to a parameter value corresponding to the first peak voltage PV1, and may initialize the voltage increment information DELTA to the first increment D1.

If the process enters the low-speed-driving maintaining step S3350, the data writing cycle count information DWC may be maintained at 0 until a high speed driving operation starts (in other words, until the process enters a second initialization step S3335).

The processor may perform step S3360 of outputting a parameter value based on the bias voltage level information DVBIAS stored at the previous processing steps S3322, S3324, S3335, S3345, and S3350.

The parameter value outputted at the parameter value outputting step S3360 may be inputted to a signal output component.

Here, the signal output component may be the above-mentioned signal output component 2816 of the timing controller 150, but the present disclosure is not limited thereto.

The signal output component may receive a parameter value, and output a control signal (e.g., a power supply circuit control signal PCS (refer to FIG. 32)) corresponding to the parameter value.

If the processor outputs a parameter value corresponding to the bias voltage level information DVBIAS, the corresponding cycle is terminated.

If the corresponding cycle is terminated, a subsequent cycle may start after a certain time passes (refer to S3370).

Hence, embodiments of the present disclosure may provide a controller which may control the voltage level of the bias voltage to be sequentially increased in one frame.

Furthermore, embodiments of the present disclosure may provide a controller capable of controlling the inclination at which the voltage level of the bias voltage increases such that the inclination is gradually reduced.

Figure 34:
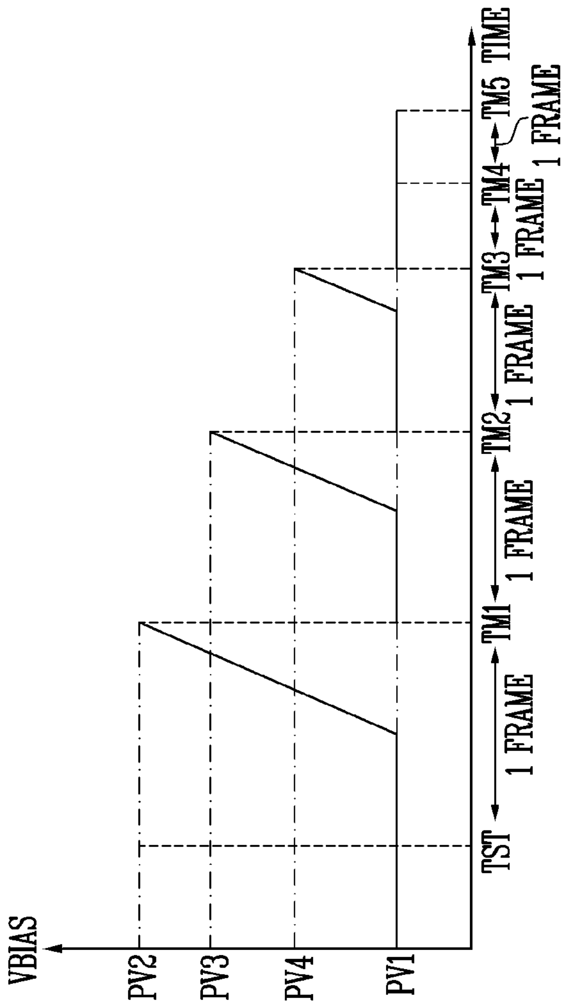
FIG. 34 is a diagram illustrating an embodiment in which the sixth power voltage is applied at a plurality of voltage levels.

FIG. 34 is a diagram illustrating an embodiment in which the sixth power voltage VBIAS is applied at a plurality of voltage levels.

Referring to FIG. 34, in embodiments of the present disclosure, the voltage level of the sixth power voltage VBIAS may increase at a constant inclination in each frame.

Referring to FIG. 34, in embodiments of the present disclosure, the sixth power voltage VBIAS may be applied at a first peak voltage PV1 during a preset period in one frame period. In embodiments of the present disclosure, if a length of the one frame period exceeds the preset period, the voltage level of the sixth power voltage VBIAS may sequentially increase from a time point at which the frame period exceeds the preset period. In embodiments of the present disclosure, a length of a period in which the sixth power voltage VBIAS is applied at the first peak voltage PV1 may not exceed a preset time. In embodiments of the present disclosure, in the case where the length of the frame period exceeds the preset time (or period), the voltage level of the sixth power voltage VBIAS may increase from the first peak voltage PV1.

Referring to FIG. 34, there is illustrated the case where a first frame (a period from the transition time point TST to a first time point TM1) after the transition time point TST, a second frame (a period from the first time point TM1 to a second time point TM2), and a third frame (a period from the second time point TM2 to a third time point TM3) each is greater in length than the preset period. On the other hand, there is illustrated the case where a fourth frame (a period from the third time point TM3 to a fourth time point TM4), and a fifth frame (a period from the fourth time point TM4 to a fifth time point TM5) each is less in length than the preset period.

Referring to FIG. 34, in the first frame, the sixth power voltage VBIAS increases from the first peak voltage PV1 to a second peak voltage PV2. Referring to FIG. 34, in the second frame, the sixth power voltage VBIAS increases from the first peak voltage PV1 to a third peak voltage PV3. In the third frame, the sixth power voltage VBIAS increases from the first peak voltage PV1 to a fourth peak voltage PV4.

In the fourth frame, the sixth power voltage VBIAS is maintained at the first peak voltage PV1. In the fifth frame, the sixth power voltage VBIAS is also maintained at the first peak voltage PV1.

If the length of one frame period is less than the length of the preset period, the driving operation may correspond to a high speed driving operation. If the length of one frame period is greater than the length of the preset period, the driving operation may correspond to a low speed driving operation.

According to the foregoing, during the low speed driving operation, the voltage level of the sixth power voltage VBIAS may be sequentially increased so that the hysteresis of the first transistor T1 (refer to FIG. 23) can be mitigated.

Furthermore, during the low speed driving operation, as the length of one frame period increases, the bias voltage VBIAS to be applied is increased, so that the hysteresis of the transistor T1 can be mitigated.

Figure 35:
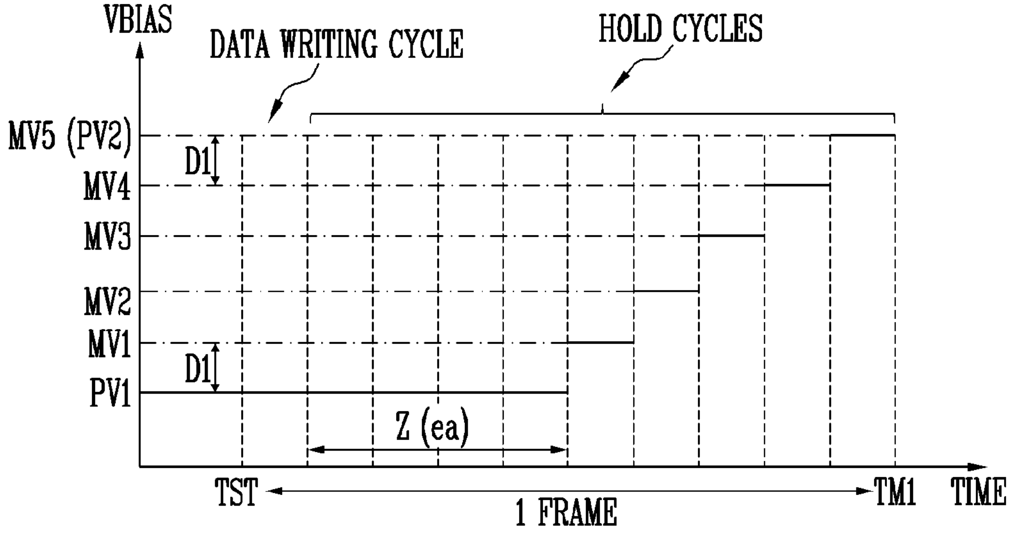
FIG. 35 is a diagram illustrating that the voltage level of the sixth power voltage increases as the cycle proceeds in one frame.

FIG. 35 is a diagram illustrating that the voltage level of the sixth power voltage VBIAS increases as cycles proceed in one frame.

Referring to FIG. 35, there is illustrated a graph showing the voltage level of the sixth power voltage VBIAS as the cycles proceed over time during one frame period from the transition time point TST to a first time point TM1.

Referring to FIG. 35, in a data writing cycle DATA WRITING CYCLE, the voltage level of the sixth power voltage VBIAS is a first peak voltage PV1.

One or more hold cycles may follow the data writing cycle DATA WRITING CYCLE.

If the number of hold cycles HOLD CYCLE following the data writing cycle DATA WRITING CYCLE is equal to or less than a preset third value Z (where Z is an integer of 1 or more), the voltage level of the sixth power voltage VBIAS may be maintained at the first peak voltage PV1.

If the number of hold cycles HOLD CYCLE following the data writing cycle DATA WRITING CYCLE is greater than the preset third value Z, the voltage level of the sixth power voltage VBIAS may increase from the first peak voltage PV1.

For example, in a first cycle after the number of hold cycles HOLD CYCLE exceeds 4 (here, the third value Z is 4), the voltage level of the sixth power voltage VBIAS may be a first intermediate voltage MV1 that has increased from the first peak voltage PV1.

A voltage difference (i.e., MV1–PV1) between the first intermediate voltage MV1 and the first peak voltage PV1 may be a first increment D1.

For example, as the hold cycles HOLD CYCLE proceed, the voltage level of the sixth power voltage VBIAS may sequentially increase by the first increment D1. For example, a voltage difference between a fifth intermediate voltage MV5 and a fourth intermediate voltage MV4 may be the same first increment D1.

In some cases, as the cycles proceed, the voltage level increment of the sixth power voltage VBIAS may be increased or gradually reduced. The present disclosure is not limited to embodiments in which the sixth power voltage VBIAS uniformly increases by the first increment D1.

However, for convenience of explanation, in the following descriptions, there is illustrated the case where the sixth power voltage VBIAS uniformly increases by the first increment D1.

Referring to FIG. 35, in embodiments of the present disclosure, the voltage level of the sixth power voltage VBIAS may increase in proportion to the number of hold cycles HOLD CYCLE that exceeds the preset third value Z.

Figure 36:
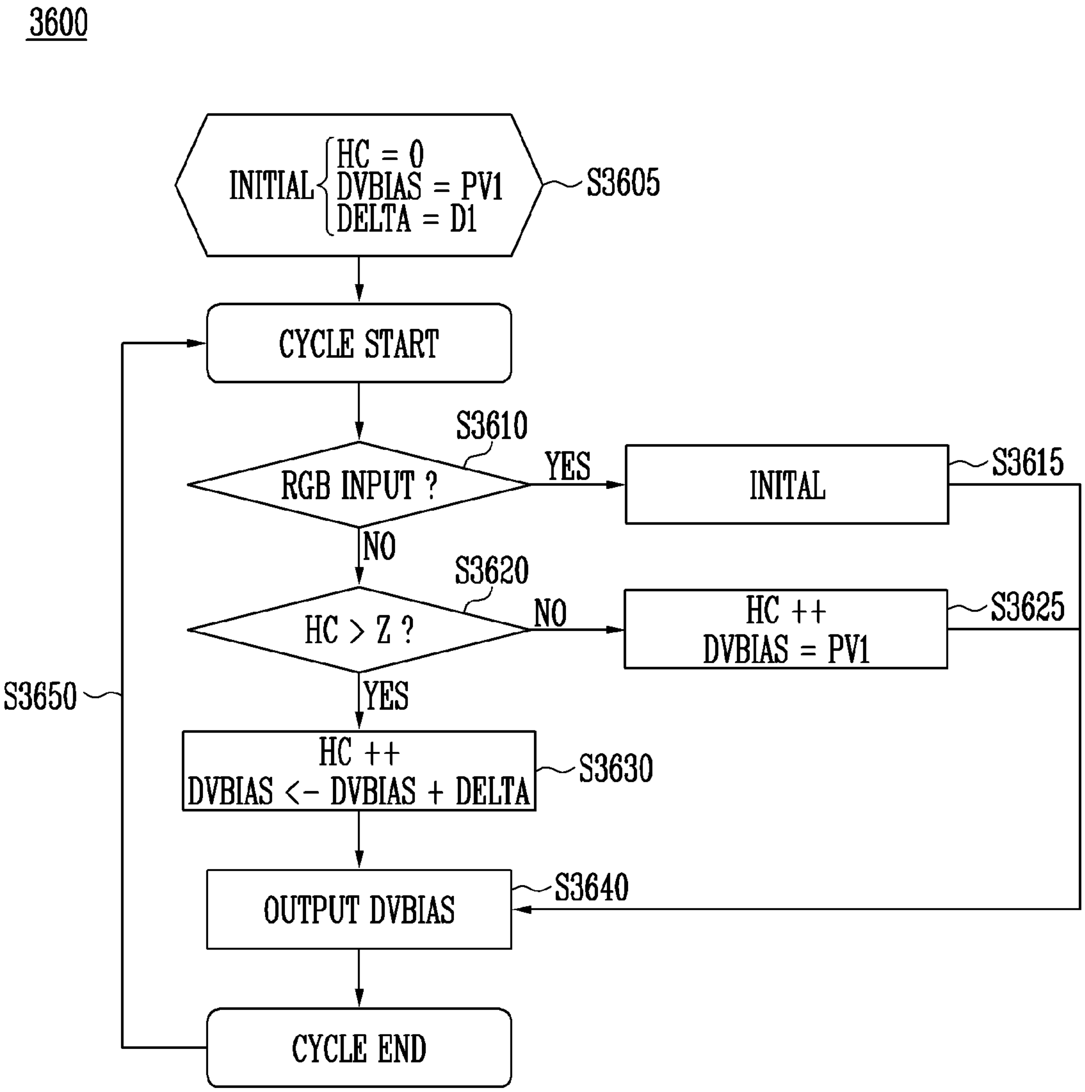
FIG. 36 is a flowchart illustrating an operation which is performed in a controller in accordance with embodiments of the present disclosure.

FIG. 36 is a flowchart 3600 illustrating an operation which is performed in a controller in accordance with embodiments of the present disclosure.

Here, the controller may be the above-mentioned timing controller 150 (refer to FIG. 32), but the present disclosure is not limited thereto.

Referring to FIG. 36, a first initialization step S3605 of setting an initialization value INITIAL is defined. The set initialization value INITIAL may be stored in the memory. Here, the memory may be the memory 3210 (refer to FIG. 32) of the timing controller 150 (refer to FIG. 32), but the present disclosure is not limited thereto.

The initialization value INITIAL may include information DWC about a hold cycle count having a value of 0, information HC about a hold cycle count having a value of 0, sixth-power-voltage level information DVBIAS (hereinafter, referred also to as bias voltage level information) having a parameter value corresponding to a first peak voltage PV1, and voltage increment information DELTA corresponding to a first increment D1.

At the first initialization step S3605, the hold cycle count information HC, the voltage level information DVBIAS, and the voltage increment information EDLTA may be stored in the memory as the initialization value INITIAL.

Parameter values corresponding to the bias voltage level information DVBIAS may be stored in the memory in the form of a lookup table.

If a cycle starts, the processor may perform step S3610 of determining whether the corresponding started cycle is a data writing cycle or a hold cycle. Here, the processor may be the processor 3220 (refer to FIG. 32) of the timing controller 150 (refer to FIG. 32), but the present disclosure is not limited thereto.

The processor may determine whether the cycle is the data writing cycle or the hold cycle by determining whether new input image data RGB has been inputted.

If it is determined that the input image data RGB is not a new input image data, the processor may determine that the corresponding cycle is a hold cycle.

If it is determined that the corresponding cycle is a data writing cycle, the processor may perform a second initialization step S3615.

At the second initialization step S3615, the processor may input the preset initialization value INITIAL to the hold cycle count information HC, the bias voltage level information DVBIAS, and the voltage increment information DELTA.

If it is determined that the corresponding cycle is a hold cycle, the processor performs step S3620 of determining whether the driving operation is a low speed driving operation.

At step S3620 of determining whether the driving operation is a low speed driving operation, the processor may determine whether the hold cycle count information HC exceeds a preset third value Z.

If it is determined that the hold cycle count information HC is equal to or less than the preset third value Z, the processor may increase the hold cycle count information HC by 1, and perform step S3625 of initializing the bias voltage level information DVBIAS to a value corresponding to the first peak voltage PV1.

If it is determined that the hold cycle count information HC exceeds the preset third value Z, the processor may perform step S3630 of updating the bias voltage level information DVBIAS.

At step S3630 of updating the bias voltage level information DVBIAS, the processor may increase the hold cycle count information HC by 1, and update the bias voltage level information DVBIAS by adding a value corresponding to the voltage increment information DELTA to the bias voltage level information DVBIAS.

The processor may perform step S3640 of outputting, based on the bias voltage level information DVBIAS stored in the memory at the previous processing steps S3615, S3625, and S3630, a parameter value corresponding to associated bias voltage level information DVBIAS.

The processor may output the parameter value to the signal output component {e.g., the signal output component 2816 (refer to FIG. 28) of the timing controller 150 (refer to FIG. 28)}.

If the processor outputs the parameter value, the corresponding cycle may be terminated. If the corresponding cycle is terminated, a subsequent cycle may start after a certain time passes (refer to S3650).

Hence, in the case where the number of hold cycles exceeds a preset number (i.e., in the case of the low speed driving operation), the voltage level of the sixth power voltage VBIAS (refer to FIG. 35) may be sequentially increased and outputted.

In a pixel, a display device, a controller, and a method of driving the display device including a bias power line in accordance with embodiments of the present disclosure, images may be displayed at various frame frequencies.

In a pixel, a display device, a controller, and a method of driving the display device including a bias power line in accordance with embodiments of the present disclosure, a flicker phenomenon which may occur in the case where images are displayed at various frame frequencies can be mitigated.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the bounds and scope of the present disclosure should be determined by the technical spirit of the following claims.

What is claimed is:

1. A pixel comprising:

a light emitting element;

a first transistor including a gate electrode electrically connected to a first node, a second node to which a first power voltage for driving the light emitting element is to be applied, and a third node electrically connected to the light emitting element; and a bias control transistor including a gate electrode for receiving a bias control signal, a first electrode connected to the second node, and a second electrode connected to a bias power line, wherein the bias control transistor is configured to transmit a bias voltage received through the bias power line to the second node when the bias control signal has a turn-on level, wherein, in one frame period, a voltage level of the bias voltage to be applied to the second node sequentially increases.

2. The pixel according to claim 1, wherein a peak voltage of the bias voltage is gradually reduced over two or more frame periods.

3. The pixel according to claim 1, further comprising a second transistor configured to be controlled in operating timing thereof by a first scan signal, and electrically connected to a data line and configured to transmit a voltage corresponding to a data voltage inputted from the data line to the first node, wherein the one frame period comprises:

a data writing cycle in which the first scan signal having a turn-on level is inputted to the second transistor and the light emitting element emits light based on the inputted data voltage; and a hold cycle in which the light emitting element emits light based on the data voltage inputted in the data writing cycle.

4. The pixel according to claim 3, wherein, in a case where the one frame period includes two or more hold cycles, the voltage level of the bias voltage sequentially increases as the two or more hold cycles proceed.

5. The pixel according to claim 3, wherein in the one frame period a peak voltage of the bias voltage increases in proportion to a total number of hold cycles in the one frame period.

6. The pixel according to claim 3, wherein the voltage level of the bias voltage to be inputted in the data writing cycle is different from the voltage level of the bias voltage to be inputted in the hold cycle.

7. The pixel according to claim 3, wherein the voltage level of the bias voltage to be inputted in the data writing cycle is identical to the voltage level of the bias voltage to be inputted in a preset number of hold cycle periods, and wherein, in a case where a total number of hold cycles in the one frame period exceeds the preset number, the voltage level of the bias voltage sequentially increases after the preset number of hold cycle periods.

8. The pixel according to claim 7, wherein, in the case where the total number of hold cycles exceeds the preset number, the voltage level of the bias voltage increases in proportion to a number of hold cycles that exceeds the preset number.

9. The pixel according to claim 1, wherein, as the one frame period proceeds, a voltage level increment of the bias voltage is reduced in the one frame period.

10. A pixel comprising:

a light emitting element;

a first transistor including a gate electrode electrically connected to a first node, a second node to which a first power voltage for driving the light emitting element is to be applied, and a third node electrically connected to the light emitting element;

a second transistor configured to be controlled in operating timing thereof by a first scan signal, and electrically connected to a data line so that a voltage corresponding to a data voltage inputted from the data line is transmitted to the first node; and a bias control transistor configured to be controlled in operating timing thereof by a bias control signal, and configured to switch electrical connection between the second node and a bias power line for transmitting a bias voltage, and wherein in one frame period a voltage level of the bias voltage to be applied to the second node is constant, and as a frame is changed to another frame, the voltage level of the bias voltage to be applied to the second node is increased and then sequentially reduced.

11. A display device comprising:

a display panel in which a plurality of pixels, each including a light emitting element and a first transistor configured to drive the light emitting element, are disposed, a bias power line for transmitting a bias voltage to be applied to the first transistor is disposed, and a plurality of data lines electrically connected to the plurality of pixels are disposed;

a data driving circuit configured to supply a data voltage to the plurality of data lines; and a power supply circuit configured to output the bias voltage to the bias power line, wherein, in one frame period, the power supply circuit sequentially increases a voltage level of the bias voltage and outputs the bias voltage to the bias power line.

12. The display device according to claim 11, wherein a plurality of first scan lines electrically connected to the plurality of pixels are disposed in the display panel, wherein the display device further comprises: a first scan driving circuit configured to output, to the plurality of first scan lines, a first scan signal for controlling a timing at which the data voltage is inputted to the plurality of pixels, wherein the one frame period comprises:

a data writing cycle in which the first scan driving circuit outputs the first scan signal having a turn-on level to the plurality of first scan lines, the data voltage is inputted to the plurality of pixels, and the light emitting element emits light based on the data voltage inputted to the plurality of pixels; and a hold cycle in which the light emitting element emits light based on the data voltage inputted to the plurality of pixels in the data writing cycle.

13. The display device according to claim 12, wherein, in a case where a total number of hold cycles increases to a preset number or more between two successive frames, the power supply circuit increases the voltage level of the bias voltage and outputs the bias voltage.

14. The display device according to claim 12, wherein the bias voltage has one peak voltage, and wherein the peak voltage is a voltage level of the bias voltage to be outputted from the power supply circuit to a last hold cycle in the one frame.

15. The display device according to claim 11, wherein, as a frame is changed to another frame, the power supply circuit reduces a voltage level increment of the bias voltage and outputs the bias voltage.

16. The display device according to claim 11, wherein, as a frame is changed to another frame, the power supply circuit reduces a peak voltage of the bias voltage and outputs the bias voltage to the bias power line.

17. A controller comprising:

an interface configured to receive input image data;

a counter configured to compute an input cycle at which the input image data is inputted;

a memory configured store information about a level of a bias voltage, information about a parameter corresponding to the level of the bias voltage, and information about a voltage increment;

a processor configured to update the information about the level of the bias voltage such that the bias voltage increases by the voltage increment in a case where a present cycle is determined to be a hold cycle based on the computed input cycle; and a signal output component configured to output the parameter as a power supply circuit control signal based on the information about the level of the bias voltage stored in the memory.

18. The controller according to claim 17, wherein the memory further includes information about a hold cycle count, information about a data writing cycle count, and initialization value information, wherein the initialization value information includes information about the data writing cycle count having a value greater than 2, information about the hold cycle count having a value of 0, information about the voltage level of the bias voltage that is a peak voltage, and information about the voltage increment that is a certain increment.

19. The controller according to claim 18, wherein, in a case where the present cycle is determined to be the data writing cycle, the processor determines whether a driving operation is a low speed driving operation, wherein, in a case where the driving operation is determined to be the low speed driving operation, the processor determines whether the information about the data writing cycle count is 0, and wherein, in a case where the information about the data writing cycle count is not 0, the processor reduces the data writing cycle count by 1 and updates the information about the data writing cycle count, reduces the voltage increment and updates the information about the voltage increment, and initializes the voltage level of the bias voltage to the peak voltage and updates the level information of the bias voltage.

20. The controller according to claim 18, wherein, in the case where the present cycle is determined to be the hold cycle, the processor determines whether the information about the data writing cycle count is 0, wherein, in a case where the information about the data writing cycle count is determined not to be 0, the processor increases information about the hold cycle count by 1 and stores the information about the hold cycle count in the memory, updates the information about the voltage level of the bias voltage such that the voltage level of the bias voltage is increased by the voltage increment, and stores the information about the voltage level in the memory, and wherein the signal output component outputs the power supply circuit control signal according to a value of the parameter.

21. A method of driving a display device including a bias power line, wherein the bias power line is electrically connected to a plurality of pixels disposed in the display device, and at least one pixel among the plurality of pixels includes a light emitting element, and a first transistor configured to supply a driving current to the light emitting element, and the bias power line is electrically connected to an electrode of the first transistor, the method comprising:

inputting an emission control signal having a turn-on level to a bias control transistor in the at least one pixel configured to switch electrical connection between the bias power line and the first transistor;

inputting an emission control signal having a turn-off level to the bias control transistor, and increasing a voltage applied to the bias power line while the emission control signal having the turn-off level is inputted to the bias control transistor; and inputting the emission control signal having the turn-on level while the voltage applied the bias power line is increased.

22. The method according to claim 21, wherein inputting the emission control signal having the turn-on level to the bias control transistor, inputting the emission control signal having the turn-off level, and inputting the emission control signal having the turn-on level while the voltage applied to the bias power line is increased are included in one frame period.

23. The method according to claim 21, wherein, in one frame period, the voltage applied to the bias power line sequentially increases.

24. The method according to claim 21, further comprising computing a frame frequency of an image to be displayed by the display device, wherein, in a case where the frame frequency is reduced, the voltage of the bias power line is increased.

25. The method according to claim 21, wherein, in a case where a frame starts, the voltage applied to the bias power line is sequentially increased from a preset peak voltage.

26. The method according to claim 25, wherein, in a first frame period, the voltage applied to the bias power line is sequentially increased from the preset peak voltage by a preset first voltage increment, wherein, in a second frame period after the first frame period, the voltage level of the bias power line is sequentially increased from the preset peak voltage by a preset second voltage increment, and wherein the second voltage increment is less than the first voltage increment.

27. The method according to claim 25, wherein, in one frame period, a length of a period in which the voltage level of the bias power line is maintained at the peak voltage does not exceed a preset time, and wherein, in a case where a length of the one frame period exceeds the preset time, the voltage level of the bias power line increases from the peak voltage.

* * * * *